(12) United States Patent
Martinson

(10) Patent No.: US 11,423,372 B1
(45) Date of Patent: Aug. 23, 2022

(54) METHOD AND SYSTEM FOR DIGITAL ACCOUNT MANAGEMENT

(71) Applicant: James L. Martinson, San Antonio, TX (US)

(72) Inventor: James L. Martinson, San Antonio, TX (US)

( * ) Notice: Subject to any disclaimer, the term of this patent is extended or adjusted under 35 U.S.C. 154(b) by 307 days.

(21) Appl. No.: 16/371,743

(22) Filed: Apr. 1, 2019

(51) Int. Cl.
*G06Q 20/36* (2012.01)
*G06Q 20/10* (2012.01)
*G06Q 20/32* (2012.01)
*G06Q 20/20* (2012.01)

(52) U.S. Cl.
CPC ......... *G06Q 20/102* (2013.01); *G06Q 20/204* (2013.01); *G06Q 20/207* (2013.01); *G06Q 20/3224* (2013.01); *G06Q 20/3674* (2013.01)

(58) Field of Classification Search
CPC .................................................. G06Q 20/102
See application file for complete search history.

(56) References Cited

U.S. PATENT DOCUMENTS

| | | | |
|---|---|---|---|
| 7,395,958 B2 | 7/2008 | Haber | |
| 9,390,411 B2 | 7/2016 | Jarman et al. | |
| 2009/0279184 A1* | 11/2009 | Mihara et al. | G06Q 20/20 |
| 2018/0089923 A1 | 3/2018 | Hwang | |
| 2018/0096325 A1* | 4/2018 | Panzo | G06Q 20/20 |
| 2019/0279184 A1* | 9/2019 | Seljeseth | G06Q 20/3278 |
| 2020/0151687 A1* | 5/2020 | Bhasin | G06Q 20/102 |

OTHER PUBLICATIONS

Hasan, et.al, "Proof of Delivery of Digital Assets Using Blockchain and Smart Contracts," IEEE (Year: 2018).*

* cited by examiner

*Primary Examiner* — Mike Anderson
*Assistant Examiner* — Brandon M Duck

(57) ABSTRACT

A method, computer program product, and system are disclosed. The method, when implemented in a computer system, includes determining a change deposit amount, determining account information (the account information identifying an account), and initiating a deposit operation, where the deposit operation includes performing an electronic deposit of the change deposit amount to the account. The determining is performed by a digital change application that is installed in a mobile device. The digital change application is configured to initiate the electronic deposit of the change deposit amount to the account.

20 Claims, 25 Drawing Sheets

METHOD AND SYSTEM FOR DIGITAL ACCOUNT MANAGEMENT

FIELD

The disclosure presented herein relates to the characterization of products and/or services, and, more particularly, to a method and system for description database creation, organization, and use.

BACKGROUND

Generally, when a consumer purchases an item or service from a merchant and pays with physical currency (also referred to as "cash"), the consumer receives, in return, the remainder (after purchase), also in physical currency. Such amounts (also referred to as change) represents the overage of the hard currency provided by the consumer, as compared to the total purchase price. Consumers may purchase goods or services using cash for a number of reasons. To say that a consumer pays in cash, that merchant receives cash for payment, that a consumer purchases items using cash, a purchase transaction is initiated with the payment of cash, or that there is a cash-initiated purchase, and the like, is to say that the consumer purchases an item using legal tender currency such as coins, bills, or notes to a cashier or a payment system at the point of sale. For example, a consumer may conduct such a transaction by handing bills and coins to a cashier, or inserting coins or bills into the bill and coin slots of a payment system, in order to purchase an item at the point of sale.

While consumers have any number of reasons to initiate payment for items with cash, receiving change as cash has a number of disadvantages. When a consumer pays for a good or service (typically the result of having tendered an amount of cash greater than the total purchase price), such change represents the amount of money owed by the merchant to the consumer due for the difference between the cash provided by the consumer and the total purchase price. To say that a consumer receives change as cash or that a merchant provides change as cash, is to say that the merchant provides bills or coins to the consumer for the change at the point of sale location.

As mentioned above, providing change as cash to the consumer at the point of sale location has a number of disadvantages. A merchant must keep cash on hand, which comes at some a financial cost to the merchant. Maintaining cash requires forecasting an amount of cash needed over a given period of time, procuring the necessary amount of cash, using security companies to transport the cash between merchant facilities and one or more financial institutions, investing in a safe and/or other physical security, as well as security procedures at the merchant facility, transferring cash to and from cash drawers, securing the cash drawers, and security and accounting procedures that must be followed accordingly to track and secure the cash. Each of these elements come with a financial cost to the merchant, along with the potential for error and/or theft.

Providing change as cash is time consuming and error prone, and also involves risk of theft. Providing change as cash by a cashier involves the placement of the initial cash payment into the cash drawer and also the calculation and removal of the proper amount of cash by the cashier. These steps can be time consuming, error-prone, and involve the risk of theft, resulting in less revenue and a financial loss to the merchant. If the cash drawer is out of a particular coin or bill, and the cash amount for change cannot be satisfied by the available cash in the drawer, then the transaction must be interrupted while the cashier obtains the necessary cash from an alternate location, such as the merchant's safe, which significantly increases the overall purchase time, which also results in less revenue to the merchant.

In addition, consumers lose money by not keeping track of the cash received as change. This is particularly the case with change that includes coins, since the coins are often placed in trivial locations, lost, or generally forgotten. Even coins placed in a designated coin container typically go unused. Without utilizing the coins, the consumer has less money. Over time, the value attributable to the lack of utilization of coins can become significant to the consumer. As a similar consequence, coins that would otherwise be used in circulation go unused, which may cause a financial loss to the government that minted the coins, since the coins are not in circulation.

There are also health risks to consider. Most notably, pathogens such as disease-causing bacteria, or other pathogens that may causes illnesses, are known to be found on physical banknotes and coins, and the continual exchange of cash back and forth between consumers and merchant personnel can lead to the spread of pathogens.

Thus, it will be appreciated in view of the foregoing that a need exists to facilitate the provision of change that is due to a consumer, yet also address the disadvantages in providing such change in the form of physical banknotes and coins (e.g., in response to a consumer paying for one or more goods or services in cash at a point of sale).

BRIEF DESCRIPTION OF THE DRAWINGS

Embodiments such as those described herein may be better understood, and its numerous objects, features and advantages made apparent to those skilled in the art by referencing the accompanying drawings.

DETAILED DESCRIPTION

Figure 1A:
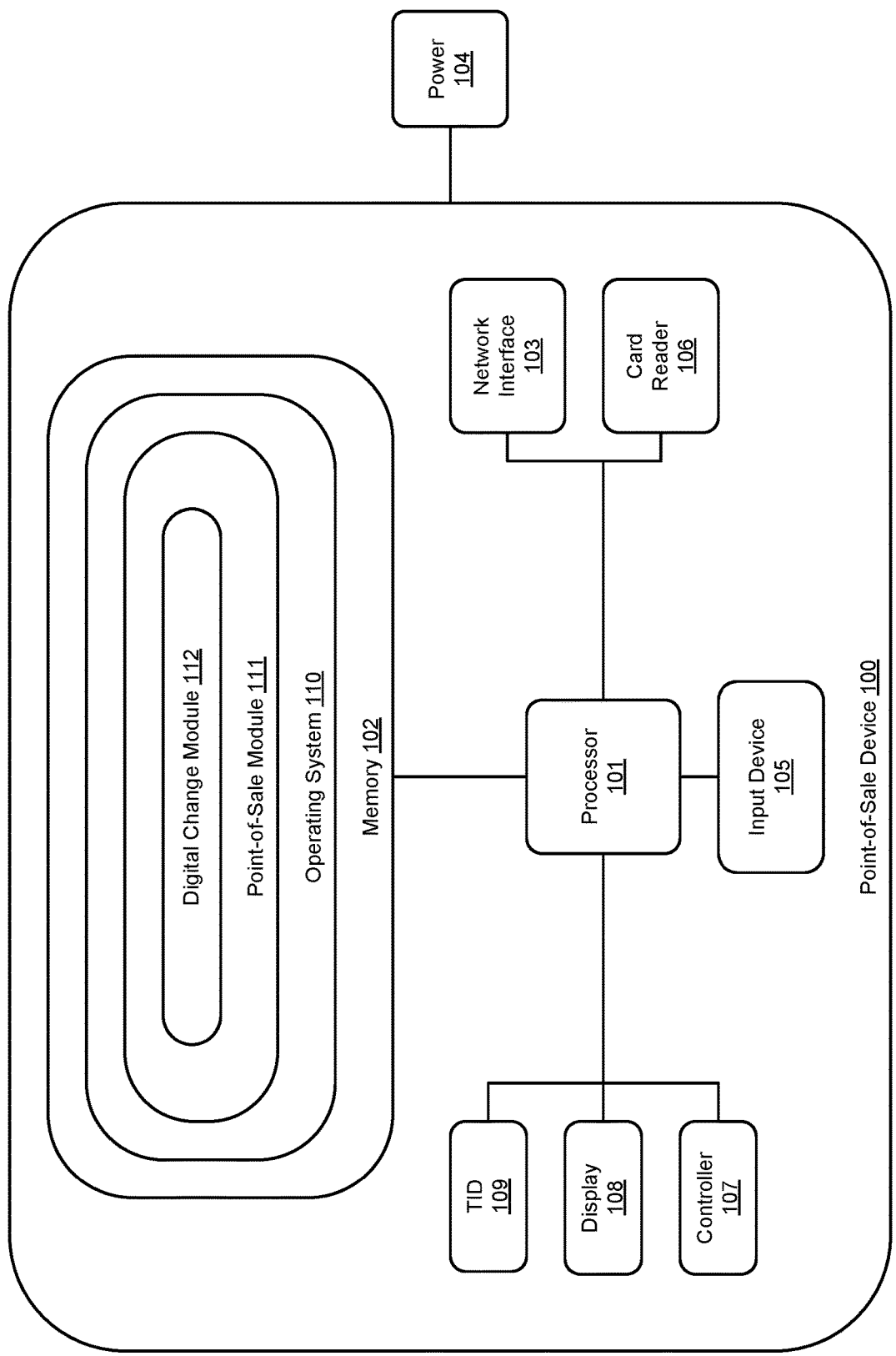
FIG. 1A is a simplified block diagram illustrating an example of point-of-sale (POS) system, according to methods and systems such as those disclosed herein.

The following is intended to provide a detailed description of the examples presented in the figures, and should not be taken to be limiting, in any respect. Rather, any number of variations may fall within the scope of the disclosure, certain aspects of which are defined in the claims following this Detailed Description.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA), smart phone, or other such mobile computing system), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

As used herein, the terms "consumer device," "computing device," or "mobile unit" may be used interchangeably to refer to a portable computing device with wireless communication capability. In particular embodiments, such a device may be the above-mentioned information handling system. In other embodiments, such a device may include any instrumentality or aggregate of instrumentalities operable to compute, determine, classify, process, transmit, receive, retrieve, originate, switch, store, display, communicate, manifest, detect, record, reproduce, handle, or utilize any form of information, intelligence, or data for personal, business, scientific, control, or other purposes. For example, as mentioned before, a consumer device or mobile unit may be a personal computer (e.g., a laptop), tablet computer, mobile device (e.g., personal digital assistant (PDA) or smart phone), or any other suitable device, and may vary in size, shape, performance, functionality, and price.

It is noted here that, for ease of discussion, a device or module may be referred to as "performing," "accomplishing," or "carrying out" a function or process. The unit may be implemented in hardware and/or software. However, as will be evident to one skilled in the art, such performance can be technically accomplished by one or more hardware processors, software, or other program code executed by the processor, as may be appropriate to the given implementation. The program execution could, in such implementations, thus cause the processor to perform the tasks or steps instructed by the software to accomplish the desired functionality or result. However, for the sake of convenience, in the discussion below, a processor or software component may be interchangeably considered as an "actor" performing the task or action described, without technically dissecting the underlying software execution mechanism. Furthermore, a hyphenated term (e.g., "technology-specific", "computer-readable", "Wi-Fi", etc.) may be occasionally interchangeably used with its non-hyphenated version (e.g., "technology specific," "computer readable", "WiFi", etc.), and a capitalized entry (e.g., "Device Manager", "WiFi", etc.) may be interchangeably used with its non-capitalized version (e.g., "device manager", "wifi", etc.). Such occasional interchangeable uses shall not be considered inconsistent with one another.

A description of various embodiments is provided below with reference to the accompanying figures, beginning with an overview of an example point-of-sale (POS) system and network architecture therefor.

INTRODUCTION

Embodiments described subsequently herein overcome the disadvantages of existing technology when, for example, a consumer pays for one or more items in cash, by enabling the electronic deposit of some or all of the funds owed in return ("change"; also referred to herein, in the context of methods and systems such as those described herein, as "Change Due") to an account belonging to (or otherwise associated with) the consumer. In so doing, Change Due the consumer (in the form of cash) need not be provided, in return, to the consumer at the point of sale. Additionally, such Change Due can be aggregated in one or more of the consumer's accounts over time and across multiple purchases, earning interest and thereby having substantial overall benefit to the consumer in increased savings, while at the same time providing decreased costs, expenses, and risk of loss to the merchant (e.g., as there is less need for the merchant to maintain as much cash on hand for providing Change Due, significantly reduced chance of error in providing such Change Due, and so on). Moreover, the frequency of exchanging cash between consumers and merchants is decreased, limiting the health risks associated with general handling of cash. A cash purchase initiated by a consumer (a "cash-initiated purchase"), as comprehended by the present disclosure, can also be a return of, refund for, or exchange transaction (e.g., of goods or services previously purchased by the consumer), insofar as such action would (or could) result in change due to the consumer in cash (e.g., for a given return, refund, or exchange would result in the consumer receiving cash).

In one embodiment, methods and systems such as those described herein are directed to a consumer's cash purchase of a product or service, and the electronic deposit of an amount of Change Due, in return. As an example, a consumer might order a coffee at a merchant location, at which time a cashier would generate a total purchase price, or a total amount due, using a point-of-sale (POS) device, system, and/or software module. For example, the total purchase price might be in US Dollars (USD), such as USD 88 cents, and the consumer could pay for the coffee in cash by providing a USD $5 bill to the cashier. The POS system calculates the Change Due to be $4.12 (the difference between the cash provided by the consumer to pay for the item ($5) and the total purchase price of the item ($0.88)). In the present example, the POS system prompts the consumer on a display for the amount of the $4.12 Change Due to be electronically deposited. In response, the consumer inputs data that indicates how much of the Change Due the consumer desires to be electronically deposited in her or her account. The consumer might, for example, desire to receive $4 back in bills, but have the 12 cents electronically deposited in their account. Accordingly, the consumer inputs 12 cents as the amount to be electronically deposited, representing the tenths and hundredths places of the Change Due. The POS system then obtains or otherwise receives the consumer's account information indicating the account in which the Change Due is to be deposited. In this example, the account information is obtained when the consumer inserts their digital change card into a card reader of the POS system. As described below, the account information can also be provided via the consumer's mobile phone, and/or by way of via multifactor authentication (e.g., one or more biometric recognition techniques (e.g., one or more of facial recognition, fingerprint recognition, and so on) in combination with information retrieved from one or more databases storing such information (e.g., using biometric information thus gathered), one or more security codes, the digital change card described subsequently (or the like), one or more QR codes, one or more RFIDs, and/or other such methodologies, in various combination with one another).

Having obtained the account information, the POS system initiates an electronic transfer of the $0.12, for example, from the merchant's account to the consumer's account. The remainder of the transaction proceeds. Since only $0.12 of the $4.12 Change Due was selected to be electronically deposited, the cashier provides the remaining $4 Change Due to the consumer as physical currency, along with the coffee, and a receipt. In one embodiment, the receipt shows the total amount due for the coffee as 88 cents, the cash payment from the consumer of $5, the Change Due is $4.12, an electronically-deposited portion of the Change Due of 12 cents, and the remaining portion of Change Due of $4 provided as cash to the consumer at the point of sale. The Change Due has been deposited electronically as part of the consumer's cash initiated transaction, and by electronically depositing the Change Due, the 12 cents contributes directly to the consumer's finances in their account.

Additional benefits from this and other embodiments follow. For example, foreign travelers, or diplomatic, business, or military individuals visiting or on assignment to a foreign country who purchase items in cash (either cash of their resident currency or cash of a foreign currency) at a point of sale in a foreign country can, with embodiments such as those described herein, have the Change Due electronically deposited into an account. In so doing, the individual can continue to aggregate funds in their account in that individual's resident currency, for example. Further, such Change Due, being that transfers thereof can be aggregated as between multiple individuals, can enjoy preferable exchange rates as a result of the volume such aggregations represent. Further still, such Change Due is more accessible in the individual's account. These and other advantages of methods and systems such as those described herein will be apparent from the discussions below in connection with FIGS. 1-20.

Example Point-of-Sale System Architecture

FIG. 1A illustrates a point-of-sale (POS) device 100 in accordance with one embodiment, which enables the electronic deposit of some or all of the Change Due as part of, for example, a cash-initiated purchase. POS device 100 includes a processor 101 electrically coupled to the modules and components of POS device 100, which include a memory 102, a network interface 103, power 104 (to which POS device 100 is electrically coupled), an input device 105, a card reader 106, a controller 107, a display 108, and a terminal identification number (TID) 109. POS device 100 also includes operating system (OS) 110 within memory 102, which supports a POS module 111 that includes a digital change module 112. Operating system 110 is communicatively coupled to the modules and components of POS device 100 through processor 101. POS module 111 and digital change module 112 are communicatively coupled to the components and modules of POS device 100 through operating system 110 and processor 101. POS device 100 is powered through power 104 that is electrically coupled to the components of POS device 100, including processor 101, memory 102, network interface 103, input device 105, card reader 106, controller 107, display 108 and TID 109.

In the presently described embodiment, processor 101 can be implemented using, for example, a MOTOROLA MC68302. Similarly, memory 102 can be implemented using, for example, 8 MB dynamic RAM (DRAM) or static RAM (SRAM). Further, network interface 103 can be implemented using, for example, an Ethernet network interface. Input device 105 can be implemented using, for example, a keypad that can include, for example, 16 programmable keys. Card reader 106 can be designed to receive account data from a card that conforms to ISO/IEC 7810, ISO/IEC 7811, ISO/IEC 7813, ISO/IEC 7816, ISO/IEC 18443, and/or derivatives and follow-on standards relating to the subject matter thereof. Controller 107 can be implemented, for example, as a USB or comparable controller and interface, while display 108 can be implemented using, for example, a backlit LCD with 8 lines of twenty characters each. In one embodiment, TID 109 is implemented using read only memory that stores a unique seven digit number to uniquely identify POS device 100, the merchant using POS device 100, and transactions processed on POS device 100.

In one embodiment, operating system (OS) 110 is implemented in software, software applications, and/or modules, although portions thereof may be implemented in hardware (e.g., firmware, programmable logic, or the like). OS 110 will therefore typically be designed and configured to provide general operational system functionality, but can also be configured to provide functionality specific to a point-of-sale environment, to POS device 100. POS module 111 is designed and configured to provide specific point-of-sale functionality to POS device 100, including, but not limited to, payment, inventory, discount, vendor procurement, rewards programs, loyalty programs and management functionality, for example.

Digital change module 112 is configured to provide digital change unique functionality, that can include one or more of recognizing a transaction as including the electronic deposit of Change Due, obtaining consumer account information, and/or initiating the electronic deposit of the Change Due. In one embodiment, digital change module 112 receives account data and an amount of Change Due from a consumer who initiated a cash purchase to enable some or all Change Due from a cash purchase transaction by a consumer to be electronically deposited in an account associated with the consumer.

The foregoing may be implemented differently in other embodiments. Processor 101 can be any processor capable of executing software instructions (or instructions compiled from or interpreted based on software). Such a processor can also include any manner of engines that execute instructions, processing, and operating with data, performing computations, sending and receiving signals to other components and modules of POS device 100, and providing overall processing functionality to POS device 100. In general, processor 101 can be any 8-, 16-, 32-, or 64-bit processor and can be of a reduced instruction set architecture (RISC) or a complex instruction set architecture (CISC).

Memory 102 can be any memory directly or indirectly accessible by processor 101. In one embodiment, memory 102 is implemented using 128 MB of FLASH memory and 32 MB of synchronous DRAM (SDRAM) memory. In other embodiments, memory 102 can be DRAM, SRAM or FLASH memory, and of any size compatible with processor 101.

Network Interface 103 is any type of interface that enables the transmission and receipt of data between POS device 100 and other devices and systems communicatively coupled to POS device 100 over a wired or wireless network. In one embodiment, network interface 103 is an Ethernet interface compatible with IEEE standards such as 802.3, 802.3z and the like, as well as derivative and/or follow-on versions thereof. In other embodiments, network interface 103 can be a bus interface, PCMCIA interface, RS-232 interface, V.90 or ADSL modem, DSL interface, or cable interface. In other embodiments, network interface 103 is a wireless interface such as a Wi-Fi or Bluetooth Low Energy (BLE) interface.

Input device 105 provides a set keys that enable a consumer to enter data into POS device 100. In one embodiment, input device 105 is a pinpad that has keys that allow user to input alphanumeric characters, keys for enter, cancel and backspace, and four programmable keys and function keys. The number of programmable keys may be any number from 1 to 81. In another embodiment, input device 105 is a keyboard that is part of a computer such as a laptop or desktop computer.

Card reader 106, in certain embodiments, includes one or more magstripe readers and EMV readers, and can receive account information from a card, which can, for example, conform to ISO/IEC 7810, ISO/IEC 7811, ISO/IEC 7813, ISO/IEC 7816 and ISO/IEC 18443 and derivatives and follow-on thereof. Card reader 106 can also receive account data from an app such as that which might be installed on a mobile phone or table through wireless transmission. In one embodiment, card reader 106 can receive data from EUROPAY MASTERCARD and VISA (EMV), near-field communication (NFC), contactless, and magnetic striper reader (MSR) cards. In one embodiment, card reader 106 operates according to Electronic Funds Transfer at Point of Sale (EFTPOS) technology. In one embodiment, data from a card is received when an MSR card is swiped through card reader 106. In another embodiment, data from a card is received when a card is inserted into an EMV slot of card reader 106. In another embodiment, data is received when a contactless card or a mobile device having an application (colloquially referred to as an "app") is located in communicative proximity to card reader 106. Alternatively, near-field communication (NFC) technology can be employed to facilitate such communications (e.g., between the point of sale, and a mobile device or subdermal chip, as our described elsewhere herein). Such NFC technology can be implemented using, for example, a set of communication protocols that enable two electronic devices. For example, such communication protocols can facilitate communications between a mobile device (e.g., a "smart phone") and a POS device, to establish communications between such devices by bringing them within a certain relatively minimal distance of one another (e.g., 4 cm (1.6 in) of each other). In such an implementation, NFC communications facilitate contactless payment, and can be referred to as NFC/CTLS (contactless) or CTLS NFC. Such NFC communications can be used to provide a low-speed connection with simple setup, which can then be used to bootstrap more robust wireless connections. As will be appreciated, such close range communications can also be effected using a number of other wireless technologies, including BLUETOOTH and WI-FI communication technology, for example.

Controller 107 is any controller enabling the interface of peripherals and other devices with POS device 100. Peripherals can include those described in FIG. 2A. In one embodiment, controller 107 is a serial controller. In other embodiments, controller 107 is a USB type controller or micro USB type controller.

Display 108 can be any type of display capable of displaying text and characters. In one embodiment, display 108 is a 2.6 inch monochrome LCD display. In other embodiments, display 108 can be a VGA or touchscreen display, a FSTN monochrome graphic display of 128×64 pixels, a QVGA TFT LCD color display of 320×240 pixels, or a STN, CSTN, DSTN, FSTN LCD or other technology based type display of larger or smaller size. TID 109 can be any memory, volatile or non volatile memory, and include any number to uniquely identify POS device 100, the merchant utilizing POS device 100 and transactions processed on POS device 100. In one embodiment TID 109 can reside in memory 102.

Operating system 110 is software that, in its execution form, is executed by processor 101 to provide system functionality to POS device 100. In one embodiment, operating system 110 is a general operating system such as Windows OS, MacOS, iOS, Linux, or Chrome OS. In other embodiments, operating system 110 can be a general operating system that operates in accordance with the Unified-POS standard, or a unique POS operating system configured for the specific hardware of POS device 100. Operating system 110 can be software that resides natively on POS device 100 or on a cloud or software as a service environment accessed by firmware in memory 102 of POS device 100, and network 103 in the case of cloud, software as a service, or other network accessible software. POS software module 111 provides point-of-sale functionality to POS device 100, such as payment, inventory, discount, vendor procurement, rewards programs, loyalty programs and management functionality. Pont of sale module 111 can be software that resides natively on POS device 100 or in a cloud or software as a service environment accessed by firmware in memory 102 of POS device 100, and network 103 in the case of cloud, software as a service, or other network accessible software.

Digital change module 112 is software that, in its execution form, is executed by processor 101 to enable some or all Change Due from a cash purchase transaction by a consumer to be electronically deposited in an account associated with the consumer (also referred to herein as the account owner). Digital change module 112 can reside natively on POS device 100 or in a cloud or software as a service environment accessed by firmware in memory 102 of POS device 100, and network 103 in the case of cloud, software as a service, or other network accessible software.

In one embodiment, POS device 100 can be a laptop computer, notebook computer, tablet, mobile device, desktop computer or server computer. In other embodiments, POS device 100 is a self check out system or a semi-attended customer-activated terminal. In another embodiment, POS device is a card terminal, payment terminal, POS terminal, EFTPOS terminal, or a Process Data Quickly (PDQ) terminal, such as those offered by organizations including VERI-FONE, INGENICO, FIRST DATA, TSYS or other such vendors, that can be communicatively coupled to a computer system to provide POS functionality.

Example Point-of-Sale Network Architecture

Figure 1B:
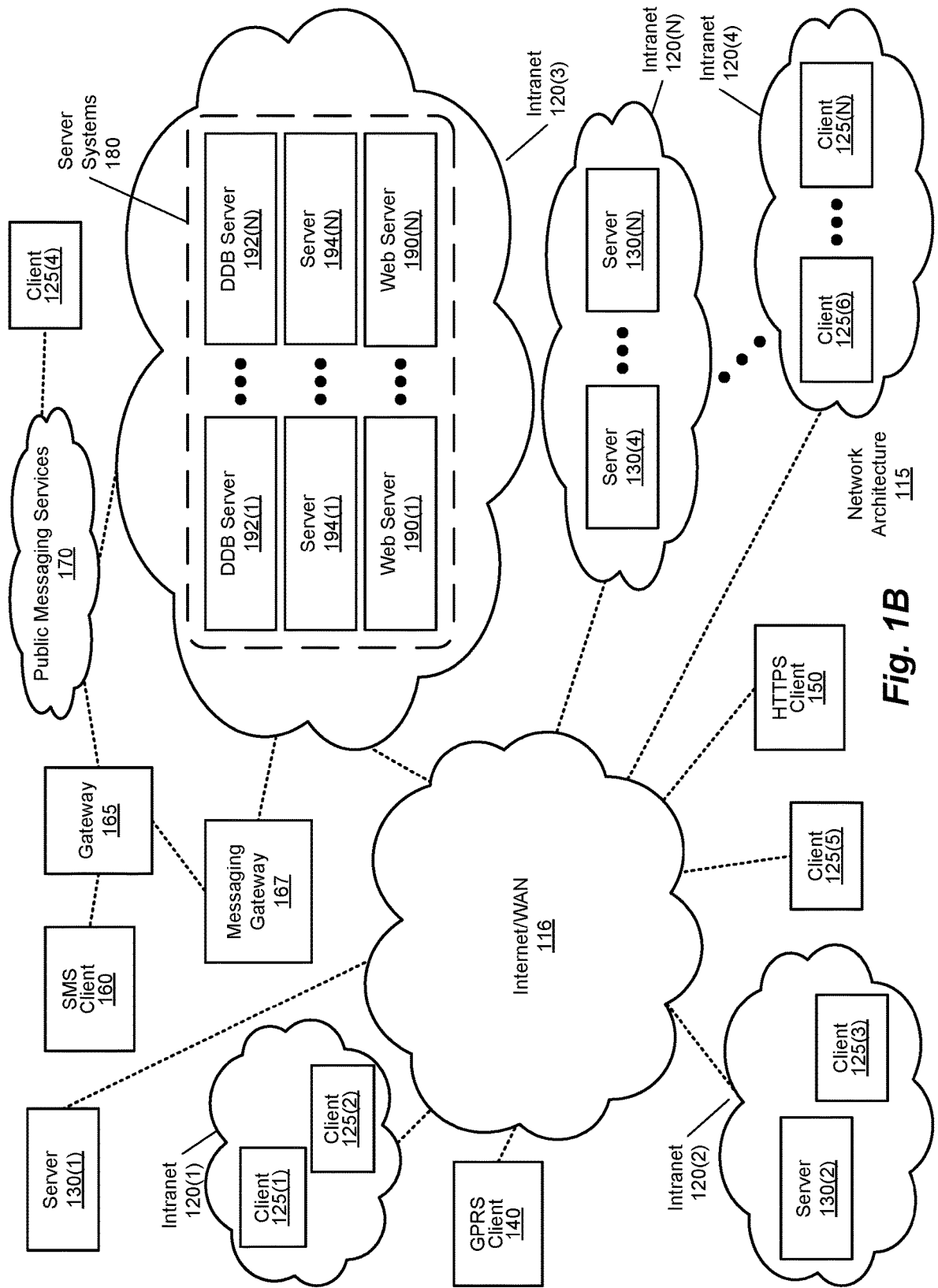
FIG. 1B is a simplified block diagram illustrating another example of a POS system, according to methods and systems such as those disclosed herein.

FIG. 1B is a block diagram illustrating an example of a network architecture 115 that includes a server system according to one embodiment. Network architecture 115 includes an internetwork (depicted in FIG. 1B as an internet/wide area network (WAN) 116), which is configured to couple a number of intranets to one another (depicted in FIG. 1B as intranets 120(1)-(N)). Intranets 120(1)-(N), in turn, can include a number of components, such as one or more clients (depicted in FIG. 1B as clients 125(1)-(N) and/or servers (depicted in FIG. 1B as servers 170(1)-(N)). Clients 125(1)-(N) and/or servers 170(1)-(N) can, for example, be implemented using computer systems such as those described in subsequently. Internet/WAN 116 thus communicatively couples intranets 120(1)-(N) to one another, thereby allowing clients 125(1)-(N) and servers 170(1)-(N) to communicate with one another (and can, in certain embodiments, provide for the servers of intranets 120(3) and 120(N), for example, to operate as cloud-based server systems). As is depicted in FIG. 1, clients 125(1)-(N) can be communicatively coupled to one another and to servers 170(1)-(N) as part of one of intranets 120(1)-(N), or directly via internet/WAN 116. Similarly, servers 170(1)-(N) can be coupled via intranet/WAN 116 via a direct connection to intranet/WAN 116, or as part of one of intranets 120(1)-(N).

Network architecture 115 also provides for communication via intranet/WAN 116 using one or more other devices. Such devices can include, for example, a general packet radio service (GPRS) client 140 (e.g., a "smart phone," a "tablet" computer, or other such mobile computing system), a secure web client (depicted in FIG. 1B as a secure hypertext transfer protocol client 150), and a basic cellular phone (e.g., using standard texting or other communication protocols, and depicted in FIG. 1B as a simple messaging service (SMS) client 160). HTTPS client 150 can be, for example, a laptop computer using the HTTP Secure (HTTPS) protocol. Support for GPRS clients, SMS clients, HTTP clients, and the like thereby provide users with communication functionality according to an embodiment in a mobile environment. As is also depicted in FIG. 1, SMS client 160 can communicate via internet/WAN 116 via several channels. SMS client 160 can communicate directly, for example, with a gateway 165, which, in turn, communicates with internet/WAN 116 via a messaging gateway 167 and, optionally, elements within intranet 120(3), for example. Alternatively, SMS client 160 can, via gateway 165, communicate with intranet 120(3) (and so, internet/WAN 116) via public messaging services 170 to which gateway 165 and intranet 120(3) are connected. As is also depicted in FIG. 1, a client 125(4) is also able to communicate via internet/WAN 116 by way of public communication services 170 and intranet 120(3). In order to support such communications, as well as other communications according to various embodiments, intranet 120(3) includes server systems 180, as well as (optionally) providing for a number of clients (not shown), in the manner of intranet 120(2).

Server systems 180 include a number of components that allow server systems 180 to provide various functionalities (e.g., supporting various communications, web-based services, cloud-based services, enterprise services, and so on). Among these components, in certain embodiments, are a number of servers, which can be implemented in hardware and/or software. Examples of such servers include web servers (depicted in FIG. 1B as web servers 190(1)-(N)), POS/digital change servers (depicted in FIG. 1B as servers 194(1)-(N)), and database servers (depicted in FIG. 1B as database servers 192(1)-(N)).

Servers such as those included in server systems 180 are designed to include hardware and/or software configured to facilitate functionalities that support operations according to the concepts disclosed herein, among other possible such components and mechanisms, in communication with one another (e.g., directly, via various application programming interfaces (APIs) and/or other such interfaces, and/or other such mechanisms and/or constructs). As will be discussed in greater detail in connection with subsequent figures, the server systems of server systems 180 provide such functionality, for example by presenting end-users with a website (functionality effected by, for example, web servers 190(1)-(N)). In so doing, web servers 190(1)-(N) present information collected, generated, organized, and maintained in one or more distributed databases (DDB) by one or more distributed database servers such as distributed database servers 192(1)-(N), under the control of one or more POS servers and/or digital change servers, such as servers 194(1)-(N). Such a website can be accessed by an end-user using a client computing device such as one or more of clients 125(1)-(N), GPRS client 140, HTTPS client 150, and/or SMS client 160. As will be appreciated in light of the present disclosure, the ability to support such functionality on mobile devices such as those described herein is of importance, as mobile electronic commerce is fast becoming an important facet of today's online environment. In providing functionality such as that described herein, network architecture 115 is able to support the identification and presentation of relevant product/service information in an efficient, effective manner.

It will be appreciated that, in light of the present disclosure, the variable identifier "N" is used in several instances in various of the figures herein to more simply designate the final element of a series of related or similar elements (e.g., intranets 120(1)-(N), clients 125(1)-(N), and servers 170(1)-(N)). The repeated use of such variable identifiers is not meant to imply a correlation between the sizes of such series of elements. The use of variable identifiers of this sort in no way is intended to (and does not) require that each series of elements have the same number of elements as another series delimited by the same variable identifier. Rather, in each instance of use, variables thus identified may represent the same or a different value than other instances of the same variable identifier.

As will be appreciated in light of the present disclosure, processes according to concepts embodied by systems such as those described herein include one or more operations, which may be performed in any appropriate order. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable storage media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with this disclosure.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system. Thus, the above described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module, for example.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable storage media. The computer readable storage media may be permanently, removably or remotely coupled to the computer system. The computer readable storage media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM or application specific integrated circuits; volatile storage media including registers, buffers or caches, main memory, RAM, and the like; and other such computer-readable storage media. In a UNIX-based embodiment, the software modules may be embodied in a file, which may be a device, a terminal, a local or remote file, or other such devices. Other new and various types of computer-readable storage media may be used to store the software modules discussed herein.

Example Architectures for Characterization of Products and/or Services

Figure 2A:
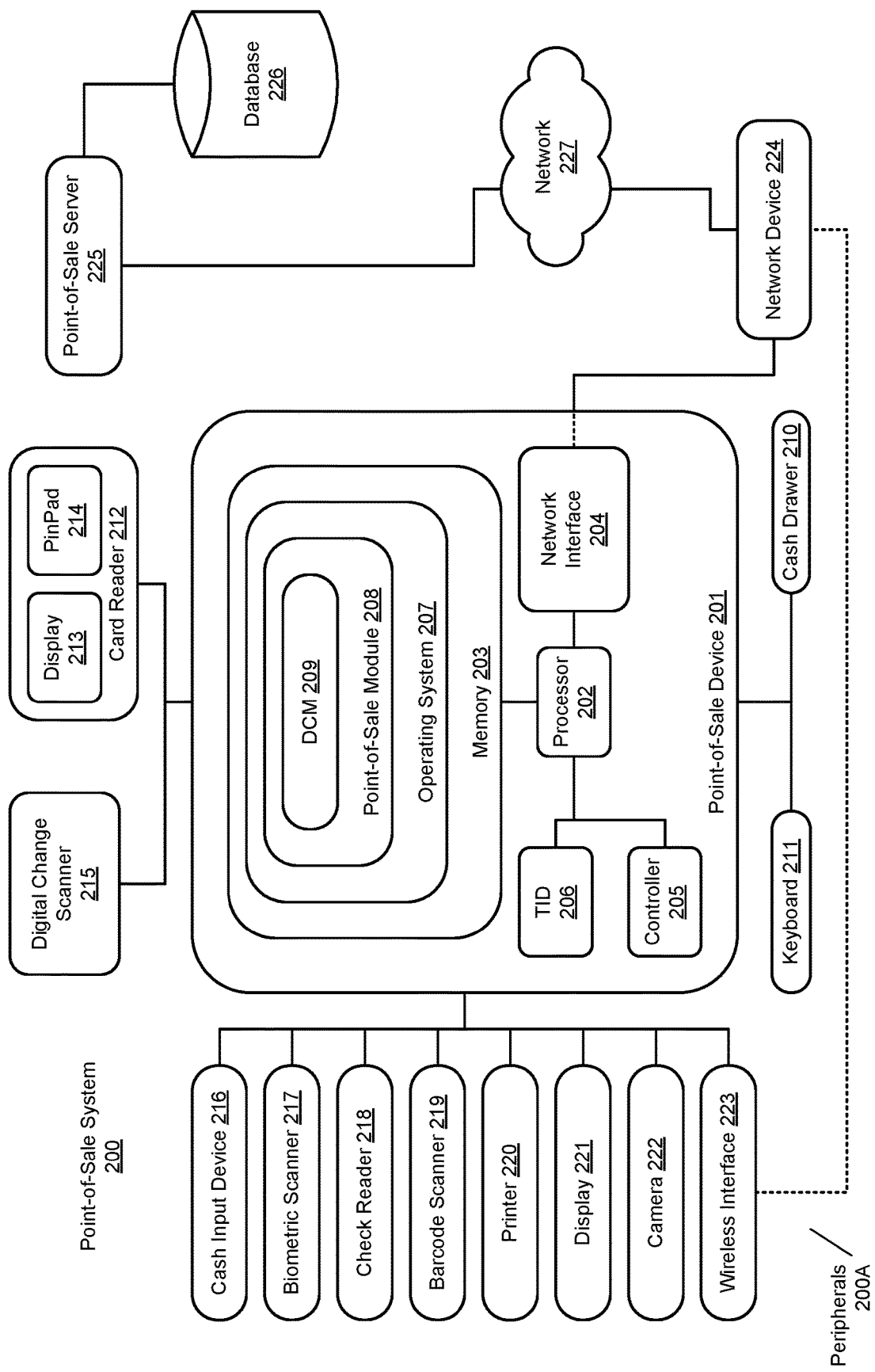
FIG. 2A is a simplified block diagram illustrating an example of a network architecture, according to methods and systems such as those disclosed herein.

FIG. 2A illustrates an embodiment of a POS system enabling the electronic deposit of an amount of Change Due to an account. FIG. 2A thus depicts a POS system 200 that includes a POS device 201. POS device 201 includes a processor 202 that is communicatively coupled to a memory 203, a network interface 204, a controller 205, and a TID 206. In the presently described embodiment, processor 202, memory 203, network interface 204, controller 205, and TID 206 are, respectively, comparable to processor 101, memory 102, network interface 103, controller 107, and TID 109 of FIG. 1A. POS device 201 also supports an operating system 207, which, in turn, supports a POS module 208 that includes a digital change module 209. Each of these modules is thus in communication with processor 202, as well as with the other modules and components and peripherals of POS system 200, such communications being possible, for example, through processor 202, network interface 204, and/or controller 205. In this embodiment, operating system 207, POS module 208, and digital change module 209 are embodiments of operating system 110, POS module 111 and digital change module 112, respectively, of FIG. 1A, as implemented in POS system 200 in accordance with the presently described embodiment.

In the presently described embodiment, POS device 201 is also capable of supporting a number of peripherals (depicted in FIG. 2A as peripherals 200A). POS device 201 is communicatively coupled to peripherals 200A, which include a cash drawer 210 and a keyboard 211. In one embodiment, cash drawer 210 is configured to store cash. Cash drawer 210 can be implemented with a securing mechanism, such as a lock, to secure the contents of the cash drawer into a housing of POS system 200. In the presently described embodiment, cash drawer 210 can be opened by an electronic signal transmitted from POS device 201, such as from processor 202 and POS module 208. In other embodiments, cash drawer 210 can be opened with a key (and/or, in other implementations, by both of these methods). Keyboard 211 facilitates the input of data to POS device 201. In the present embodiment, keyboard 211 is a 101-key QWERTY-type keyboard. As can be seen in FIG. 2A, POS device 201 can also be communicatively coupled to other peripherals (others of peripherals 200A), which, in FIG. 2A, are shown as including a card reader 212, a digital change scanner 215, a cash input device 216, a biometric reader 217, a check reader 218, a barcode scanner 219, a printer 220, a display 221, a camera 222, and a wireless interface 223.

In the embodiment depicted in FIG. 2A, card reader 212 is configured to read data from an EMV chip or a magnetic strip of a card compliant with ISO/IEC 7810, ISO/IEC 7811, ISO/IEC 7813, ISO/IEC 7816, and ISO/IEC 18443, as well as derivatives and follow-on standards-based they are on, that can be received by POS device 201. Card reader 212 can, for example, include a display 213 and a pinpad 214, and can be configured to display messages and data on display 213 and receive data input using pinpad 214. In the presently described embodiment, display 213 is a 2.6 inch monochrome LCD display. In other embodiments, display 213 can be a light-emitting diode (LED) display, an organic LED (OLED) display, or any other type of display appropriate to a POS application. Pinpad 214 can include, for example, numeric keys, function keys, and enter and cancel keys to facilitate data input to POS device 201.

Digital change scanner 215 is configured to read a digital change identifier, such as a digital change identifier such as that described in connection with FIG. 12. In one embodiment, digital change scanner 215 is a fixed or handheld barcode scanner or QR code scanner. In other embodiments, digital change scanner 215 is a wireless transceiver module. In yet another embodiment, digital change scanner 215 can be a facial recognition device.

Cash input device 216 is configured to receive cash from a consumer, the data for which can be received by POS device 201. In one embodiment, cash input device 216 includes a bill reader and coin slot.

In the embodiment depicted in FIG. 2A, biometric scanner 217 obtains biometric data from one or more sensors that present information regarding one or more biometric characteristics of a consumer that can be received by POS device 201. In one embodiment, biometric reader 217 is a fingerprint reader (also referred to herein as a fingerprint scanner, which performs a fingerprint scanning operation; moreover, that while fingerprints and thumbprints are referred to herein, the use of the term "fingerprint" is used to describe either such prints, and "fingerprint information" being, for example, digital representations of such prints). In such an embodiment, each of various ones of a consumer's fingerprints can be used not only to identify the consumer, but can, individually, be used to represent a given account associated with that consumer. For example, a consumer's right-hand thumbprint could be used not only to identify the consumer, but also to identify the consumer's savings account, while the consumer's left-hand thumbprint (in addition to identifying the consumer) could be used to identify the consumer's checking account As will be appreciated in light of the present disclosure, any number of such representations, as well as the use of combinations of thumbprints and/or fingerprints, can be envisaged in their use for identifying a wide variety of accounts. In another alternative, the thumbprint of one hand could be used to identify accounts at one financial institution (with the fingerprints of that hand identifying accounts at that financial institution), and the thumbprint of the other hand representing another financial institution (with the fingerprints of that hand identifying accounts at that financial institution).

In other embodiments, biometric reader 217 is a retinal scanner, voice recognition module, or facial recognition device. Here again, by using multiple biometric identification mechanisms, various combinations thereof can be used to allow the consumer to identify one (or ones) of a number of accounts associated with that consumer is the account(s) to receive a corresponding portion of Change Due.

Further in this regard, as to mechanisms by which a given consumer and their associated accounts might be identified, another embodiment of the present disclosure includes the use of a subdermal chip (also referred to as a microchip implant). Such a subdermal chip, in the present context, is an identifying integrated circuit device or RFID transponder encased in silicate glass and implanted in the body of a human being. This type of subdermal implant can contain a unique identifying number that can be linked to information contained in an external database, such as, in the present case, personal identification information, account information, and contact information. In so doing, such a unique identifier could be used by networked entities such as those described elsewhere herein to properly account for deposits made in this manner. Alternatively, as with certain other embodiments described herein (e.g., such as those described in connection with FIG. 12), the use of a subdermal chip could provide additional (or all requisite) information regarding the consumer and the consumer's various accounts and other information. Such might be the case, where a consumer is able to program the requisite information into the subdermal chip, as through the use of NFC communications between the consumer's mobile device (mobile computing system) and the subdermal chip in question.

Check reader 218 is configured to read the magnetic ink character recognition (MICR) line of a check, the data for which can be received by POS device 201. Barcode scanner 219 is configured to read a barcode, for example a barcode included on goods purchased by a consumer, the data for which can be received by POS device 201. In one embodiment, barcode scanner 219 is configured to read Universal Product Codes (UPC) and/or European Article Numbers (EAN). Printer 220 is configured to print a receipt that can include, for example, a merchant name, a store identifier, an item description, an item price, a subtotal, a sales tax amount, a total amount, a payment type, a cash amount, the Change Due, an amount of Change Due electronically deposited, and a cash amount of Change Due that is to be provided to the customer at the point of sale as cash. In one embodiment, printer 220 is a POS printer.

Display 221 is configured to display alphanumeric text and graphics. In one embodiment, display 221 is configured to display data from POS device 201, POS server 225, or data transmitted over network 227, and includes touch screen capabilities facilitating input of data to POS device 201 by a cashier or customer. The data displayed on display 221 can include a description of the items as they are scanned by barcode scanner 219 along with a corresponding price, a subtotal amount, a tax amount, a total amount, general merchant data, and advertisements.

Camera 222 is configured to capture video and transmit the captured video to POS device 201. The video can include video/one or more still images of a consumer utilizing POS device 201 for a purchase. Wireless interface 223 is configured to receive and transmit data wirelessly between one device, such as a mobile device or a contactless card, and another device, such as POS device 201. Wireless interface 223 provides wireless communication capabilities to POS device 201 and can be a Bluetooth, Wi-Fi, near field communication, or other wireless interface. As will be appreciated in light of the present disclosure, for purposes of interacting with a consumer's digital change card and/or mobile device, such wireless communications should be of limited range (e.g., as is provided by NFC), in order to maintain the security of such communications.

POS system also includes network device 224 communicatively coupled to POS device 201, POS server 225, database 226, and network 227. Network device 224 is configured to communicatively couple devices and systems to each other and to a network. In the presently described embodiment, network device 224 can be a router that also provides firewall and switching functionalities.

POS server 225 can be a desktop computer or server that includes POS server software and communicates with POS device 201 to provide and inventory management, accounting, mobile payment, system updates, backup, secure remote access, employee data, and reward processing functionality to POS system 200. Database 226 is a database that organizes, maintains and provides access to data transmitted, received or utilized by POS device 201 or POS server 225. In the presently described embodiment database 226 stores, or provides accessibility to, consumer account information based on a consumer identifier, such as a digital change identifier or consumer biometric data such as facial recognition data, fingerprint data, or retinal scan information. In such a case, database 226 also implements security requirements necessary to protect such biometric information. In the presently described embodiment, database 226 is a relational database. In other embodiments, database 226 can be a hierarchical database, network database, object-oriented database, or other database. Database 226 can reside on POS server 225, network accessible storage, or remotely accessible storage as part of a software as a service (SaaS) or cloud application. In the presently described embodiment, network 227 is the internet. In other embodiments, network 227 is a local area network, an intranet or a VPN network.

In one embodiment, POS system 200 can be a retail POS system. In other embodiments, POS system 200 is a self check out system or a semi-attended customer-activated terminal. In other embodiments, POS system 200 is operable as, or in conjunction with, a surveillance based POS system. In other embodiments, POS system 200 is configured to the specific transactional environment and can be a restaurant POS system, a gas POS system, a grocery POS system, a coffee POS system, a quick service restaurant POS system, a hotel POS system, a medical or hospital POS system, or transportation POS system.

Figure 2B:
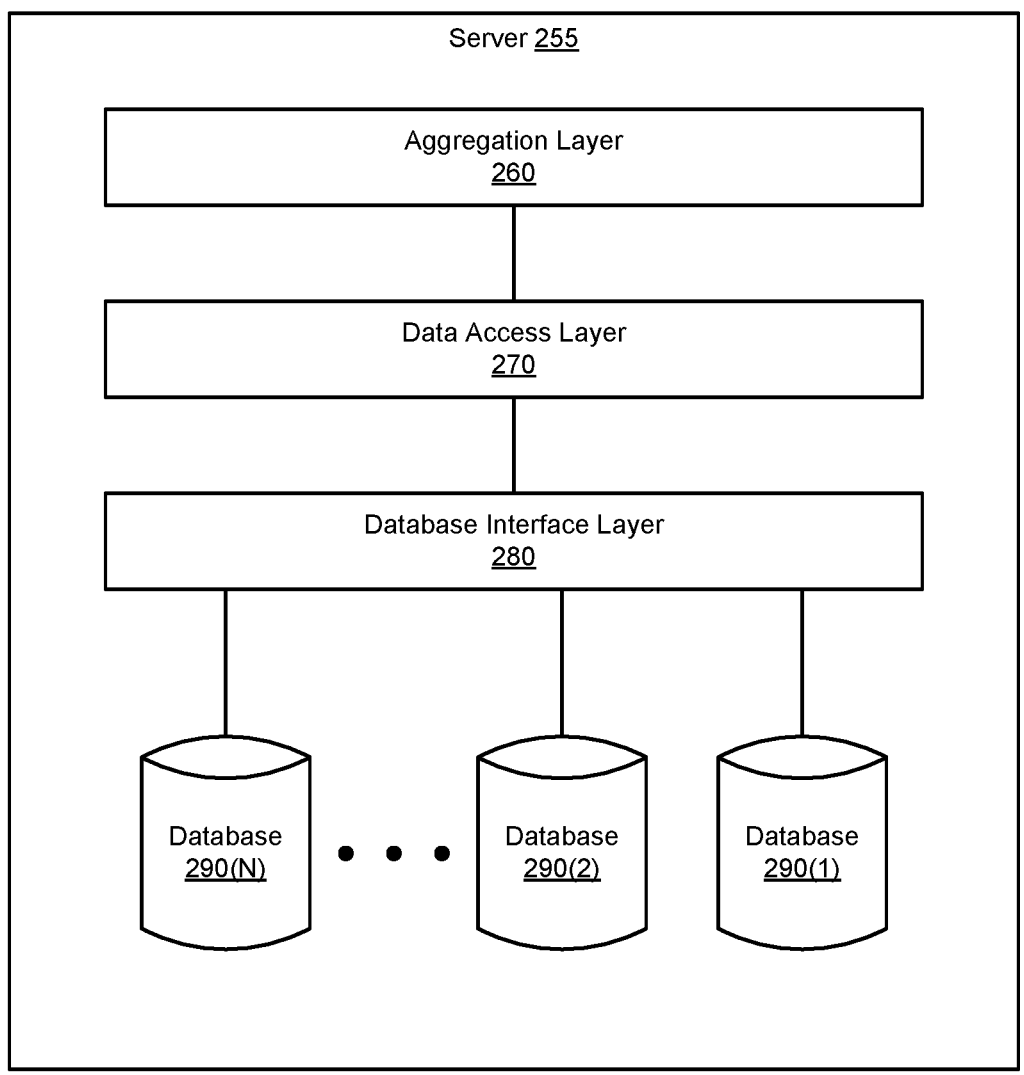
FIG. 2B is a block diagram illustrating an example of a database server architecture, according to methods and systems such as those disclosed herein.

FIG. 2B is a block diagram illustrating an example of a database server architecture, according to methods and systems such as those disclosed herein. The database server architecture of FIG. 2B (depicted in FIG. 2B as a database server architecture 250) includes a server 255. In turn, server 255 includes an aggregation layer 260, a data access layer 270, and a database interface layer 280. An aggregation layer such as aggregation layer 260 facilitates the gathering and organization of information from various information sources appropriate to the information administered and maintained by server 255 (e.g., a POS server such as those described elsewhere herein). For example, in certain embodiments, components within an aggregation layer of a POS server receive and organize information (e.g., information regarding one or more Change Due transactions and/or other such information) from one or more POS devices such as POS device 201. Such components can include, for example, modules such as transaction processing modules and the like. Similarly, components within an aggregation layer of a server (e.g., one or more of DDB servers 194 supporting a distributed database, such as, in certain embodiments, database 226) receives and organizes information regarding transactions such as those described elsewhere herein. As will be appreciated in light of the present disclosure, such aggregation layers also provide, in turn, functionality that supports distribution of information such as that maintained in the databases or their respective servers.

Situated between aggregation layer 260 and database interface layer 280 is data access layer 270, which supports storage/retrieval of aggregated data to/from one or more databases. Data access layer 270 facilitates such storage/retrieval by using a common structure to provide such aggregated data. Data access layer 270 facilitates access to such databases (depicted in FIG. 2B as databases 290(1)-(N), which are representative of database 226, for example) via database interface layer 280. Database interface layer 280 facilitates communication of aggregated data using the common structure of databases 290(1)-(N) in a structure appropriate to each of databases 290(1)-(N). As noted, and with particular regard to the discussion of FIGS. 1B and 2A, an arrangement such as database server architecture 250 can be used in the implementation of servers such as POS server 225 and a database server (or servers) in support thereof. To this end, an aggregation layer such as aggregation layer 260 supports the collection of information from multiple sources (e.g., multiple ones of POS device 201), and provides such information for storage in a respective database, via a data access layer such as data access layer 270 (which produces aggregated data in a common structure for storage, and receives data in the common format when retrieving such data) and a database interface layer such as database interface layer 280 (which takes in the aggregated data in the common structure and produces data in a structure appropriate to the database into which the data is to be stored, and conversely, provides data in the common structure when retrieving such data). Such an architecture, in turn, supports the retrieval of such data using the converse process, as noted. Further, server systems such as POS server 225 are able to support multiple processing modules (e.g., multiple ones of POS module 208, and by extension, multiple ones of DCM 209), and so permit support for simultaneous interactions with multiple POS systems in parallel.

Figure 3:
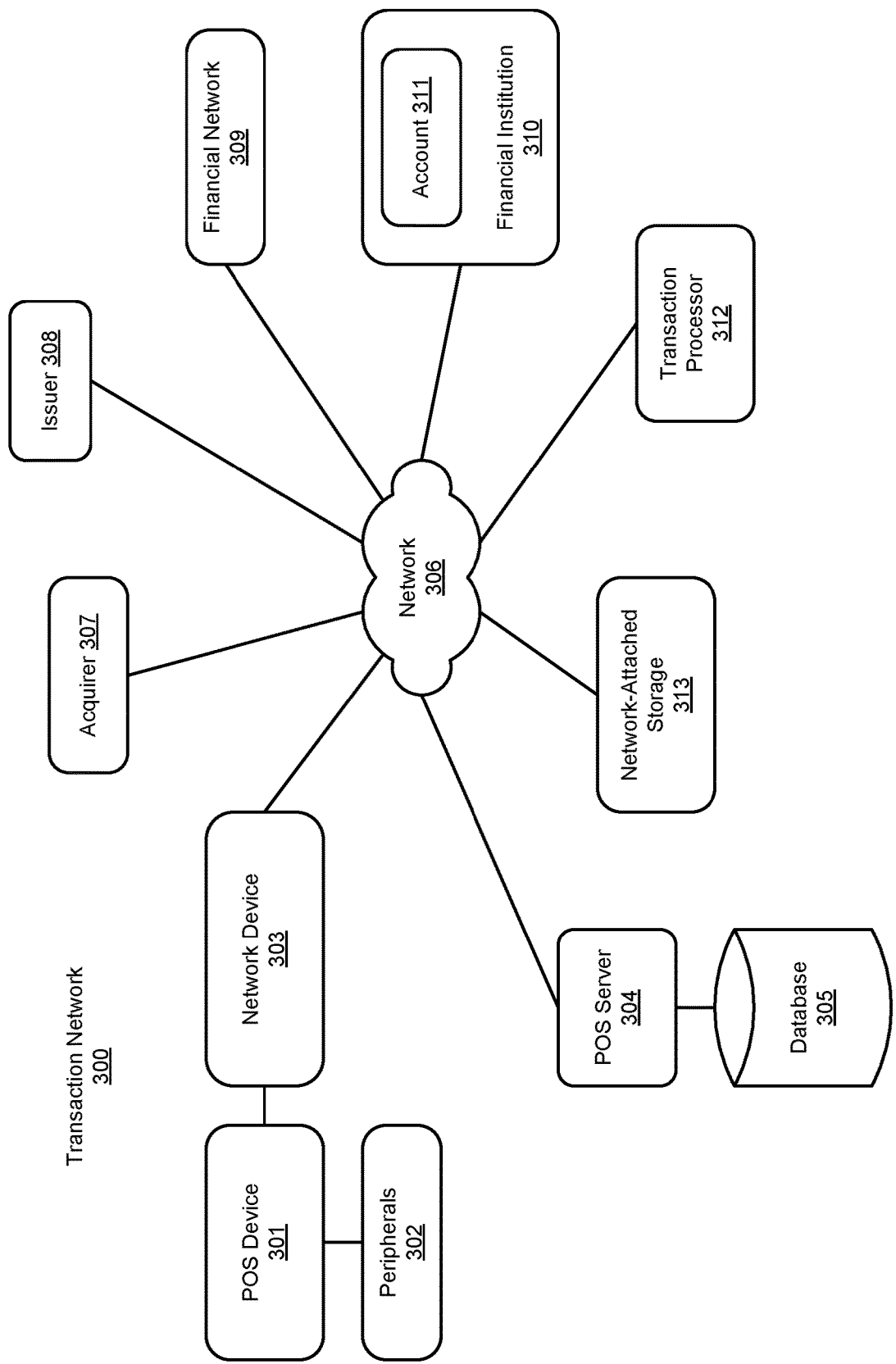
FIG. 3 is a simplified block diagram illustrating an example of a transaction network, according to methods and systems such as those disclosed herein.

FIG. 3 illustrates a transaction network 300 that includes a POS device 301, such as that described in connection with POS device 201 of FIG. 2A. POS device 301 is communicatively coupled to peripherals 302 and a network device 303. Peripherals 302 can include one or more peripherals, such as those described in connection with FIG. 2 as peripherals 200A. Transaction network 300 is also depicted in FIG. 3 as including a POS server 304 and a database 305, to which POS device 301 is communicatively coupled (at network device 303) by a network 306. As will be appreciated in light of the present disclosure, POS server 304, database 305, network device 303, and network 306 are further examples of various of the components depicted in FIG. 2A, including POS server 225, database 226, a network device 224, and network 227, respectively. As will also be appreciated in light of the present disclosure, while various of the components and entities of transaction network 300 are depicted in FIG. 3 as communicating only with network 306, such depiction is intended to simply convey the ability of such components and entities to communicate with one another, and so is intended to comprehend communication between various ones thereof.

Transaction network 300 also includes various other components and entities (along with components supporting those entities). In the embodiment depicted in FIG. 3, transaction network 300 includes an acquirer 307, an issuer 308, a financial network 309, a financial institution 310, a transaction processor 312, and network-attached storage (NAS; depicted in FIG. 3 as a network-attached storage (NAS) device 313). Acquirer 307, issuer 308, financial network 309, financial institution 310 (e.g., a bank, credit union, savings and loan, or other such financial institution), transaction processor 312, and network-attached storage 313 individually and collectively provide the requisite technology, network, and financial mechanisms to enable the processing, authorization, and settlement of financial transactions between a merchant and a consumer, or between commercial entities involved therein, using POS device 301. In the presently described embodiment, acquirer 307, issuer 308, financial network 309, financial institution 310, transaction processor 312, and network-attached storage 313 are communicatively coupled to one another via network 306. It will be understood that acquirer 307, issuer 308, financial network 309, financial institution 310, and transaction processor 312 are each intended to represent not only the given entities, but also the devices, software, and networks belonging thereto that facilitate such communications and functionality.

In one embodiment, acquirer 307 is an entity such as a bank or other financial institution, which performs functions such as financially and operationally linking merchants to card networks, including financial network 309 and one or more issuers (e.g., one or more of an issuer such as issuer 308). In addition, acquirer 307 can maintain a merchant account and settle funds with respect to the merchant account for sales transactions processed at a merchant location utilizing POS device 301. Acquirer 307 can collect transaction fees charged to merchants, and distribute fees to entities associated with purchases over transaction network 300.

Issuer 308 is an entity, such as a bank or other financial institution, that issues credit cards, debit cards, rewards cards, loyalty cards, apps providing equivalent functionality to such cards, and the like to consumers and maintains consumer accounts associated with the cards. Issuer 308 and acquirer 307 settle transactions with/on behalf of consumers and merchants with respect to the consumer accounts and merchant accounts maintained by, or on behalf of, the respective entities of issuer 308 and acquirer 307. With respect to credit cards, for example, issuer 308 extends a line of credit to a consumer that may be accessed with an issued and valid credit card. With respect to debit cards, issuer 308 provides and maintains a financial account such as a savings or checking account, a consumer's funds deposited in which may be accessed using the debit card. With respect to a rewards cards and loyalty cards, issuer 308 provides and maintains a rewards account or loyalty account for a consumer that may be accessed using the rewards card or loyalty card. With respect to apps, issuer 308 provides, or has provided on its behalf, software that contains data permitting transactions to take place with respect to accounts maintained by or on behalf of issuer 308.

Financial network 309 is a network of issuers, such as issuer 308 and one or more acquirers (e.g., one or more acquirers such as acquirer 307), that have established technology, hardware, and financial protocols to enable the processing, authorization, and settlement of transactions utilizing POS device 301. Financial network 309 can be a network of credit card companies or credit card associations such as VISA, MASTERCARD, DISCOVER, OR AMERICAN EXPRESS card networks. Financial network 309 can also be a network that processes and/or settles wire, ECHECK, CHECK 21, Automated Clearing House (ACH), or other comparable type of transactions. Financial network 309 can also be a network for digital based currencies. Financial network 309 can also be a card network for signature based debit cards such a NYCE, PULSE, MAESTRO, INTERLINK, and CIRRUS networks. Financial network 309 can also be a card network associated with pin debit cards.

Financial institution 310 can be a bank, credit union, or other such financial institution that, among other services, provides an account 311 for a consumer, such as a checking account or a savings account that the consumer may deposit money into, or withdraw money from. In the presently described embodiment, account 311 is a checking account on which a consumer can write checks against the funds in account 311, and may also deposit funds into, or have funds deposited into, account 311, utilizing an electronic deposit methodology, such as mobile check deposit, electronic check deposit, electronic funds transfer (EFT), ACH processing, or other deposit methodology as described herein or as may be otherwise available in the financial services industry.

Transaction processor 312 provides services for the processing of transactions utilizing POS device 301 such as securely routing a transaction to acquirer 307 and issuer 308 to determine whether account data is valid, whether sufficient funds are available for the transaction, and routing data, such as an authorization code, back to POS device 301. Transaction processor 312 also provides the functionality to settle the transaction between acquirer 307 and issuer 308 or between a merchant account and a consumer account.

Network-attached storage 313 includes one or more storage devices, along with one or more databases stored therein, that can be read from or written to by authorized devices and systems by way of network 306, such as POS device 301, as well as the devices, software, and networks of acquirer 307, issuer 308, financial network 309, and transaction processor 312. The databases stored in the storage devices of network-attached storage 313 can include a relational database, hierarchical database, distributed database, or object-oriented database, or a complex of databases. In one embodiment, network-attached storage 313 stores, or provides access to, consumer account information based on a consumer identifier, such as a digital change identifier or consumer biometric data such as facial recognition data, fingerprint data, or retinal scan information, and implements security requirements necessary to protect such biometric information.

Figure 4A:
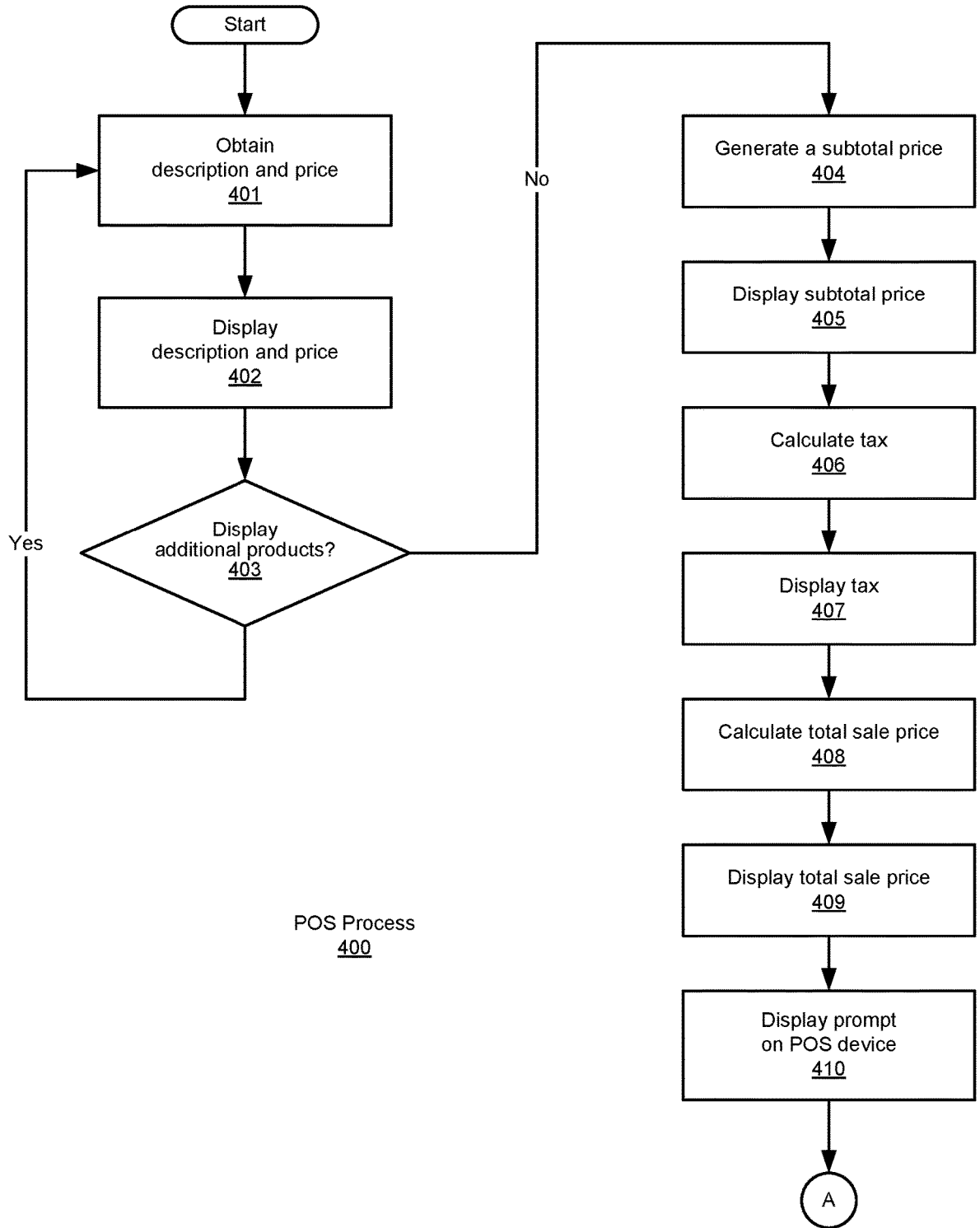
FIG. 4A is a simplified flow diagram illustrating an example of operations performed in a first portion of a POS process, according to methods and systems such as those disclosed herein.
Figure 4B:
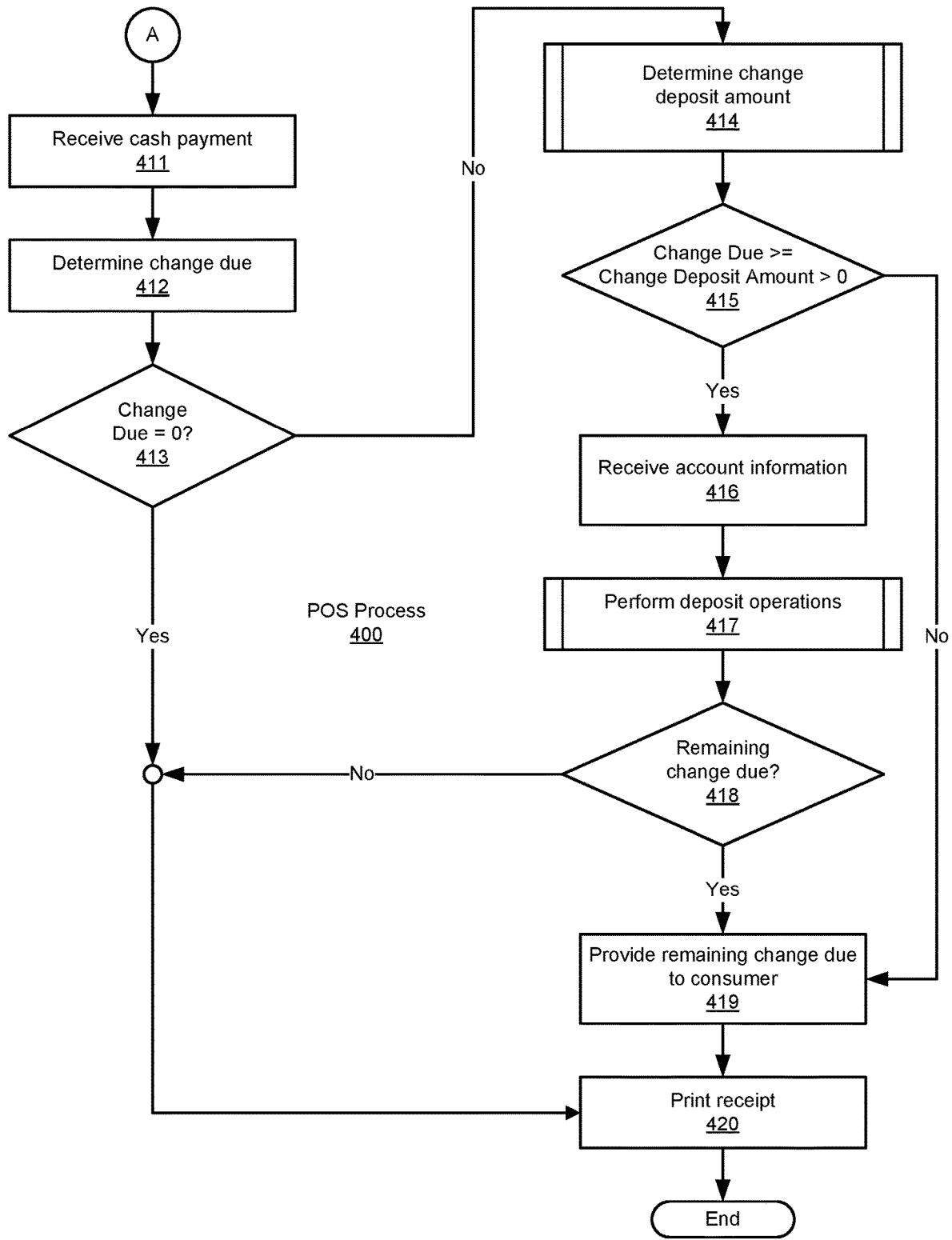
FIG. 4B is a simplified flow diagram illustrating an example of operations performed in a second portion of a POS process, according to methods and systems such as those disclosed herein.

Example Processes for the Provision of Digital Change in the Purchase of Products and/or Services FIGS. 4A and 4B illustrate a process in accordance with an embodiment, carried out by an embodiment of POS device 201, for example, that enables the electronic deposit of Change Due to an account, such as account 311, where the Change Due is from a purchase transaction in which the consumer initiates payment in cash. FIGS. 4A and 4B thus illustrate a POS process 400 that reflects examples of operations that can be performed in effecting such a method.

POS process 400 begins with obtaining a description and price of a good or service (401). In one embodiment, this is accomplished by way of reading a barcode using barcode scanner 219, which, for example, can scan a UPC or EAN code on an item and transmitting the data from the UPC or EAN code to a POS module such as POS module 208. Such a POS module can utilize the data to obtain the corresponding price from computer memory or computer storage, such as memory 203, database 226, or network-attached storage 313. In other embodiments, the price can be obtained by a cashier entering the price on keyboard 211, or a touchscreen display (e.g., display 221, when implemented as a touchscreen display). Next, the POS module displays the item description and price data for the item on the touchscreen display (402).

The POS module then waits for additional items to be scanned (403), indicating that there are additional items to be purchased (and the aforementioned description and price displayed). In one embodiment, the POS module waits by looping until an item is scanned or until an indication is received that the scanning of items is complete. If there are additional products to be purchased, POS process 400 repeats the aforementioned obtaining and displaying for each such item (401, 402, 403).

At the point at which a determination is made that no additional items are being purchased, a subtotal price is calculated by the POS module (404). In the presently described embodiment, a cashier or consumer provides data to the POS module to indicate that there are no additional items are to be purchased by, for example, selecting an icon, such as a "pay now" icon on the touchscreen display, or pressing a key, such as a total key, on the POS device's keyboard. The subtotal price is calculated by the POS module by adding the prices of each item. In another embodiment, the subtotal is calculated as each item is scanned (and so, as a running total), by adding the price of each item to the running total as the item is scanned. If there is only one item being purchased, then the subtotal price is the single price of the item. The POS module displays the subtotal price on the touchscreen display (405).

The tax is calculated by the POS module (406) and displayed on the touchscreen display (407). In one embodiment, the tax is calculated by the POS module multiplying a tax rate with the subtotal. A total sale price is then calculated by the POS module (408). In one embodiment, the total sale price is calculated by the POS module adding the tax to the subtotal price. The POS module then displays the total sale price on the touchscreen display (409).

The POS module causes a message to be displayed in the touchscreen display, which prompts the consumer for payment (410). As will be appreciated in light of the present disclosure, this message can be displayed on any display of the POS device. In one embodiment, the message displayed is "Swipe or Insert Card" or "Provide Payment". In another embodiment, the total sale price is displayed along with message of "Total Amount Due". At this juncture, in the context of FIGS. 4A and 4B, POS process 400 proceeds, via connector "A", from FIG. 4A to FIG. 4B.

The POS module then receives data representing the amount of cash paid by the consumer (411). In one embodiment, the cash is received by a cashier who then inputs the amount of cash received by way of the POS device's keyboard. In another embodiment, the cash is received from a cash input device of the POS device, as part of a self check out process.

A determination is then made as to whether any change is due to the consumer (412). The POS module calculates the amount of Change Due to the consumer by subtracting the total sale price from the amount of cash received. If there is no Change Due, then a receipt is printed (420) and the transaction is complete. That being the case, POS process 400 then concludes.

Alternatively, if there is Change Due (413), an amount of the Change Due to be electronically deposited ("Change Deposit Amount") is determined by a digital change module such as that described elsewhere herein (414). As will be appreciated in light of the present disclosure, the term "Change Deposit Amount" refers to the amount of Change Due that is to be electronically deposited into an account.

Examples of the manner in which such determinations can be made are described in further detail in connection with various the subsequent figures. For example, in one embodiment, as illustrated in connection with the description of FIG. 5, the Change Deposit Amount is determined to be the non-whole bank note portion of the Change Due (e.g., the cents portion of the Change Due, in a USD-denominated currency, for example the tenths and hundredths places of the Change Due). In another embodiment, as illustrated in connection with the description of FIG. 6, the Change Deposit Amount is entered by the consumer utilizing an input device of the POS system, or entered by a cashier. In another embodiment, the Change Deposit Amount is determined to be any amount of Change Due that a cashier or self check out system is unable to provide to the consumer. For example, if the Change Due is USD $3.12 and there is insufficient cash in the cash drawer associated with the POS system, to provide $3, then the Change Deposit Amount is $3. In another embodiment, the Change Deposit Amount is equal to the full amount of Change Due. In still another embodiment, Change Deposit Amount is a standard percentage of the Change Due that is configured by the consumer using a centralized account configuration portal, such as a digital change web portal (e.g., such as that illustrated in FIG. 17 and described in connection therewith). For example, if a consumer desires to save 10% of all Change Due for any transaction the consumer conducts, the Change Deposit Amount is 10% of the Change Due.

Next, a determination is made by the digital change module as to whether the Change Deposit Amount is within an acceptable range (415). For example, if the Change Deposit Amount is greater than the Change Due, or is not greater than zero, then the Change Deposit Amount is out of range. In this case, no Change Due is electronically deposited (i.e., the Change Deposit Amount is set to zero), and remaining Change Due calculated by the POS module is provided to the consumer at the point of sale (419). Alternatively, if the Change Deposit Amount is less than or equal to the Change Due and is greater than zero, then the Change Deposit Amount is within in an acceptable range and POS process 400 proceeds. In another embodiment, if the Deposit Amount is out of range portions of POS process 400 can be repeated for some number of times to re-determine the Change Deposit Amount.

In the case in which the Change Deposit Amount is within in an acceptable range (415), the digital change module receives the account information identifying the account (e.g., account 311) to which the Change Deposit Amount is to be electronically deposited (416). The term "Change Account" refers to information that identifies the account into which the Change Deposit Amount is to be electronically deposited. In another embodiment, such Change Account information includes one or more of an account number, financial institution name, routing number, consumer name, and account type, among other such possible pieces of information.

As will be appreciated in light of the present disclosure, any one of a number of approaches can be used to obtain the requisite account information. For example, in one embodiment, the Change Account information is received in response to the consumer swiping or inserting a digital change enabled card, such as that described in connection with FIG. 10, through/into a card reader. In yet another embodiment, the digital change module identifies the given card as a digital change enabled card using information read from the EMV chip and magnetic stripe, and the Change Account is the account identified by, or associated with the data read from the EMV chip and magnetic stripe of the digital change card, such as the primary account number described in connection with FIG. 10. In still another embodiment, the Change Account is read from a credit card via the card reader, in which case the Change Account is the consumer's credit card account, or is associated with the consumer's credit card account. In another embodiment, the Change Account is read from a debit card via the card reader, in which case the Change Account is the consumer's debit card account, or is associated with the consumer's debit card account. In another embodiment, the Change Account is read from a rewards card via the card reader, in which case the Change Account is the consumer's reward account, or is associated with the consumer's reward account. In yet another embodiment, the Change Account is read from a loyalty card via the card reader, in which case the Change Account is the consumer's loyalty account, or is associated with the consumer's loyalty account. In still another embodiment, the Change Account is entered by way of the POS device, such as on a display, a keyboard, or a pinpad of POS device, in which case the Change Account is the account entered, or the account associated with the account entered. In another embodiment, the Change Account is obtained utilizing a digital change scanner, such as digital change scanner 215 of FIG. 2A, which scans a digital change identifier from a consumer mobile device. In other embodiments, the Change Account is determined by an entity such as an acquirer, issuer, financial network, or transaction processor, from the data transmitted by the digital change module.

Further, in another embodiment, the Change Account is provided to the digital change module from account and biometric data stored, for example, in a network-attached storage device or a database, and is obtained from consumer biometric data, such as a fingerprint, facial recognition, or retinal scan, received from a biometric reader or a digital change scanner. For example, a biometric scanner can be designed to perform facial recognition scans of consumers shopping in a store, and the respective consumer's account information obtained from a database or other such source of information, based on the respective facial recognition data. Having obtained the requisite biometric recognition data, the digital change module can determine the Change Account associated with the biometric data using information retrieved from a network-attached storage or a database. Moreover, as discussed earlier herein, the consumer can be given the opportunity to identify one (or more) of a number of accounts using one or more of their thumbprints and/or fingerprints, either alone or in combination with one (or more) of the techniques noted above.

Next, the digital change module initiates the electronic deposit of the Change Deposit Amount to the Change Account (417). Examples of processes for the electronic deposit of the Change Deposit Amount to the Change Account are described in further detail in connection with various the subsequent figures, including FIGS. 7 and 11.

A determination is then made by the digital change module as to whether there is Change Due remaining to be provided to the consumer (418). This can be done, for example, by subtracting the Change Deposit Amount from the Change Due. If there is remaining Change Due to provide to the consumer, then cash for the remaining Change Due is provided to the consumer (419). In one embodiment, the remaining Change Due is provided by the cashier to the consumer at the point of sale. In another embodiment, the remaining Change Due is provided by a cash dispensing module of a self checkout system at the point of sale. If there is no Change Due remaining to be provided to the consumer, or any remaining Change Due has been provide to the consumer, a receipt is printed and the transaction is complete (420).

A printer of the POS device prints a receipt of the transaction. In one embodiment, the receipt includes the merchant name, a store identifier, an item description, an item price, a subtotal, applicable sales tax, a total amount, a payment type, the cash amount received, the Change Due, the amount of Change Due electronically deposited, and the cash amount of Change Due provided to the customer at the point of sale in cash. In another embodiment, a balance of the Change Account is also printed on the receipt. At this juncture, the transaction is complete and POS process 400 concludes.

As will be appreciated in light of the present disclosure, such a process is merely exemplary, as are those discussed elsewhere herein. That being the case, alternatives discussed in connection with each such process, as well as others, will be apparent in light of the present disclosure, and are intended to come within the scope thereof.

Figure 5:
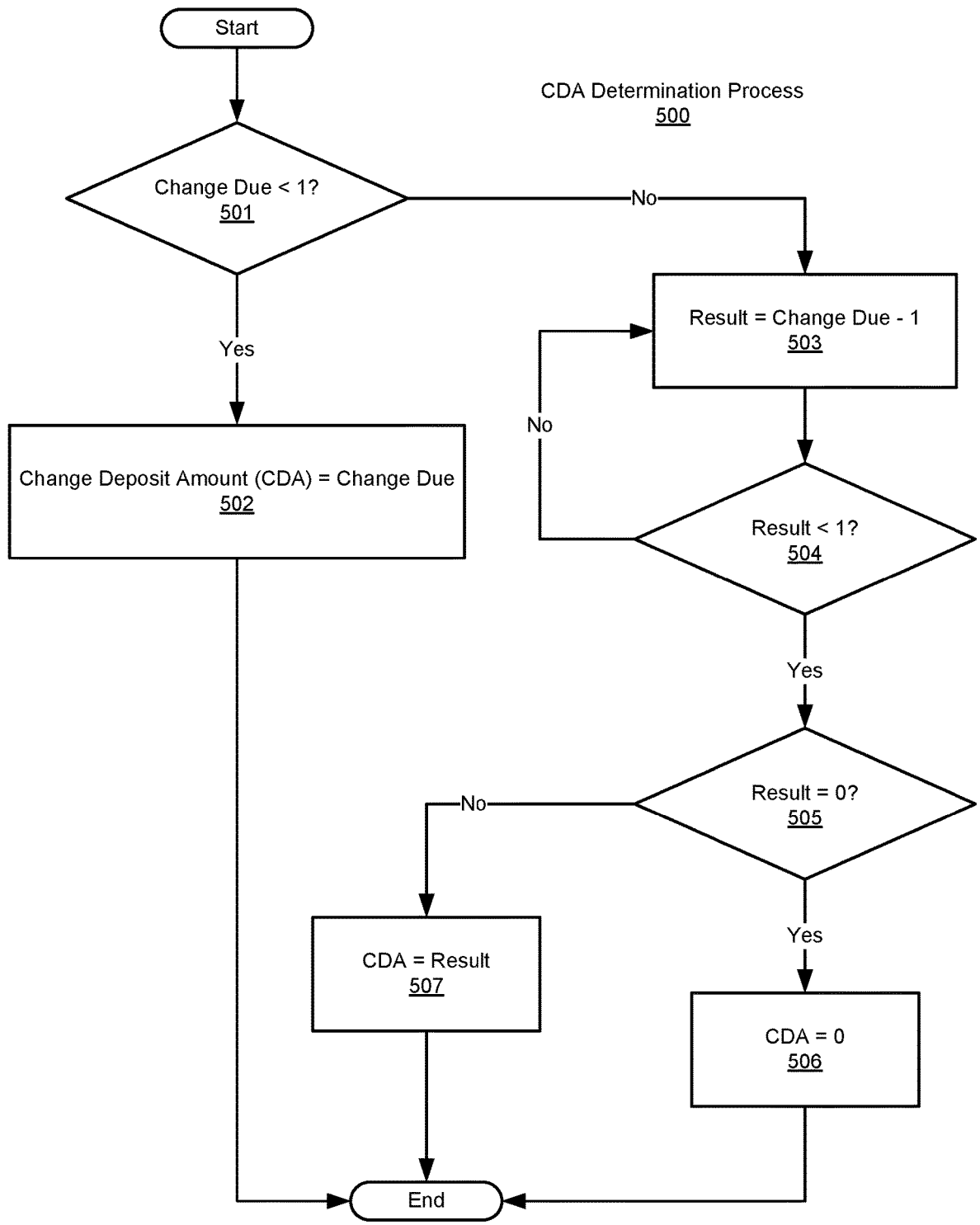
FIG. 5 is a simplified flow diagram illustrating an example of operations performed in determining a deposit amount, according to methods and systems such as those disclosed herein.

FIG. 5 illustrates a method in accordance with an embodiment that determines, for example, the Change Deposit Amount (CDA) from the Change Due, as a fractional portion of a unit of currency. Such a process, depicted in FIG. 5 as a CDA determination process 500, can be performed by a digital change module such as that described elsewhere herein, for example. Expressed another way, the Change Deposit Amount in such a case is the value of the tenths and the hundredths places of the Change Due in USD. In such an embodiment, if the Change Due is USD $1.24, then the Change Deposit Amount is USD 24 cents, for example. As another example, if the Change Due is USD $0.89, then the Change Deposit Amount is USD 89 cents. One of the advantages to such embodiments being that when a consumer purchases items with cash, coins that would otherwise be provided as part of the Change Due need not be physically provided or dispensed back to the consumer at the point of sale. Instead, such portion is instead deposited into selected one(s) of the consumer's account(s).

As will be appreciated in light of FIG. 5, CDA determination process 500 is described with respect to operations such as those described in connection with FIG. 4. In so doing, CDA determination process 500 can be implemented, or coded, in-line with POS process 400, or implemented as one or more separate modules, and so as a program, function, subroutine or other similar type of program called by a function call, subroutine call, or other program type call from other processes such as POS process 400.

CDA determination process 500 begins with a comparison of the Change Due the value of "1" (that being, for purposes of this example, the smallest possible denomination of physical currency to be provided as Change Due) (501). If the Change Due is less than one, then the Change Deposit Amount is equal to the value of the Change Due (502). With the Change Deposit Amount thus determined, CDA determination process 500 concludes.

Alternatively, if the value of the Change Due is one or greater (501), CDA determination process 500 proceeds with producing a result by subtracting the minimum provided Change Due value (e.g., one unit of physical currency) from the Change Due (503). A determination is then made as to whether the result has a value of less than "1" (504). The aforementioned subtraction can be continued until the result in question has been reduced to a fraction of one unit of physical currency (or zero) (503 and 504). At this point, a determination is made as to whether the resulting value of the result is equal to zero (505). If the result is equal zero, then the Change Deposit Amount is zero (506). At this juncture, CDA determination process 500 concludes. Alternatively, if the result is not equal to zero (and so is a fractional portion of one unit of physical currency), the CDA is set to the value of the result (507).

Figure 6A:
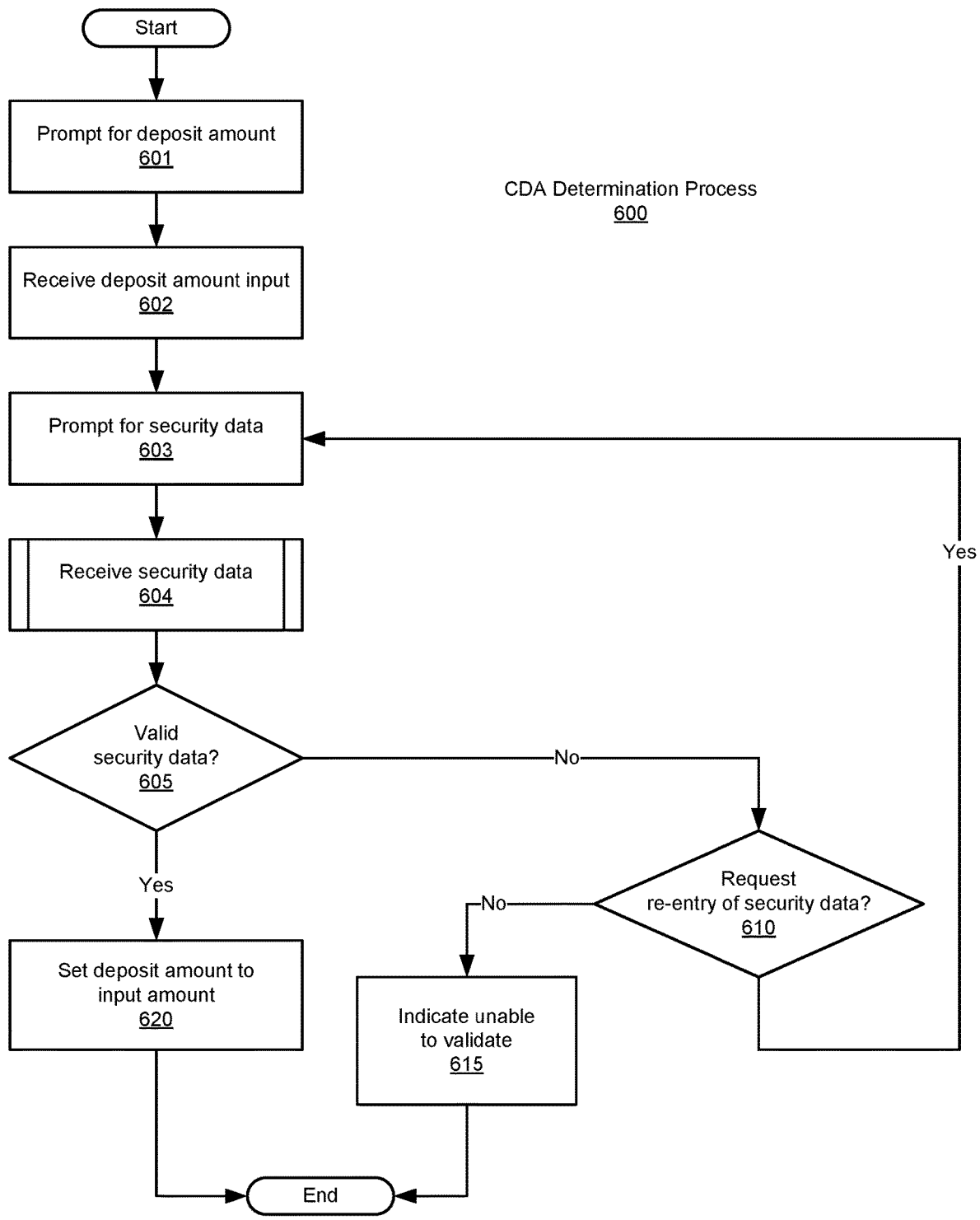
FIG. 6A is a simplified flow diagram illustrating another example of operations performed in determining a deposit amount, according to methods and systems such as those disclosed herein.

FIG. 6A illustrates a method in accordance with an embodiment that determines, for example, the Change Deposit Amount (CDA) using an amount entered by a consumer. Such a process, depicted in FIG. 6A as a CDA determination process 600, can be performed by a digital change module such as that described elsewhere herein, for example.

As with the operations described in connection with FIG. 5, CDA determination process 600 is described with respect to operations such as those described in connection with FIG. 4. In so doing, CDA determination process 600 can be implemented, or coded, in-line with POS process 400, or implemented as one or more separate modules, and so as a program, function, subroutine or other similar type of program called by a function call, subroutine call, or other program type call from other processes such as POS process 400.

As depicted in FIG. 6A, CDA determination process 600 begins with the display of a message on a display of the POS device in question. This prompts a consumer to enter an amount of Change Due to be electronically deposited. Messages, prompts and/or other information are displayed to a consumer in this manner on a display of the POS device (601). Next, the amount of Change Due to be electronically deposited is received (e.g., as by entry of such an amount by a consumer on a keyboard of the POS device) (602). Data entered by a consumer is received, for example, by the digital change module of the POS device, and so can be entered on a pinpad, touchscreen display, or keyboard of the POS device. Next, a message is displayed that prompts the consumer to enter security data, such as a personal identification number (PIN) (603). In response, a consumer can enter a PIN, though in other embodiments, biometric data of a consumer can be used by way of a biometric reader such as that described elsewhere herein (604). In example of the latter process is described in greater detail in connection with FIG. 6B, subsequently.

The security data thus obtained can then be compared with authenticated security data obtained from a database, such as that described elsewhere herein, or a database associated with the consumer at an issuer or a transaction processor, or stored in a network-attached storage device (605). If the security data obtained from the consumer at the point of sale is not valid, a determination is made as to whether the re-entry of security data is to be requested (610). If re-entry of the security data is to be requested, CDA determination process 600 loops to prompting the consumer for (re-entry of) the security data (603). In this case, a message can be displayed notifying the consumer that re-entry is needed, as part of prompting the consumer for re-entry of the security data. Alternatively, if reentry of security data is not permitted (or has exceeded a maximum number of attempts), an indication can be made as to the POS system's inability to validate the consumer's security data (615). At this juncture, CDA determination process 600 concludes. However, if the consumer has entered valid security data (605), the Change Deposit Amount is set to the amount entered by the consumer (620). At this juncture, CDA determination process 600 concludes.

Figure 6B:
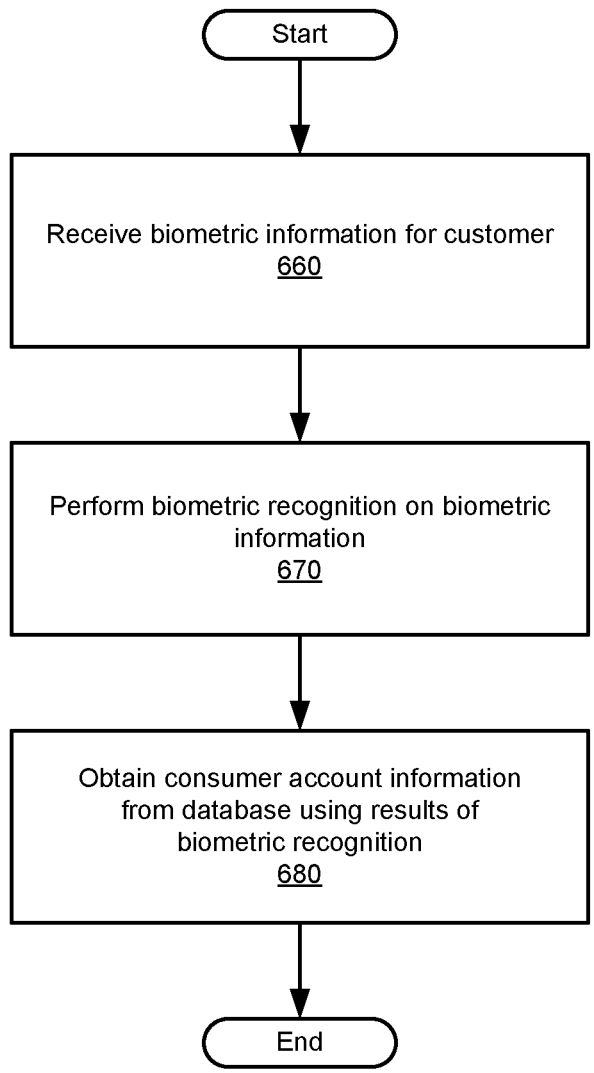
FIG. 6B is a simplified flow diagram illustrating yet another example of operations performed in analyzing security data in order to verify a customer's identity, according to methods and systems such as those disclosed herein.

FIG. 6B illustrates a method in accordance with an embodiment that illustrates a method of obtaining consumer account information based on biometric recognition data (e.g., produced by methods such as facial recognition, fingerprint recognition, or the like), based on physical characteristics of the consumer. That being the case, FIG. 6B depicts a biometric recognition process 650 that begins with the receipt of biometric information regarding the customer in question (660). As noted elsewhere herein, such biometric information can be gathered using, for example, a facial recognition scanner, such as biometric scanner 217 or digital change scanner 215. In the case of facial recognition, a facial recognition scanner can be used to perform a facial recognition scan of a consumer. In one embodiment, one or more facial recognition scanners communicatively coupled to a POS device, such as POS device 201, are strategically placed throughout an area and continuously scan consumers' faces as they are shopping. In another embodiment, one or more facial recognition scanners communicatively coupled to a POS device, such as POS device 201, are strategically placed in a specific area of the store associated with payment or checkout, and scan consumers' faces as part of a checkout process. Once the requisite biometric information has been obtained, a digital change module such as digital change module 209 of FIG. 2A is invoked and utilizes the facial recognition data to obtain account information associated with the consumer (670). Such account information can be obtained by the digital change module from a database or network-attached storage, such as database 226 or network-attached storage 313, respectively. In one embodiment, the account information includes one or more of a bank name, an account number, a routing number, a consumer name, and an account type. The account information can be utilized by a POS module, such as POS module 208, to process payment of items to be purchased by the consumer or utilized by a digital change module to deposit change due from a cash purchase by the consumer into the account.

Figure 7:
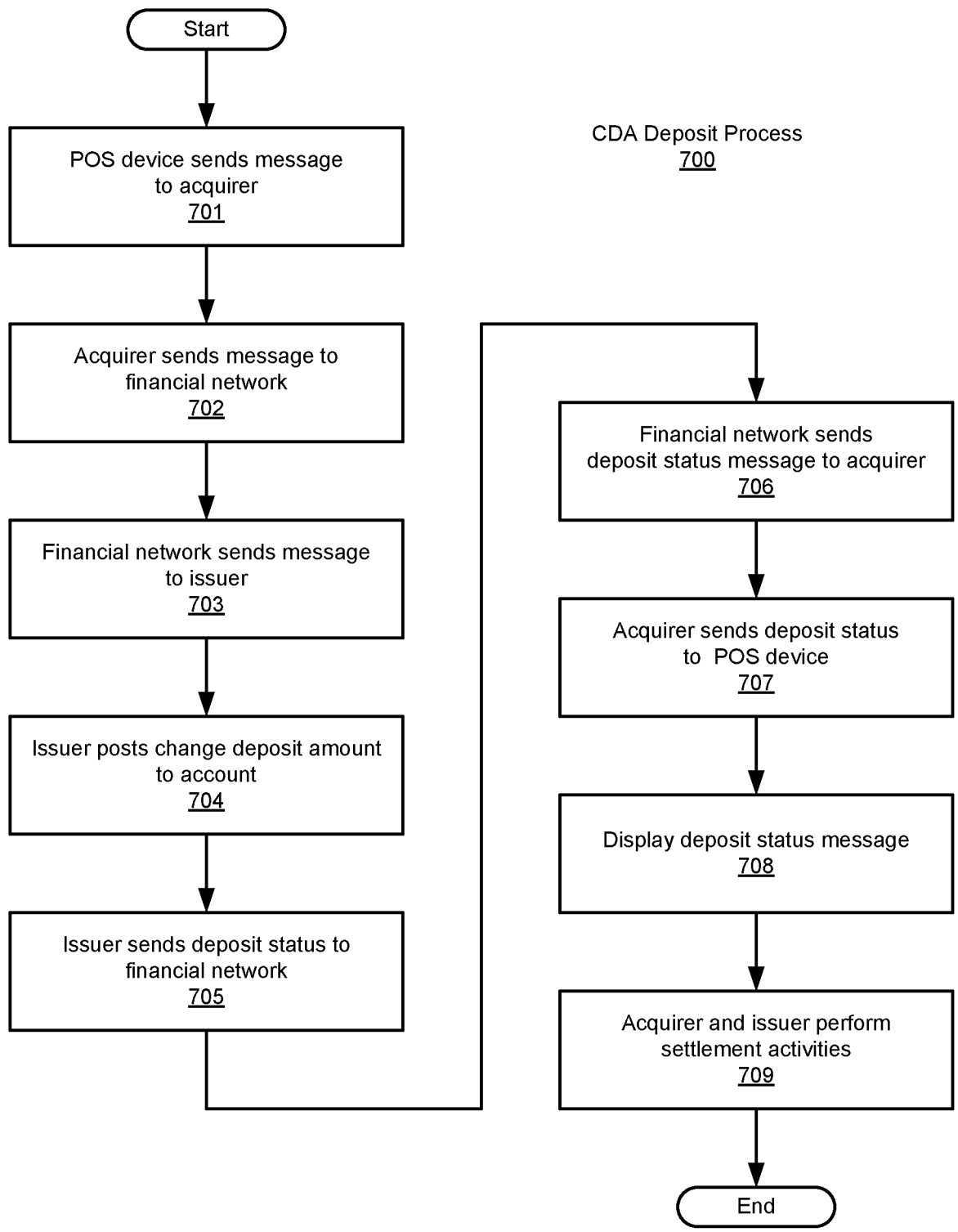
FIG. 7 is a simplified flow diagram illustrating an example of operations performed in sending electronic messages for the electronic deposit of a deposit amount, according to methods and systems such as those disclosed herein.

FIG. 7 illustrates a method in accordance with an embodiment, carried out by an embodiment of digital change module (e.g., digital change module 209) that initiates the electronic deposit of a Change Deposit Amount to an account associated with a consumer, for example. FIG. 7 thus illustrates a CDA deposit process 700, such as that which might be performed by a digital change module in performing the deposit operations described in connection with FIG. 4. CDA deposit process 700 begins with the POS device in question sending a message to an acquirer (701). For example, a digital change module 209 can initiate the sending of a digital change message to an acquirer (e.g., acquirer 307), where the digital change message includes a merchant identification, consumer account identification, a Change Deposit Amount, and an indicator that the transaction is a digital change transaction for the deposit of the Change Deposit Amount to an account identified by the consumer account identification. In one embodiment, the message is routed from a POS device such as POS device 301, through a network device, such as network device 303, and a network, such as network 306, to a computer or server of acquirer 307. In one embodiment, the merchant identification is a unique merchant identifier or a unique terminal identifier associated with the POS device (e.g., a TID). Further, the consumer account identification can include a routing number and an account number. The Change Deposit Amount is the amount of money to be deposited in the account identified by the consumer account identification. In one embodiment, a message to have the Change Deposit Amount electronically deposited in the account, and its transmission, is compliant with one or more country-specific standards and/or international standards for financial transactions, such as ISO 8583, and/or follow-on or derivative versions thereof.

Next, an acquirer such as acquirer 307 receives the digital change message and routes the digital change message to an associated financial network, based on the consumer account identification data of the digital change message (702). The financial network receives the digital change message and routes the digital change message to, for example, an issuer, based on the consumer account identification data of the digital change message (703). In the presently described method of CDA deposit process 700, routing a message is accomplished by analyzing information (data) in the message and transmitting the message according thereto. The digital change message can be transmitted without modification, or header data, packet data, and/or metadata can be added to the message (or modified) by the transmitting entity. In one embodiment, obtaining the data for routing a message to a particular entity can be accomplished by accessing data stored in a network database in a network-attached storage device and/or a local database of the acquirer, issuer, financial network, transaction processor, or other such entity.

In one embodiment, the issuer receives the digital change message and posts the Change Deposit Amount to the account identified in the digital change message, based on an indication that the transaction is a digital change transaction, the Change Deposit Amount, and the consumer account identification data of the digital change message (704). In the presently described embodiment, the consumer account is a digital change savings account, the funds of which can be accessed for deposit or withdrawal by a digital change card, such as digital change card 1000, and in posting the Change Deposit Amount to the account the amount of money in the account is increased by the Change Deposit Amount. For example, if the account has a balance of $2527.89 and the Change Deposit Amount is 85 cents, then posting the Change Deposit Amount to the account increases the account balance by 85 cents, resulting in a new account balance of $2528.74. In other embodiments, the account can be a checking account, credit card account, investment account, retirement account, or pre-paid account, among other such alternatives. In still other embodiments, the account can be an account associated with digital currency account, a cryptocurrency account (e.g., Bitcoin, Ethereum, or the like), a rewards account, a loyalty account, or the like, and posting a Change Deposit Amount to the account is accomplished by updating the account with the value reflected by the Change Deposit Amount and the consumer account identification data of the digital change message.

The Change Deposit Amount having been posted to the appropriate account, the issuer transmits a deposit status message to the financial network, such a message including, for example, identification data (e.g., including information identifying the POS device) and the deposit status of the electronic deposit of the Change Deposit Amount (705). In the presently described embodiment, the deposit status is a value that indicates whether or not the deposit was successful.

The financial network receives this deposit status message and routes the deposit status message to the acquirer, based on the POS device identification data in the message (706). Next, the acquirer receives the deposit status message and routes the deposit status message to the POS device, based on the POS device identification data in the message (707). The digital change module then displays a message reflecting the deposit status of the Change Deposit Amount based on the deposit status data of the message (708). If the deposit was successful, for example, a message of "Deposit Successful" can be displayed. Alternatively, if the deposit was not successful, a message of "Deposit Not Successful" can be displayed. Assuming that the deposit was successful, a settlement can then take place between the acquirer and issuer, whereby the funds are transferred between the accounts and the entities maintaining the accounts. In another embodiment, such settlement can occur following the purchase transaction. The aforementioned communications and settlement activities having successfully concluded, CDA deposit process 700 then concludes.

As will be appreciated in light of the present disclosure, while CDA deposit process 700 has been described with respect to a digital change message routed through a financial network, in other embodiments, such a digital change message (or comparable communication) can be routed directly from the acquirer to the issuer without being sent through such a financial network. Such may be the case if, for example, the acquirer and issuer are associated with the same financial network, such as a regional financial network, or the same rewards network or loyalty network. In another embodiment, the message can be routed by a transaction processor such as transaction processor 312. In yet another embodiment, the digital change message may not routed to the acquirer or issuer, but rather, routed to and processed by a transaction processor.

CDA deposit process 700 can be associated with various types of transactions and its messages communicated across various transaction networks using different protocols and standards. In one embodiment, CDA deposit process is part of an on-line debit transaction, also referred to as a pin-based transaction, in which a pin is entered and the routing of messages is over a regional, national, or worldwide electronic financial networks (e.g., fund networks or card networks), such as such as STAR, NYCE, PULSE, PLUS, CIRRUS, and/or other such financial networks. In such a case, a financial network such as financial network 309 acts as a processor gateway (e.g., INTERLINK or MAESTRO). CDA deposit process 700 can also take place as part of an offline debit transaction, referred to as a signature-based debit transaction, in which messages are routed over a financial network such as a VISA CHECKCARD or MASTERCARD MASTERMONEY. CDA deposit process 700 can also take place as part of a credit card transaction in which case the messages are transferred over a financial network associated with VISA, MASTERCARD, AMERICAN EXPRESS, or DISCOVER credit cards, for example. In another embodiment, CDA deposit process takes place or over payment systems and networks such as JAPAN CREDIT BUREAU or CHINA UNION PAY. Alternatively, CDA deposit process 700 can be part of a digital currency transaction, in which funds are transferred through the use of digital currency (e.g., such as the cryptocurrency described earlier).

Figure 8:
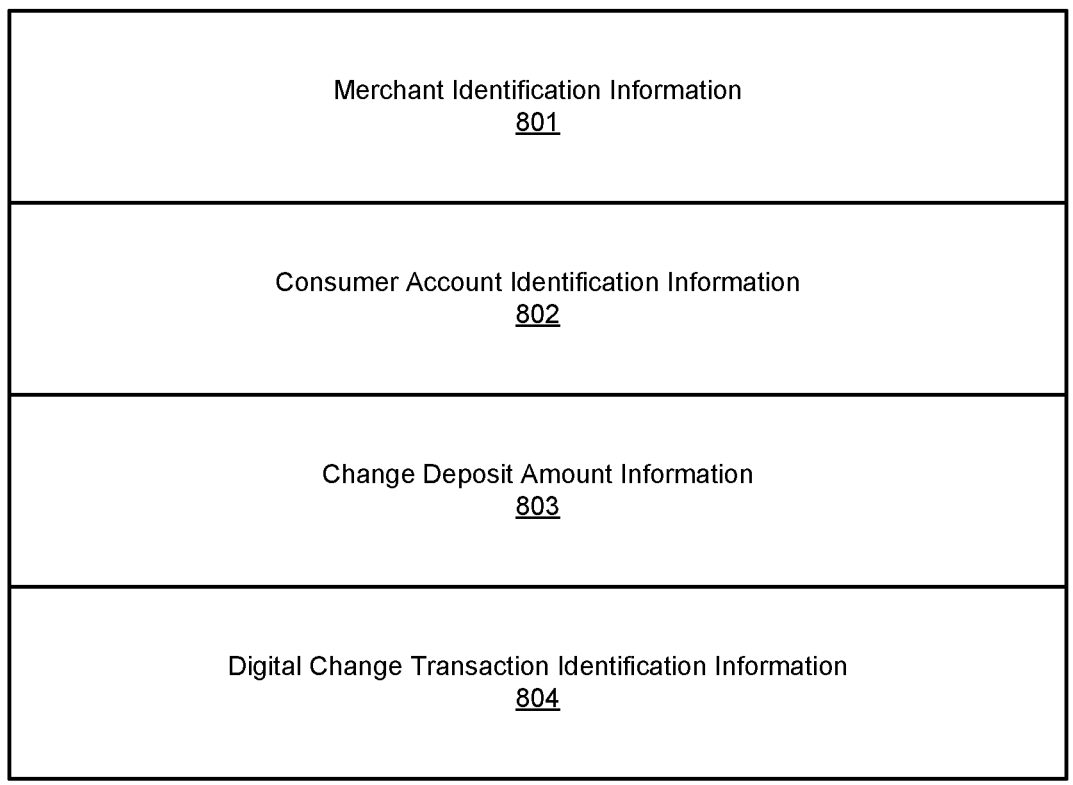
FIG. 8 is a simplified block diagram illustrating an example of a digital change message, according to methods and systems such as those disclosed herein.

FIG. 8 illustrates an embodiment of a digital change message (depicted in FIG. 8 as a digital change message 800). Digital change message 800 includes merchant identification information 801, consumer account identification information 802, change deposit amount information 803, and digital change transaction identification information 804. In one embodiment, merchant identification information 801 uniquely identifies the merchant selling the item(s), or on behalf of which the items are sold, that are purchased by a consumer paying cash at the point of sale using a POS device in accordance with the present disclosure. In one embodiment, merchant identification information 801 includes a merchant account number and a unique number identifying the POS device. In one embodiment, the unique number identifying the POS device 301 is a seven digit terminal identification number (TID). In another embodiment, the unique number identifying the POS device 301 is a ten-digit terminal identification number (TID) stored, for example, in a ROM of a POS device, or a number that uniquely identifies a mobile device (e.g., a mobile device having a digital change app such as that described subsequently herein), such as a cellular telephone number. Consumer account identification information 802 identifies the account in which Change Deposit Amount is to be deposited. In one embodiment consumer account identification includes one or more of a bank name, account number routing number, account type and consumer name.

Change Deposit Amount information 803 identifies the amount to be electronically deposited into the account identified by consumer account identification 802. Digital change transaction identification information 804 identifies the transaction as a digital change transaction, indicating the transaction has been initiated by payment of cash by the consumer at the point of sale, and that the Change Deposit Amount 803 is to be electronically deposited into the account associated with consumer account identification information 802. In one embodiment, digital change transaction identification information 804 includes a binary value, with the value thereof indicating whether the message is a digital change message (and so, whether the transaction in question is a digital change transaction). In another embodiment, digital change transaction identification information 804 is determined from consumer account identification information 802.

Each merchant identification information 801, consumer account identification information 802, Change Deposit Amount information 803, and digital change transaction identification information 804 are fields capable of containing information in any number of forms, including, for example, an alphanumeric value or a symbol. In one embodiment, each subfield is ASCII encoded, however in other embodiments each subfield may be encoded using format such as UFT-8, ISO 8859, or other similar encoding. In another embodiment, digital change message 800 is an encrypted message. In another embodiment, digital change message 800 is compliant with a version of ISO 8583 modified to reflect digital change data, as well as follow-on standards and derivatives thereof.

Figure 9:
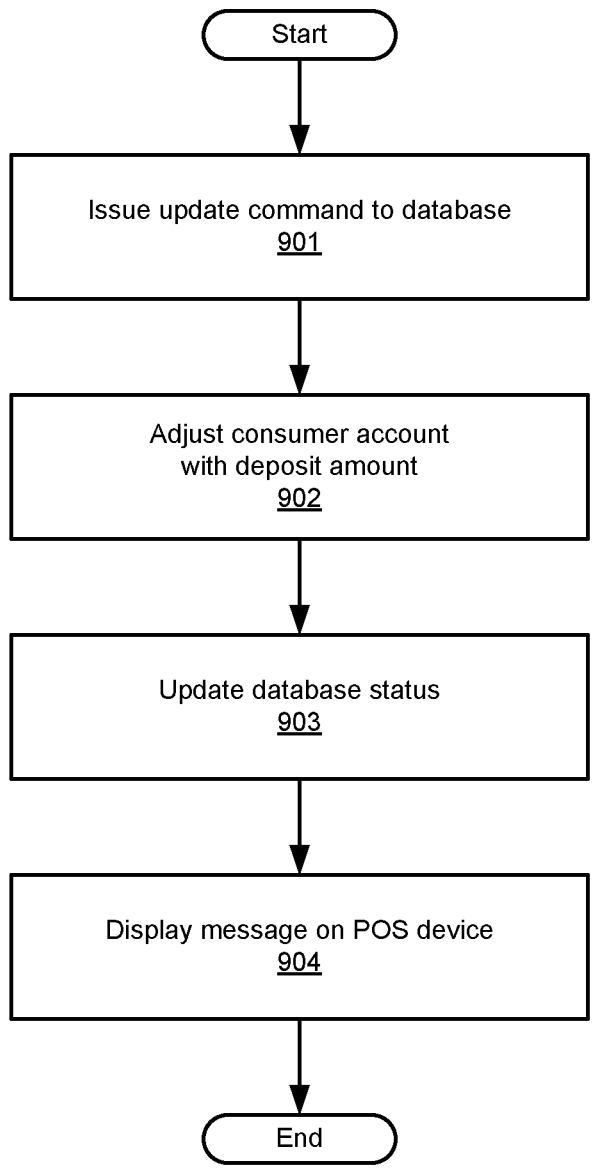
FIG. 9 is a simplified flow diagram illustrating an example of operations performed in a process of electronically depositing a deposit amount, according to methods and systems such as those disclosed herein.

FIG. 9 illustrates a CDA deposit process 900, in accordance with methods and systems such as those disclosed herein. CDA deposit process 900 can be carried out by, for example, an embodiment of a digital change module such as digital change module 209. CDA deposit process 900 facilitates the electronic deposit of Change Deposit Amount to a Change Account implemented in a database maintained by, or on behalf of the merchant and accessible by a POS module of a POS device, in the manner of performing deposit operations according to the operations described in connection with FIG. 4. In so doing, the merchant has control of the Change Account attributes, such as whether the Change Account is based on money, cryptocurrency/digital currency, reward points, loyalty points, and/or the like. As will be appreciated in light of the present disclosure, CDA deposit process 900 can be implemented (e.g., coded) in-line with POS process 400, or can be implemented separately (e.g., as a program, function, subroutine or other similar type of program called by a function call, subroutine call, or other program type call).

In the presently described embodiment, the Change Account is implemented in a database maintained by, or on behalf of a merchant and for which the merchant controls and configures the Change Account attributes. The database stores consumer data, including name, address, email, and phone data, along with account balance data. In the presently described embodiment, electronically depositing a Change Deposit Amount to the Change Account implemented in the database involves updating a cell of the database in which the account balance of the Change Account is stored. In one embodiment, the database can be implemented as a stand-alone distributed database, stored in a network-attached storage device, or maintained by a transaction processor such as transaction processor 312 or and issuer such as issuer 308, among a number of other alternatives.

CDA deposit process 900 begins with a digital change module such as digital change module 209 issuing an update command to the database to adjust the existing value in the account by the Change Deposit Amount, or an amount associated with the Change Deposit Amount (901). Such an update command can include a value uniquely identifying the Change Account and also the Change Deposit Amount. Next, the database management system performs the update by adjusting (e.g., by increasing by the Change Deposit Amount) the account balance stored in the account balance of the Change Account, or an amount associated with the Change Deposit Amount (902). In one embodiment, the update is performed by adding the Change Deposit Amount, or an amount associated with the Change Deposit Amount, to the existing account balance of the Change Account. Next, a database update status is provided to the digital change module (903). A message is then displayed by the digital change module reflecting the update status (904). In one embodiment, if the write to the account balance of the Change Account was successful, the database update status is "successful", and if the write was not successful, the database update status is an error code identifying the particular error. CDA deposit process 900 then concludes.

Figure 10A:
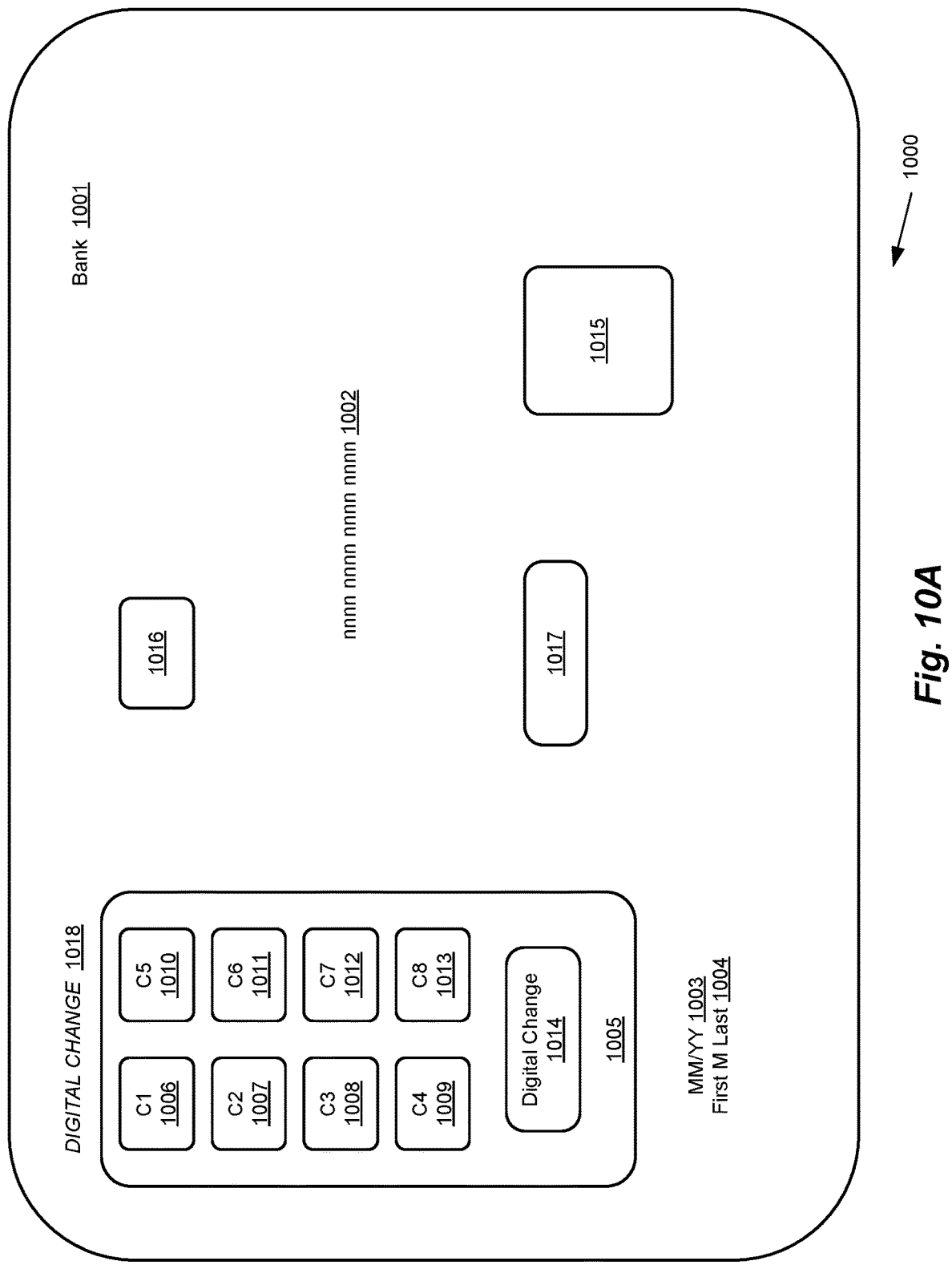
FIGS. 10A and 10B are simplified block diagrams illustrating an example of a digital change card, according to methods and systems such as those disclosed herein.

FIG. 10 illustrates an embodiment of a digital change card 1000 in accordance with the present disclosure. Digital change card 1000 maintains information regarding digital change data, and is capable of providing some or all of this information to a point sale device such as POS device 201. In so doing, digital change card 1000 facilitates the electronic deposit of a Change Deposit Amount to a consumer's account, for example. In one embodiment, digital change card 1000 conforms to applicable standards, such as ISO/IEC 7810, ISO/IEC 7811, ISO/IEC 7813 and ISO/IEC 7816, for example. The front of digital change card 1000, illustrated in FIG. 10A, includes the name of an issuing bank 1001, a primary account number 1002, an expiration date 1003, and the name of the card holder 1004 (e.g., the name of the consumer discussed elsewhere herein). Digital change card 1000 can also include an EMV chip 1005, a card brand logo 1015, and a security hologram 1016. Card 1000 can also include contactless chip 1017 and a digital change logo 1018. In alternative embodiments, one or more of the items illustrated in FIG. 10A may be on the back of digital change card 1000.

Bank name 1001 identifies the financial institution that issued digital change card 1000, or that maintains and is financially responsible for the account associated with digital change card 1000. Primary account number 1002 is, for example, a number from 8 to 19 digits that conforms to primary account numbering standards such as in ISO/IEC 7812. In another embodiment, primary account number 1002 is a number assigned by a merchant and identifies a consumer account maintained by or on behalf of a merchant and need not comply with numbering standards such as ISO/IEC 7812. In another embodiment, primary account number 1002 is assigned by a transaction processor 312 and identifies a consumer account maintained by transaction processor 312 and need not comply with number standards such as ISO/IEC 7812.

Expiration date 1003 identifies the expiration date of digital change card 1000 after which the card is no longer valid. In one embodiment, the card expiration date 1003 is checked when the card is processed by an acquirer or an transaction processor. Card holder name 1004 can provide, for example, the first and last name of the card holder of digital change card 1000 (e.g., the consumer). EMV chip 1005 can be a chip that, for example, conforms to ISO/IEC 7816 (contacted) or ISO/IEC 18443 (contactless) standards, and may operate as a contact EMV, a contactless EMV, or both. EMV chip 1005 includes contact points C1 ($V_{CC}$) 1006, C2 (Reset) 1007, C3 (Clock) 1008, C4 1009, C5 (GND) 1010, C6 ($V_{PP}$) 1011, C7 (I/O) 1012 and C8 1013. Information identifying digital change card 1000 as a digital change card is stored in a digital change field 1014 of EMV chip 1005. In the presently described embodiment, this digital change identifying information is stored as a four digit numeric value in application discretionary data field in EMV chip 1005 (e.g., having tag 9F05), with the value of "1111" identifying digital change card 1000 as a digital change enabled card. In another embodiment, a value of "1" identifies digital change card 1000 as a digital change enabled card. In other embodiments, a different value may be used and stored in a different field of chip 1005.

Card brand logo 1015 identifies the payment network, computer systems, processing methods, and fees, for processing transactions with card 1000. Security hologram 1016 is used to help prevent counterfeiting of card 1000. Contactless chip 1017 emits a signal from card 1000 such as radio waves that can be read by an RFID reader, and provides data associated with card 1000, such as name 1004, account number 1002, expiration date 1003. In one embodiment, contactless chip 1017 also emits a signal identifying card 1000 as a digital change enabled card.

Digital change logo 1018 signifies that digital change card 1000 is a digital change enabled card. In one embodiment, a digital change enabled card is a card that conforms to ISO/IEC 7810, ISO/IEC 7811, ISO/IEC 7813 and ISO/IEC 7816, and has data in EMV chip 1005 and magnetic stripe 1019, that when read by a POS device, identifies that the Change Due for a cash initiated transaction at the POS device 201 is to be electronically deposited into a digital change account identified by the account data in EMV chip 1005 and magnetic stripe 1019. As will be appreciated in light of the present disclosure, such an account need not the only a digital change account, but can be any account into which funds can be electronically deposited. As will be further appreciated in light of the present disclosure, a card such as digital change card 1000 can, in fact, be a card supporting a variety of functionalities, including combinations of, for example, a digital change card, a debit card, a credit card, and the like, among other such alternatives.

Figure 10B:
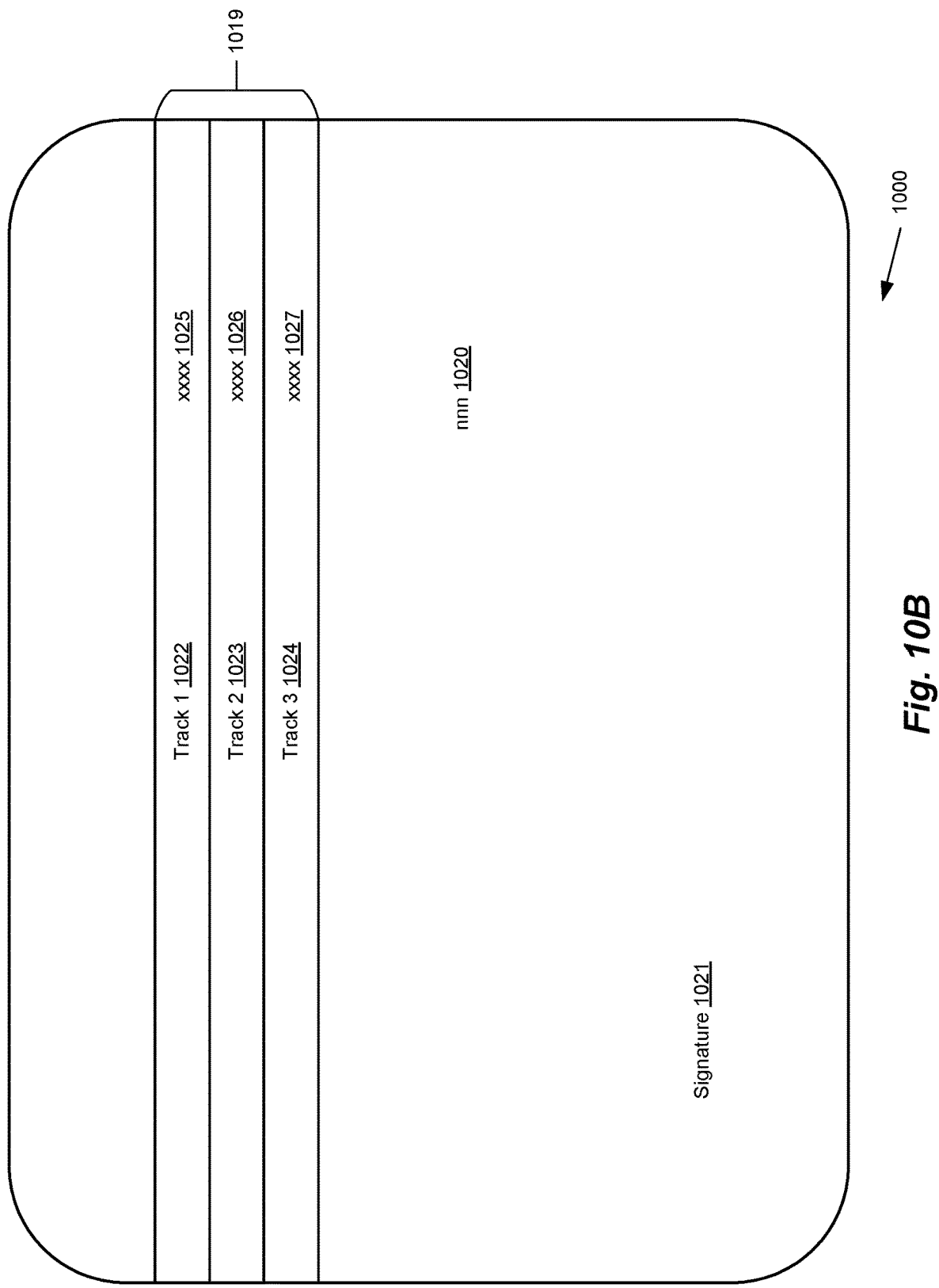

FIG. 10B illustrates the back of an embodiment of digital change card 1000, and includes a magnetic stripe 1019, a secure code 1020, and a card holder signature field 1021. In alternative embodiments, one or more of the items illustrated in FIG. 10B may be on the front of card 1000. In the current embodiment, magnetic stripe 1019 conforms to ISO/IEC 7811. Magnetic stripe 1019 is made up of three tracks, track 1 1022, track 2 1023, and track 3 1024. Track 1 1022 can contain up to 79 alphanumeric characters and is used to store the primary account number of up to 19 digits, such as primary account number 1002, the card holder's name of up to 26 alphabetic characters, such as name 1004, and the expiration date in the form of YYMM for 2 digits for the year and 2 digits for the month, such as expiration date 1003. Track 1 1022 can also contain a secure code 1020, a PIN verification value, and a PIN Verification Key Indicator. Track 2 1023 can contain up to 40 numeric characters and is used to store the account number, such as primary account number 1002, and the expiration date, such as expiration date 1003. Track 3 1024 can contain up to 107 numeric characters and is used to store data associated with digital change card 1000 and primary account number 1002. In one embodiment, secure code 1020 is a card verification value (CVV) code. Signature field 1021 provides an area for the card holder with name 1004 to signer or her name.

Each of track 1 1022, track 2 1023, and track 3 2014 contain discretionary fields 1025, 1026, and 1027, respectively. Discretionary field 1025 can contain alphanumeric characters and as many alphanumeric characters so that the total characters of Track 1 1022 is 70. Discretionary field 1026 can contain numeric characters and as many numeric characters so that the total characters of Track 2 1023 is 40. Discretionary field 1027 can contain numeric characters and as many numeric characters so that the total characters of Track 3 1024 is 107. Discretionary fields of 1025, 1026 and 1027 contain a value from one to four digits that identify card 1000 as a digital change enabled card. In the presently described embodiment, discretionary fields 1025, 1026 and 1027 contain the value "1111" identifying card 1000 as a digital change enabled card. In another embodiment, discretionary fields 1025, 1026 and 1027 contain the value "1" identifying card 1000 as a digital change enabled card. In another embodiment, discretionary fields 1025, 1026 and 1027 contain a different value identifying card 1000 as a digital change enabled card.

Figure 11:
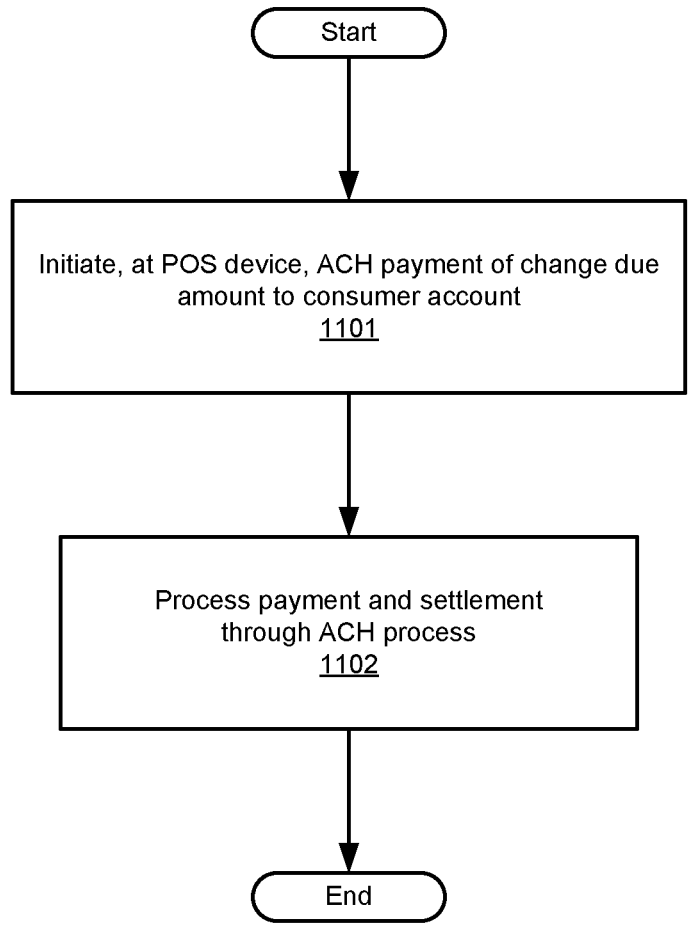
FIG. 11 is a simplified flow diagram illustrating an example of operations performed in performing an automated clearing house (ACH) payment, according to methods and systems such as those disclosed herein.

FIG. 11 illustrates a payment processing process 1100 that, in accordance with an embodiment, can be carried out by an embodiment of a digital change module such as digital change module 209. As part of this process, such a digital change module can initiate the electronic deposit of a Change Deposit Amount to an account associated with a consumer.

Payment processing process 1100 begins with a POS device initiating an ACH payment to the consumer's account, in the amount of the Change Due amount, utilizing the consumer information obtained in various of the operations described in connection with FIG. 4A. In one embodiment, a digital change module initiates an ACH payment utilizing the bank name, account number, routing number, and account type, such as savings or checking. The payment is then routed to the consumer's account and settled through the ACH process. Payment processing process 1100 then concludes.

Figure 12:
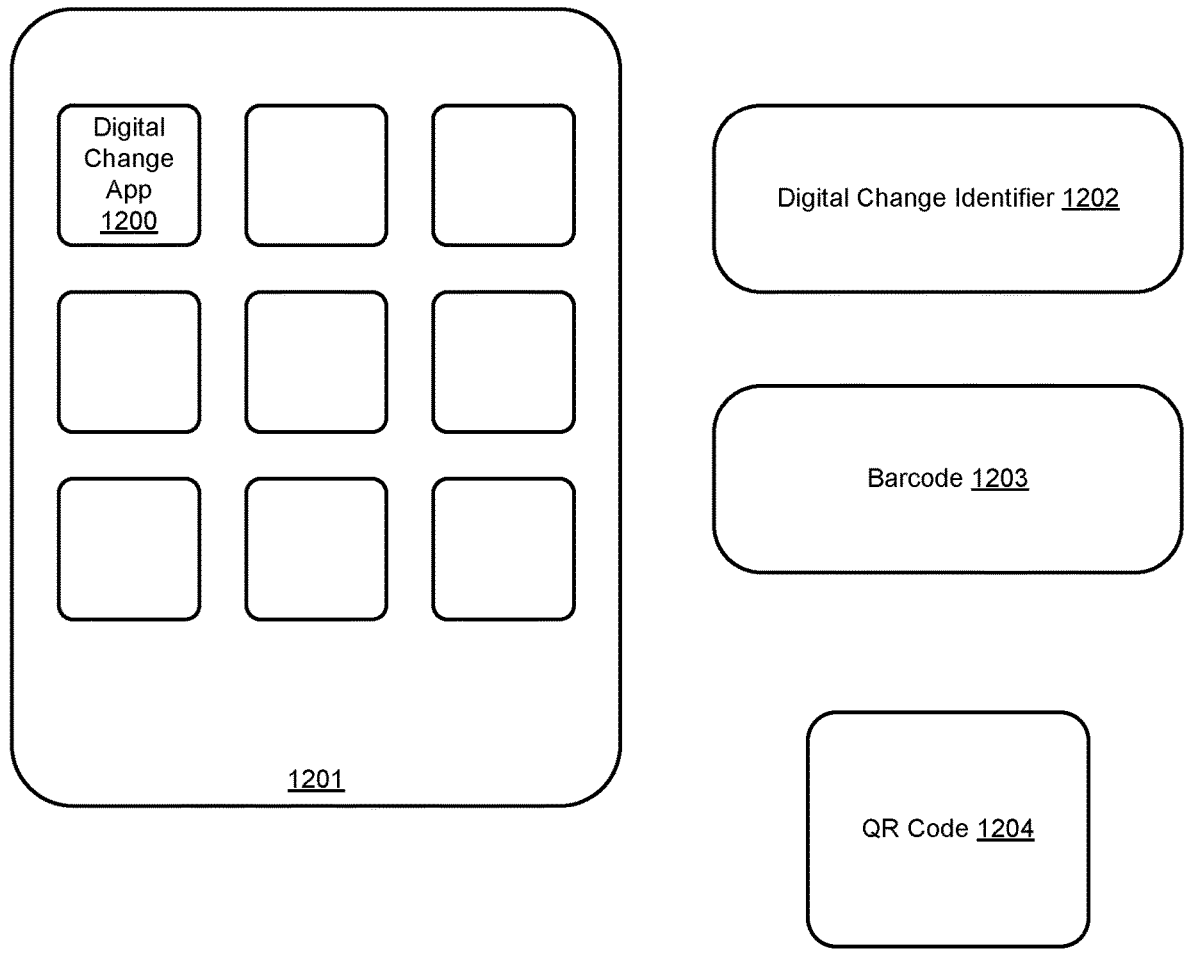
FIG. 12 illustrates a digital change application installed on mobile device along with various examples of digital change identifiers, according to methods and systems such as those disclosed herein.

FIG. 12 illustrates an application (an "app"; depicted in FIG. 12 as a digital change app 1200) installed on a mobile device 1201 that is enabled to provide Digital Change Data by wireless communication to and from a POS device, such as POS device 201, in accordance with the present disclosure. In one embodiment, such Digital Change Data is accessible by and provided by digital change app 1200, and includes, for example, an account number, consumer name, an expiration date, a bank name, routing number, and an account type, such as savings or checking, among other possible information. The Digital Change Data can also include a value of "1" with a tag of "digital change" such that when a POS device determines that the digital change tag's value is "1", the POS device enables the Change Due from the cash-initiated transaction to be electronically deposited into an account, in accordance with the present disclosure. Mobile device 1201 can be a mobile phone configured with any appropriate operating system software. In one embodiment, when the app is executed, a digital change identifier 1202 is displayed on the screen of the mobile device from which the electronic deposit information may be obtained by a scanner of the POS device, such as digital change scanner 215. In one embodiment, digital change identifier includes one or more barcodes 1203 in accordance with Universal Product Codes (UPC) or European Article Numbers (EAN). In another embodiment, digital change identifier includes a QR code 1204 in accordance with the Quick Response Code.

Figure 13:
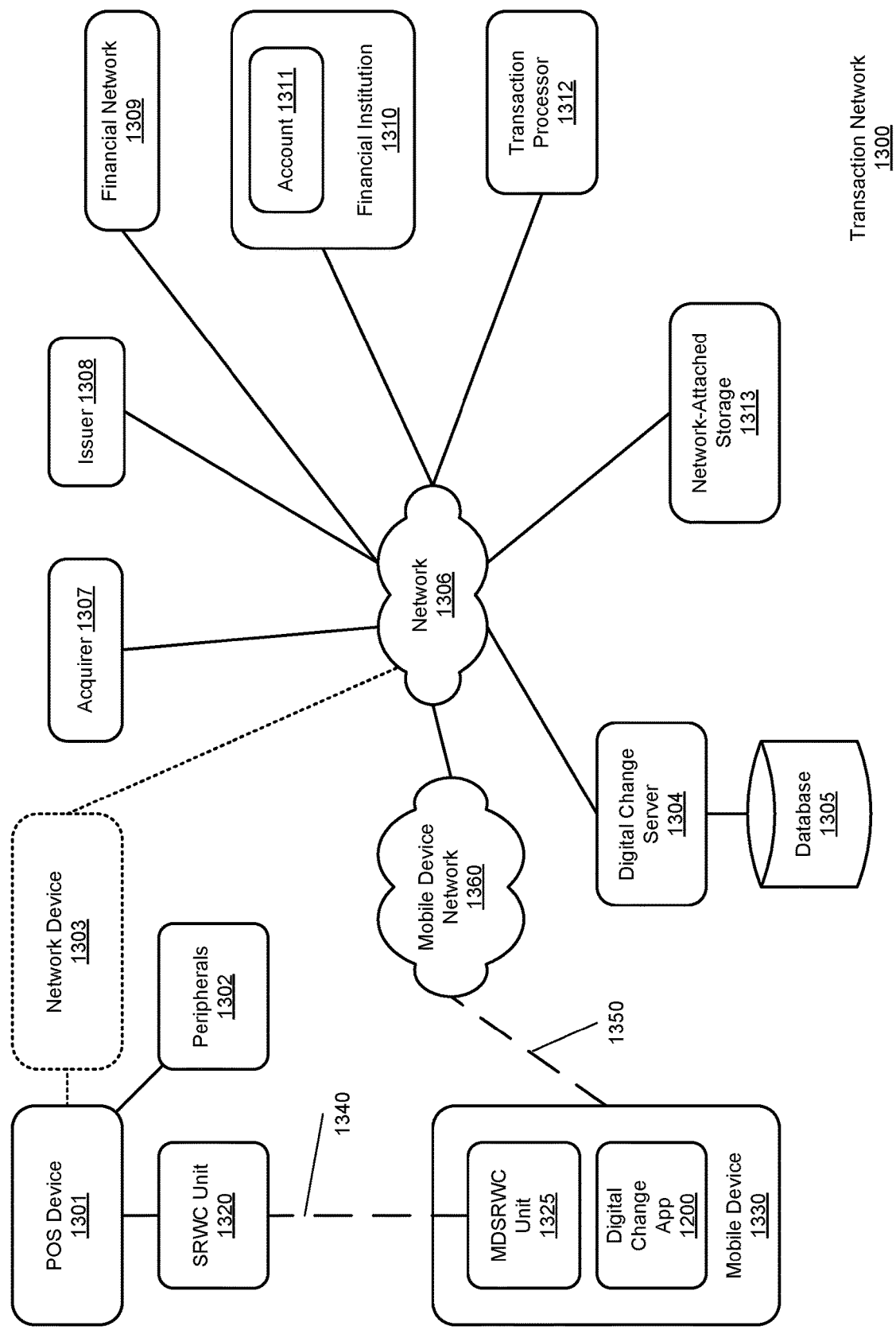
FIG. 13 is a simplified block diagram illustrating another example of a transaction network, according to methods and systems such as those disclosed herein.

FIG. 13 illustrates a transaction network 1300 that includes a POS device 1301, comparable to that described in connection with POS device 201 of FIG. 2A. As will be appreciated (and as can be seen in FIG. 13), while POS device 1301 provides support for and connection to certain of the peripherals described earlier herein, such as one or more of those described in connection with FIG. 2 as peripherals 200A, such peripherals are shown in the aggregate in FIG. 13 as peripherals 1302, for purposes of simplicity in presentation. That being said, it is to be appreciated that certain of these peripherals will provide advantages in connection with the methods and components of FIG. 13. For example, a peripheral for the acquisition of biometric information can be used in conjunction with such methods and components to provide additional functionality (e.g., as by identifying one or more accounts into which the given CDA (or portions thereof) are to be deposited using one or more of the consumer's thumbprints and/or fingerprints).

However, while POS device 1301 is depicted as optionally being able to communicate with other components, systems, entities, and the like of FIG. 13 by way of a network device 1303 (the optional nature of such communications being denoted by the use of dotted lines), it is to be understood in light of the present disclosure that embodiments such as those contemplated by the architecture depicted in FIG. 13 do not require POS device 1301 to communicate (or even be able to communicate) with such other components, systems, entities, and the like. This is at least because communications such as those contemplated by the present disclosure in transaction network 1300 are carried out via a mobile device, as is now described in connection therewith.

In addition to the aforementioned components, transaction network 1300 also includes a digital change server 1304 and a database 1305, which are accessible by other components of transaction network 1300 via a network 1306. As will be appreciated in light of the present disclosure, digital change server 1304, database 1305, network device 1303, and network 1306 are further examples of various of comparable components described earlier herein. As will also be appreciated in light of the present disclosure, while various of the components and entities of transaction network 1300 are depicted in FIG. 13 as communicating only with network 1306, such depiction is intended to simply convey the ability of such components and entities to communicate with one another, and so is intended to comprehend communication between various ones thereof.

Transaction network 1300 also includes various other components and entities (along with components supporting those entities). In the embodiment depicted in FIG. 13, transaction network 1300 includes an acquirer 1307, an issuer 1308, a financial network 1309, a financial institution 1310, a transaction processor 1312, and network-attached storage (NAS; depicted in FIG. 13 as a network-attached storage (NAS) device 1313). Acquirer 1307, issuer 1308, financial network 1309, financial institution 1310 (e.g., a bank, credit union, savings and loan, or other such financial institution), transaction processor 1312, and network-attached storage 1313 individually and collectively provide the requisite technology, network, and financial mechanisms to enable the processing, authorization, and settlement of financial transactions between a merchant and a consumer, or between commercial entities involved therein. In the presently described embodiment, acquirer 1307, issuer 1308, financial network 1309, financial institution 1310, transaction processor 1312, and network-attached storage 1313 are communicatively coupled to one another via network 1306. It will be understood that acquirer 1307, issuer 1308, financial network 1309, financial institution 1310, and transaction processor 1312 are each intended to represent not only the given entities, but also the devices, software, and networks belonging thereto that facilitate such communications and functionality.

In one embodiment, acquirer 1307 is an entity such as a bank or other financial institution, which performs functions such as financially and operationally linking merchants to card networks, including financial network 1309 and one or more issuers (e.g., one or more of an issuer such as issuer 1308). In addition, acquirer 1307 can maintain a merchant account and settle funds with respect to the merchant account for sales transactions processed at a merchant location. Acquirer 1307 can collect transaction fees charged to merchants, and distribute fees to entities associated with purchases over transaction network 1300.

Issuer 1308 is an entity, such as a bank or other financial institution, that issues credit cards, debit cards, rewards cards, loyalty cards, apps providing equivalent functionality to such cards, and the like to consumers and maintains consumer accounts associated with the cards. Issuer 1308 and acquirer 1307 settle transactions with/on behalf of consumers and merchants with respect to the consumer accounts and merchant accounts maintained by, or on behalf of, the respective entities of issuer 1308 and acquirer 1307, in the manner described earlier herein.

Financial network 1309 is a network of issuers, such as issuer 1308 and one or more acquirers (e.g., one or more acquirers such as acquirer 1307), that have established technology, hardware, and financial protocols to enable the processing, authorization, and settlement of transactions, as noted earlier herein. Financial institution 1310 can be a bank, credit union, or other such financial institution that, among other services, provides an account 1311 for a consumer, such as a checking account or a savings account that the consumer may deposit money into, or withdraw money from. In the presently described embodiment, account 1311 is a checking account on which a consumer can write checks against the funds in account 1311, and may also deposit funds into, or have funds deposited into, account 1311, utilizing an electronic deposit methodology, such as mobile check deposit, electronic check deposit, electronic funds transfer (EFT), ACH processing, or other deposit methodology as described herein or as may be otherwise available in the financial services industry.

Transaction processor 1312 provides services for the processing of transactions, such as securely routing a transaction to acquirer 1307 and issuer 1308 to determine whether account data is valid, whether sufficient funds are available for the transaction, and routing data, such as an authorization code, appropriately. Transaction processor 1312 also provides the functionality to settle the transaction between acquirer 1307 and issuer 1308 or between a merchant account and a consumer account.

Network-attached storage 1313 includes one or more storage devices, along with one or more databases stored therein, that can be read from or written to by authorized devices and systems by way of network 1306, as well as the devices, software, and networks of acquirer 1307, issuer 1308, financial network 1309, and transaction processor 1312. The databases stored in the storage devices of network-attached storage 1313 can include a relational database, hierarchical database, network database or object-oriented database, or a complex of databases. In one embodiment, network-attached storage 1313 stores, or provides accessibility to, consumer account information based on a consumer identifier, such as a digital change identifier or consumer biometric data such as facial recognition data, fingerprint data, or retinal scan information, and implements security requirements necessary to protect such biometric information.

Also depicted in FIG. 13 as being communicatively coupled to POS device 1301 is a short-range wireless communication (SRWC) unit 1320. SRWC unit 1320 facilitates short-range communications with a mobile device SRWC (MDSRWC) unit 1325 of a mobile device 1330. MDSRWC 1325 allows mobile device 1330 to communicate with SRWC unit 1320 of POS device 1301 by way of a SRWC link 1340 (shown in dashed lines in FIG. 13 to indicate the wireless nature of such communications). As will be appreciated in light of the present disclosure, SRWC link 1340 is able to transfer the requisite information between mobile device 1330 and POS device 1301 with speed and accuracy sufficient for such applications. Preferably, SRWC link 1340 operates over a nominal distance conducive to maintaining security with regard to other wireless devices that may be nearby. However, where such communications are protected using additional measures (e.g., encryption), the distances involved can be greater. Digital change app 1200, comparable to that described in connection with FIG. 12, receives information from and transmits information to POS device 1301, and also communicates with other components, systems, entities, and the like of FIG. 13 via, for example, communication mechanisms provided by mobile device 1330. For example, in a manner comparable to that described in connection with certain of the components depicted in FIG. 1B, mobile device 1330 can provide communications with such other components, systems, entities, and the like by way of a connection to network 1306 that includes a cellular communication connection 1350, a mobile device network 1360 (shown in dashed lines in FIG. 13 to indicate the wireless nature of such communications), and/or the like. Thus, digital change app 1200 having the ability to avail itself of various of the functionalities (communication and otherwise) of mobile device 1330, various advantages provided by such an embodiment are enjoyed, at least as a result of the simplification of features needed in POS device 1301 to support functionalities such as those described herein.

In this regard, as will be apparent from the processes discussed in connection with the flow diagrams of FIGS. 14-16, certain embodiments of transaction network 1300 can be implemented simply with changes to the operating software of POS device 1301. Not only to such embodiments simplify employ mentation of methods and systems such as described herein, and so minimize the cost (e.g., in terms of computational resources and human resources), but in so doing, improve adoption of such technologies, both in terms of the speed of such adoption and its market penetration. For example, in certain embodiments, to enable the deposit of a Change Deposit Amount to a consumer's account, POS device 1301 need only provide information to digital change app 1200 sufficient to establish the authenticity of and authorization for the transaction in question along with the amount of Change Deposit Amount. And while the security of such transactions must be maintained, a sufficient level of security can be provided using various encryption techniques and the like. Having provided such information to digital change app 1200, POS device 1301 need not perform any additional tasks and the deposit of the Change Deposit Amount to the consumer's account is provided by Digital Change App 1200. However, as will be appreciated in light of the present disclosure, POS device 1301 can interact with various of the components, systems, entities, and the like of FIG. 13 (e.g., by way of network device 1303 and network 1306), in order to provide such information directly thereto, and/or to provide confirmation of the authorization and authentication of the transaction in question. Further in this regard, a biometric acquisition device may be included as part of the given mobile device (mobile device 1330), in which case such functionality need not be provided as part of POS device 1301 or peripherals 1302. In such case, mobile device 1330 can perform authentication operations such as those described subsequently (and elsewhere herein) by, for example, reading a consumer's fingerprint(s) and/or thumbprint(s), and/or performing facial or voice recognition using such mobile device functionality, and providing such biometric information for use in authentication, account selection, and other such operations.

Figure 14:
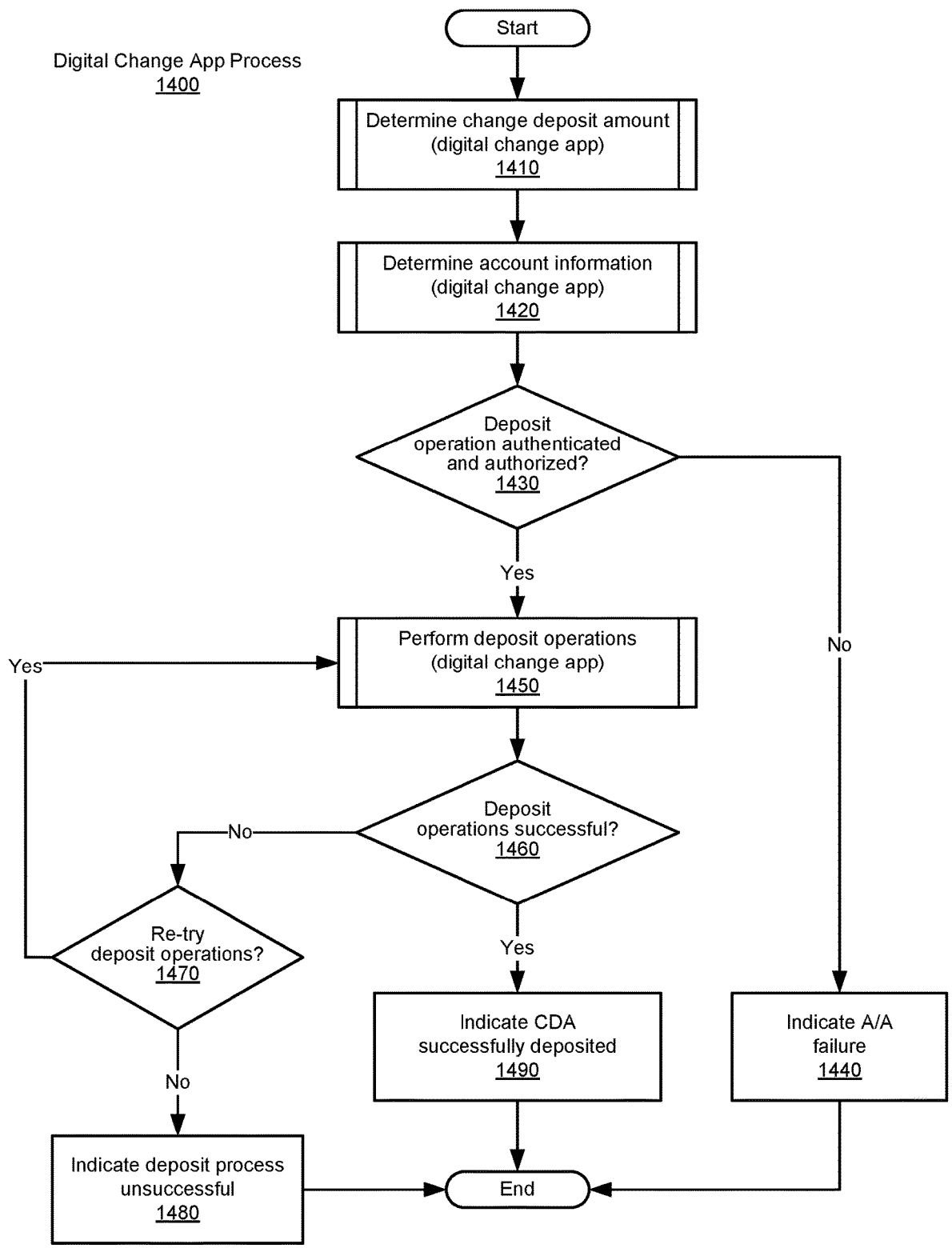
FIG. 14 is a simplified flow diagram illustrating an example of operations performed in a digital change app process, according to methods and systems such as those disclosed herein.

FIG. 14 is a simplified flow diagram illustrating an example of operations performed in a digital change app process, according to methods and systems such as those disclosed herein. That being the case, FIG. 14 depicts a digital change app process 1400. In certain respects, digital change app process 1400 comprehends functionalities comparable to those described in connection with POS process 400 of FIGS. 4A and 4B. However, in certain other respects, digital change app process 1400 differs. In so doing, digital change app process 1400 employs functionalities provided by a mobile device such as mobile device 1330 of FIG. 13. Such similarities and distinctions will be noted in connection with not only FIG. 14, but also with respect to FIGS. 15 and 16.

Digital change app process 1400 begins with a determination as to a Change Deposit Amount that is to be deposited into one or more of the consumer's accounts (1410). In this regard, such a determination can be made using processes such as those described in connection with FIGS. 5 and 6A, for example. However, while FIGS. 5 and 6A are described in terms of such operations being performed by a POS device, it will be appreciated in light of the present disclosure that such operations, supported by appropriate communications with a POS device, can be performed by a digital change app (e.g., digital change app 1200) installed on a mobile device (e.g., mobile device 1330). Such an alternative is indicated in FIG. 14 by the parenthetical notation "(digital change app)", as is noted with respect to other of the operations depicted in FIG. 14.

Next, a determination is made as to the consumer's account information (1420). In this instance, such a determination is made using processes that differ from POS process 400, for example. As noted elsewhere herein, while certain of these operations could be performed by a POS device, it will be appreciated in light of the present disclosure that such operations, supported by appropriate communications with a POS device, can be performed by a digital change app (e.g., digital change app 1200) installed on a mobile device (e.g., mobile device 1330). Further, the determination as to the consumer's account information can, as noted elsewhere herein, include determinations as to the consumer's identity (authentication) and authority to make the requested deposit(s) (authorization). In the present context, such functionalities are described in detail in connection with FIGS. 15 and 16, subsequently.

Such determinations having been made (1410 and 1420), digital change app process 1400 then proceeds to a determination as to whether the deposit(s) in question is (are) authenticated and authorized (1430). In the case in which the consumer is not authenticated, the deposit(s) in question is (are) not authorized, or both, an indication is made to this effect (1440). Digital change app process 1400 then concludes.

Alternatively, if the deposit(s) in question is (are) authenticated and authorized, digital change app process 1400 proceeds with performing deposit operations (1450). As noted above, such a determination can be made using processes such as those described in connection with FIG. 7, for example. However, while FIG. 7 is described in terms of such operations being performed by a POS device, it will be appreciated in light of the present disclosure that such operations, supported by appropriate communications with a POS device, can be performed by a digital change app (e.g., digital change app 1200) installed on a mobile device (e.g., mobile device 1330). Here again, such an alternative is indicated in FIG. 14 by the parenthetical notation "(digital change app)".

In a manner similar to that described with respect to earlier of the figures herein, a determination is made in digital change app process 1400 at this juncture, as to whether the deposit operations for successful (1460). If the deposit operations in question were not successful, digital change app process 1400 proceeds with a determination as to whether such deposit operations should be attempted once again (1470). If another attempt to perform the deposit(s) is to be made, the process loops to the operations for doing so (1450). Alternatively, if another attempt at performing the deposit operation(s) is not to be made (e.g., due to a maximum number of attempts having been made, a critical fault in the authentication process, or some other condition of the like), digital change app process 1400 proceeds to making an indication to the effect that the deposit process was unsuccessful (1480). Digital change app process 1400 then concludes.

Alternatively, if the deposit operations were successful, funds reflecting the Change Deposit Amount will appear as having been deposited in the appropriate account(s). Such success is indicated in digital change app process 1400 as a successful CDA deposit indication (1490). Digital change app process 1400 then concludes.

Figure 15:
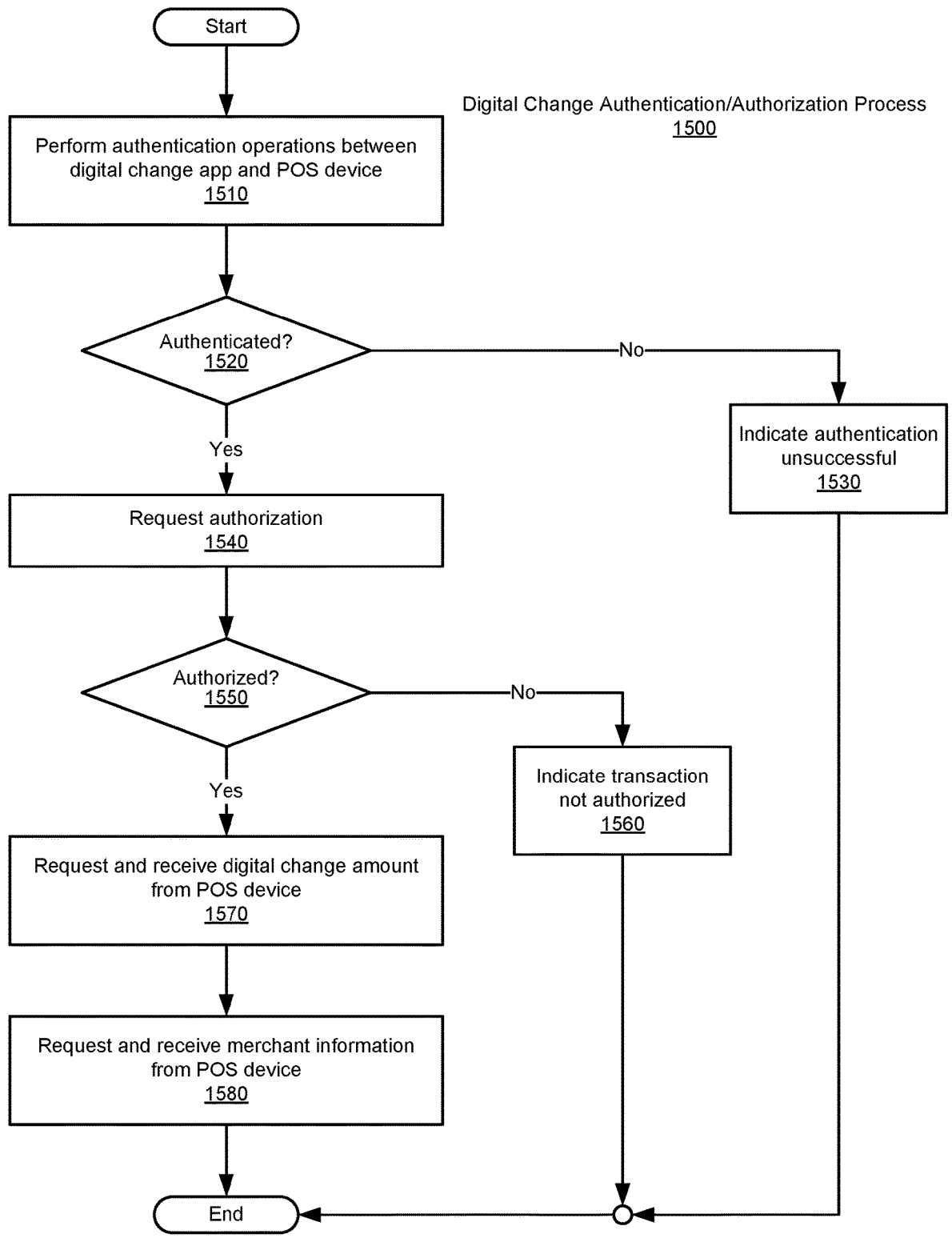
FIG. 15 is a simplified flow diagram illustrating an example of operations performed in a digital change authentication and authorization process, according to methods and systems such as those disclosed herein.

FIG. 15 is a simplified flow diagram illustrating an example of operations performed in a digital change authentication and authorization process, according to methods and systems such as those disclosed herein. That being the case, FIG. 15 depicts a digital change authentication/authorization (A/A) process 1500. Digital change A/A process 1500 can be performed, for example, using a mobile device such as mobile device 1330, in which a digital change app such as digital change app 1200 has been installed. It will therefor be appreciated that digital change A/A process 1500 is discussed in the context of transaction network 1300, and its various components, features, and functionalities.

Digital change A/A process 1500 begins by performing authentication operations, as between the digital change app and the POS device (1510). Such authentication can be performed using peripherals of the POS device (along with appropriate communications between the digital change app and the POS device), or can be performed, as noted elsewhere herein, using functionalities provided by the mobile device (e.g., facial recognition, fingerprint recognition, and/or or the like). As will also be appreciated in light of the present disclosure, other modalities can be used to authenticate the consumer and merchant, including (in the case of the consumer) those depicted in connection with FIG. 12. Such authentication can also include communications with entities such as issuer 1308, financial network 1309, financial institution 1310, and/or the like.

Once such authentication operations have been performed, digital change A/A process 1500 makes a determination as to whether such authentication was successful (1520). In the case in which such authentication operations failed to authenticate the consumer, an indication to this effect (that authentication was unsuccessful) is provided (1530). In such a case, digital change A/A process 1500 then concludes.

Alternatively, if the consumer was successfully authenticated, a request is made for authorization to proceed with the deposit transaction in question (1540). As noted, such an operation can be facilitated by communications between mobile device and the POS device. In such an instance, as with other such embodiments in which the POS device is involved, the POS device (e.g. via a network device) can support such operations by communicating with appropriate entities, components, and/or the like (e.g., such as one or more of those depicted as part of transaction network 1300). Communication with such entities, components, and/or the like can be performed by the POS device and the mobile device in parallel with one another, and so speed the transaction in question. Such can be the case, for example, where the digital change app retrieves a digital change token from an issuer and provides that digital change token to the POS device, which, in turn, provides such digital change token to its financial institution, a transaction processor, or the like, in order to establish the authorization to conduct the transaction in question. As will be appreciated in light of the present disclosure, in certain embodiments, such a digital change token can be implemented as digital information that establishes the consumer's authorization to conduct the transaction in question, such as a software-based security token. As will be further appreciated, such a software-based security token can also comprehend authentication operations such as those described above, and so provide both authentication and authorization functionalities.

Once such authorization operations have been performed, digital change A/A process 1500 makes a determination as to whether the authorization operations in question were successful (and so the transaction is authorized) (1550). In the case in which the authorization operations were unsuccessful (e.g., one or more of the accounts into which some portion (or all) of the CDA was to be deposited could not be identified, communication with the financial institution to receive the deposit was unavailable, or other such failure), an indication to this effect (that the deposit could not be authorized) is provided (1560). In such a case, digital change A/A process 1500 then concludes.

However, if the consumer is properly authenticated and the deposit is authorized, digital change A/A process 1500 proceeds with requesting and receiving the digital change amount (e.g., the Change Deposit Amount) from the POS device (1570). The digital change app can also request and receive information regarding the merchant (merchant information) from the POS device (1580). Such merchant information can include information identifying the merchant, identifying one or more of the merchant's accounts (e.g., from which the CDA is to be transferred), and/or other such information.

However, it will be appreciated in light of the present disclosure that such information can be determined in other manners. For example, by using a location of the mobile device (e.g., as by the use of Global Positioning System (GPS) technology, cellular network location, Wi-Fi location, or other such geolocation techniques), a determination can be made as to the establishment in which the transaction is taking place, and so the merchant involved therein. Further in this regard, it will be appreciated in light of the present disclosure that such a feature could be used to determine whether or not a given merchant (at which the consumer and their mobile device are currently located) support methods and systems such as those described herein, and are participating in a program supporting such technology. That being the case, participation information can be maintained in the digital change app and/or its data (which can be encrypted or otherwise protected to prevent tampering therewith). Such participation information can be updated periodically (or on-demand), such that merchants can be added as participating in such programs in a dynamic and automatic fashion. At this juncture, digital change A/A process 1500 concludes.

Figure 16:
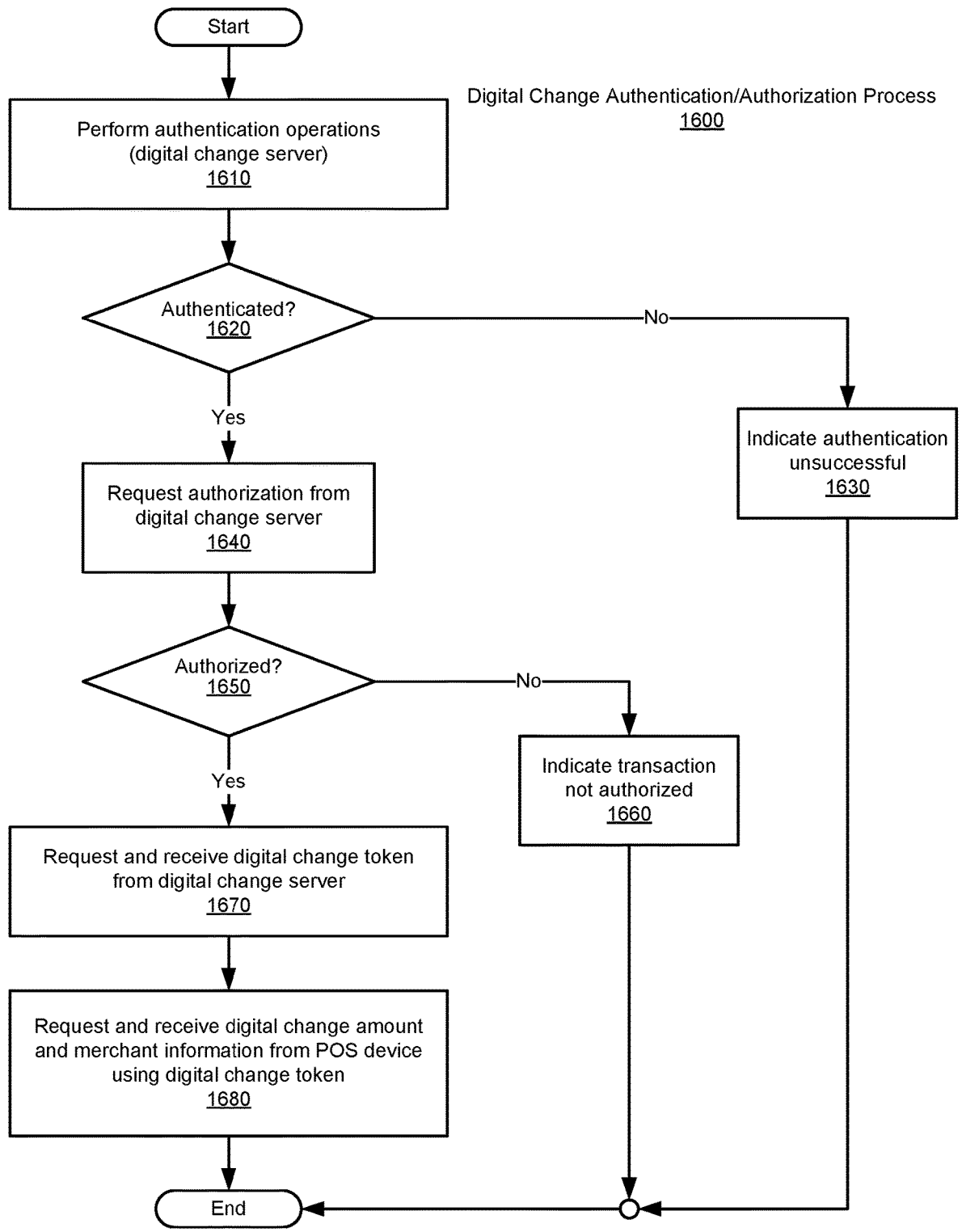
FIG. 16 is a simplified flow diagram illustrating another example of operations performed in a digital change authentication and authorization process, according to methods and systems such as those disclosed herein.

FIG. 16 is a simplified flow diagram illustrating another example of operations performed in a digital change authentication and authorization process, according to methods and systems such as those disclosed herein. That being the case, FIG. 16 depicts a digital change authentication/authorization (A/A) process 1600. As before, change A/A process 1600 can be performed, for example, using a mobile device such as mobile device 1330, in which a digital change app such as digital change app 1200 has been installed. It will therefor be appreciated that digital change A/A process 1600 is discussed in the context of transaction network 1300, and its various components, features, and functionalities, as was the case with respect to digital change A/A process 1500 of FIG. 15. However, the digital change app and functionalities provided by the mobile device are a focus of digital change A/A process 1600, in order to provide support for such a process with a reduced level of functionality provided by the POS device.

That being the case, digital change A/A process 1600 begins by performing authentication operations, by the digital change app, using functionalities provided by the mobile device (1610). Such functionalities can include facial recognition, fingerprint recognition, and/or other such biometric analysis, or can use information-based techniques (e.g., a security code entered on a keypad displayed on the mobile device's display by the digital change app, entry of a password in a comparable fashion, and/or other such approaches). As will also be appreciated in light of the present disclosure, other modalities can be used to authenticate the consumer and merchant, including (in the case of the consumer) those depicted in connection with FIG. 12. Such authentication can also include communications with entities such as issuer 1308, financial network 1309, financial institution 1310, and/or the like. For example, communications between the digital change app and a digital change server can be performed, which can include provision of information such as that mentioned above.

A determination is then made in digital change A/A process 1600 as to whether the aforementioned authentication process was successful (1620). Should such authentication operations have failed to authenticate the consumer, an indication to this effect (that authentication was unsuccessful) is provided (1630). In such a case, digital change A/A process 1600 then concludes.

Alternatively, if the consumer was successfully authenticated, a request is made for authorization to proceed with the deposit transaction in question (1640). Here again, such an operation can be facilitated by communications between mobile device and the digital change server, without the need for the digital change app to interact with the POS device. In such a case, the digital change app communicates with the digital change server (and/or other entities within the transaction network, such as an issuer, a financial institution, and/or other such entities), which, based on information provided by the digital change app, can make a determination as to authorization to proceed with the deposit of the CDA in the account identified. As will be appreciated, the transfer of funds from, for example, the merchant's account to the consumer's account can be effected and settled in a manner such as that described earlier herein. That said, the digital change app can retrieve a digital change token from, for example, the digital change server, and provide that digital change token to the POS device. The POS device, in turn, can provide such a digital change token to its financial institution, a transaction processor, or the like, in order to establish the authorization to conduct the transaction in question.

Once such authorization operations have been performed, digital change A/A process 1600 makes a determination as to whether the authorization operations in question were successful (and so the transaction is authorized) (1650). In the case in which the authorization operations were unsuccessful (e.g., one or more of the accounts into which some portion (or all) of the CDA was to be deposited could not be identified, communication with the financial institution to receive the deposit was unavailable, or other such failure), an indication to this effect (that the deposit could not be authorized) is provided (1660). In such a case, digital change A/A process 1600 then concludes.

However, if the consumer is properly authenticated and the deposit is authorized, digital change A/A process 1600 proceeds with requesting and receiving the digital change token from the digital change server (1670). While this operation is optional, such a digital change token can be used in interactions with the POS device, in order to demonstrate to the POS device the authenticated and authorized nature of the change deposit operation being performed by the digital change app. Next, the digital change app requests and receives information regarding the merchant (merchant information) and digital change amount (e.g., the Change Deposit Amount) from the digital change server (1680). Such merchant information can include information identifying the merchant, identifying one or more of the merchant's accounts (e.g., from which the CDA is to be transferred), and/or other such information.

At this juncture, the transfer of such information can be accomplished in a number of ways. For example, as noted above, the digital change app can communicate with the digital change server two obtain information needed to complete the transaction. In such a case, one embodiment provides the ability for the POS device to convey information such as a CDA to the digital change server, along with information regarding the merchant and any other salient data. Such an embodiment therefor involves communication by the POS device with other components of the transaction network (e.g., the digital change server). In another embodiment, however, a secure communication of information (e.g., regarding the change due) from the POS device to the digital change app can provide the information needed by the digital change app to effect the transfer of funds from the merchant's account to the consumer's account, thereby limiting interactions with the POS device to simply providing that information. As noted earlier, it will be appreciated in light of the present disclosure that merchant information can be determined in other ways. For example, by using a location of the mobile device (e.g., as by GPS), a determination can be made as to the establishment in which the transaction is taking place, and so the merchant involved therein. At this juncture, digital change A/A process 1600 concludes.

As will therefore be appreciated in light of the foregoing, an approach such as that described in connection with digital change A/A process 1600 avoids the need for communications with the POS device, thereby simplifying the POS device itself, as well as the deposit process. In fact, in a scenario in which the digital change app manages the authentication and authorization operations (e.g., as by fingerprint or facial recognition, and communications with the relevant entities in the given transaction network), the merchant identification operations (e.g., as by mobile device location techniques), and the deposit operations (e.g., as by interaction with a digital change server and/or other relevant entities in the given transaction network), communications with the POS device can be limited to receiving information from the POS device regarding the CDA resulting from the transaction in question.

Figure 17:
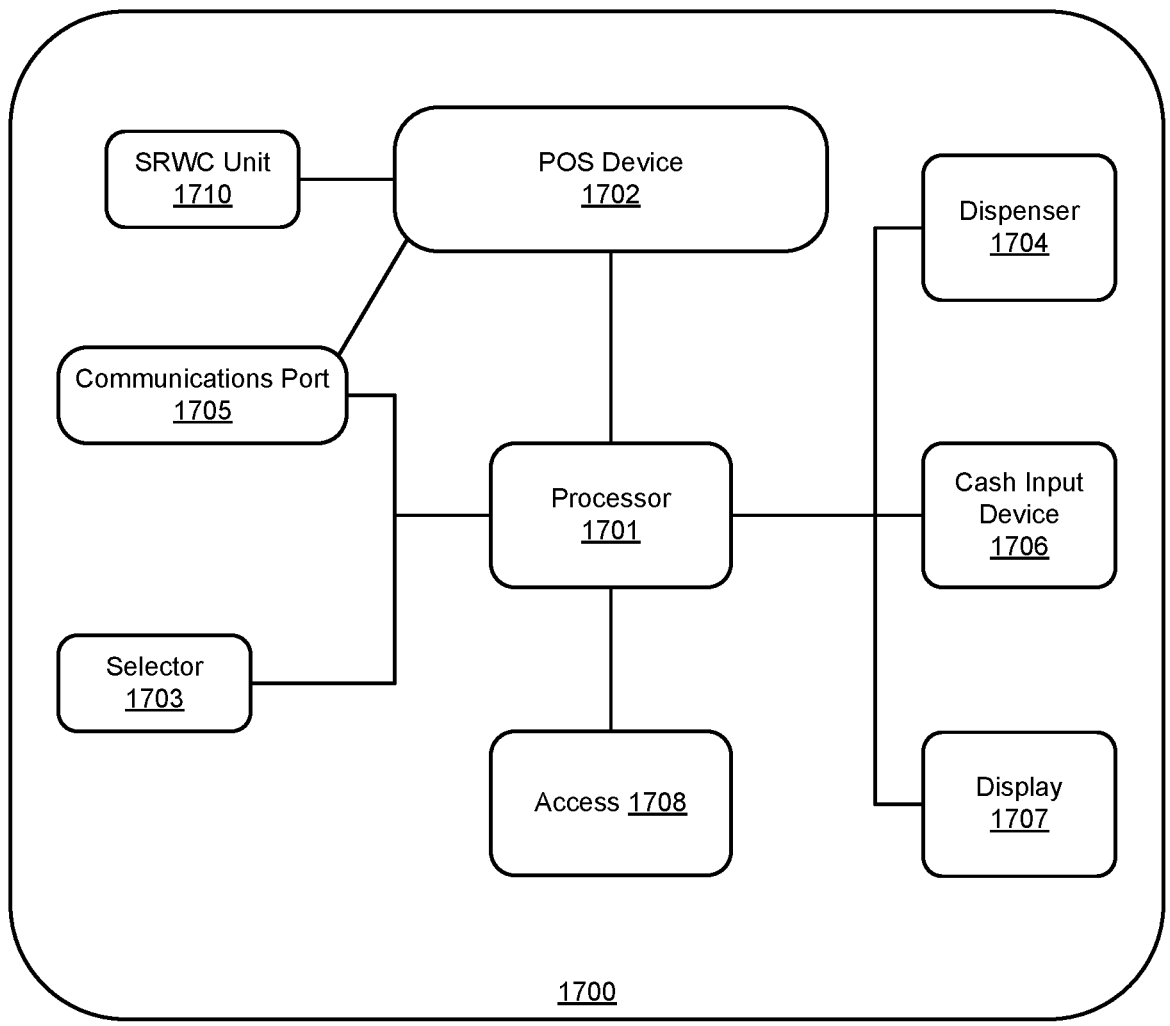
FIG. 17 is a simplified block diagram illustrating an example of a POS device, according to methods and systems such as those disclosed herein.

FIG. 17 illustrates an embodiment of a POS device implemented in a vending machine 1700. It is frequently the case that change is dispensed by a vending machine in response to a consumer's purchase. This requires money to be stored in the vending machines wherever they are located (increase risk of theft) along with the required replenishing of the amounts (causing an increase to time and cost). Accordingly, the present embodiment simplifies the provision of the change due to the consumer, making for a more efficient transaction. Vending machine 1700 includes a processor 1701 that is communicatively coupled to a POS device 1702, a selector 1703, a dispenser 1704, a communication port 1705, a cash input module 1706, a display 1707, and an access 1708. In the presently described embodiment, vending machine 1700 dispenses canned or bottled drinks such as soda. In another embodiment, vending machine 1700 dispenses packaged food and snacks. In other embodiments, vending machine 1700 dispenses electronic items.

Processor 1701 controls the overall processing and operation of vending machine 1700. When purchasing an item, a consumer may pay for an item by inserting cash into vending machine 1700 through cash input device 1706, which detects the amount of money inserted by the consumer. In this embodiment, POS device 1702 is an embodiment of POS device 100. In one embodiment, POS device 1702 can be a separate physical device that is communicatively coupled to vending machine 1700 via communication port 1705, such as through a USB port or wireless port. In another embodiment, POS device 1702 can be integrated into vending machine 1700. Further, vending machine 1700 can include a short-range wireless communication unit 1710, communicatively coupled to POS device 1702, thereby providing functionalities and advantages such as those described in connection with other figures described herein, for example. Given that the aforementioned information provided by a POS device such as POS device 1702 can be programmed into a memory of such a POS device, the use of such processes and constructs can simplify the design of vending machines such as vending machine 1700, and allow for standalone operation without the need for such a vending machine to communicate with the various components, systems, and entities of a transaction network such as transaction network 1700.

Upon receiving a cash amount from cash input device 1706 for the purchase of an item dispensed by vending machine 1700, POS device 1702 provides a message displayed on display 1707 prompting a consumer for the account in which Change Due is to be electronically deposited. The account data can be provided by the consumer using a number of mechanisms and processes such as those described herein, including, for example, a digital change card 1000, digital change app 1100, or information entered by the consumer on a pinpad of POS device 1702, among other such alternatives. In one embodiment, once the requisite account data is received, POS device 1702 initiates the electronic deposit of Change Due from the cash purchase to the appropriate account, and processor 1701 initiates the dispensing of the item purchased. In another embodiment, the change due is deposited in accordance with digital change authentication and authorization process 1500 or 1600.

Selector 1703 provides the mechanism for selecting an item purchased and can be an alphanumeric key pad, a push button corresponding to a particular item, or a touchscreen. Dispenser 1704 provides the mechanism for dispensing the item to an area accessible by access 1708. In one embodiment, dispenser 1704 is a robotic mechanism configured to move, for example, in an X/Y axial manner, with the ability to grip and un-grip an item stored in vending machine 1700. In another embodiment, dispenser 1704 is a coil that spins to permit an item to drop to an area accessible by access 1708. In another embodiment, dispenser 1704 is a holding mechanism that holds an item in place, and when an item is selected, the holding mechanism moves to permit the item to fall into an area accessible by access 1708. Access 1708 is an opening in vending machine 1700 that permits a consumer to retrieve an item selected and purchased from the vending machine. In one embodiment, access 1708 is a door that freely opens and closes, but blocks access to unselected items. In another embodiment, access 1708 is an electronically-controlled door that is communicatively coupled to processor 1701 that unlocks in response to an unlock signal from processor 1701 when an item is selected and purchased, and then locks once the item has been retrieved. As will be appreciated in light of the present disclosure, features such as those described throughout the present disclosure can be combined with the foregoing features described in connection with a vending machine, in order to arrive at a desired configuration. For example, various of methods and systems such as those described herein can be employed to provide the desired level of autonomy in a vending machine according to such methods and systems, relying largely on the digital change app and mobile device, to relying largely on the vending machine and processing/communications capabilities thereof.

Figure 18:
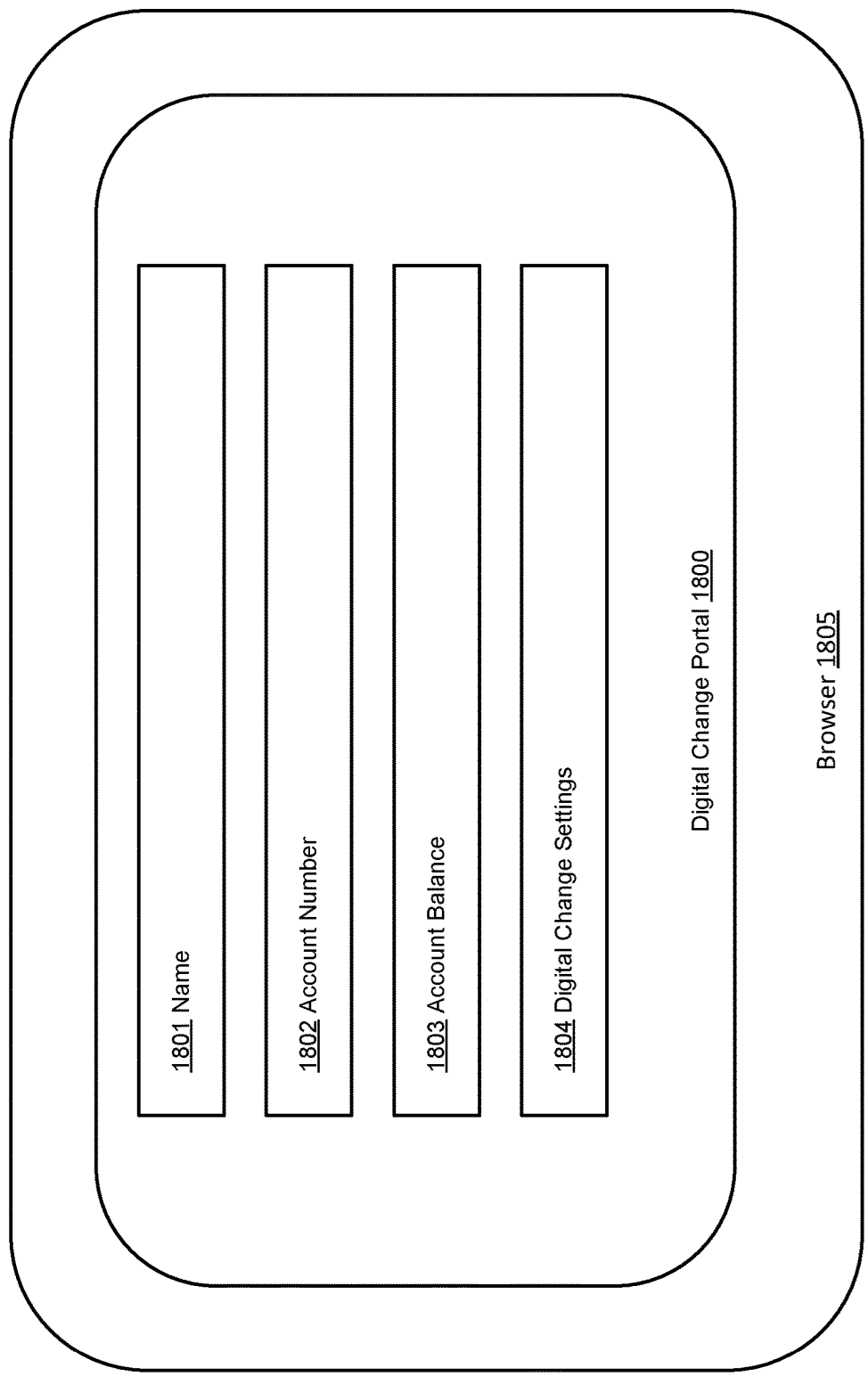
FIG. 18 is a simplified diagram illustrating an example of a web page portal for configure digital change data, according to methods and systems such as those disclosed herein.

FIG. 18 illustrates a digital change web portal that enables a consumer to configure, modify and view data associated with a digital change account and/or digital change card. Digital change web portal 1800 includes name field 1801, account number field 1802, account balance field 1803 and digital change settings field 1804. Name field 1801 provides the name of the digital change account holder. Account number field 1802 provides the account number for the digital change account. Account balance 1803 provides the balance of money, cryptocurrency/digital currency, loyalty points, or reward points, among other such alternatives. Digital change settings field 1804 enables the consumer to configure electronic deposit settings associated with the digital change account. For example, in one embodiment, a consumer may input a percentage such that the percentage of Change Due associated with all future digital change transactions will be electronically deposited into the account. In another embodiment, a consumer may indicate that only the coin portion of the Change Due is to be electronically deposited into the account. In another embodiment, the consumer may indicate that all of the Change Due is to be electronically deposited into the account. Further, such settings can include designations of the consumer's thumbprints and fingerprints, in the manner described earlier herein. In the presently described embodiment, digital change portal 1800 can be implemented in a system of a merchant utilizing POS device 100, or implemented in a financial institution in which a consumer has an existing financial account such as a savings or checking account, or implemented in a system maintained by an acquirer, an issuer, and/or transaction processor, and may be accessed via a web browser or app 1805 by providing security information to digital change portal 1800, such as a username and password.

An Example Computing and Network Environment

As shown above, the systems described herein can be implemented using a variety of computer systems and networks. Examples of such computing and network environments are described below with reference to FIGS. 19 and 20.

Figure 19:
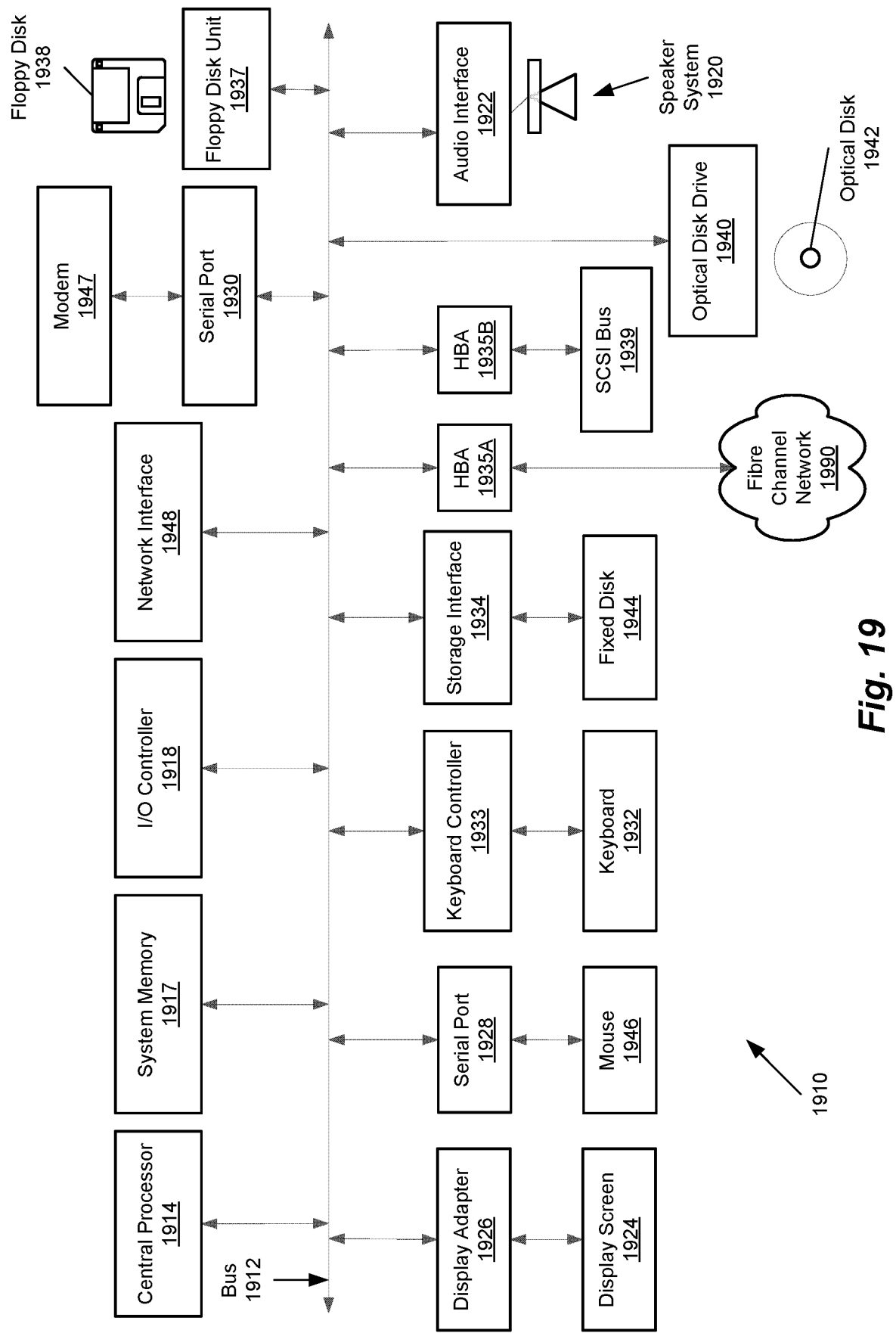
FIG. 19 is a block diagram depicting a computer system suitable for implementing aspects of systems according to embodiments of systems such as those disclosed herein.

FIG. 19 depicts a block diagram of a computer system 1910 suitable for implementing aspects of the systems described herein, and the like. Computer system 1910 includes a bus 1912 which interconnects major subsystems of computer system 1910, such as a central processor 1914, a system memory 1917 (typically RAM, but which may also include ROM, flash RAM, or the like), an input/output controller 1918, an external audio device, such as a speaker system 1920 via an audio output interface 1922, an external device, such as a display screen 1924 via display adapter 1926, serial ports 1928 and 1930, a keyboard 1932 (interfaced with a keyboard controller 1933), a storage interface 1934, a floppy disk drive 1937 operative to receive a floppy disk 1938, a host bus adapter (HBA) interface card 1935A operative to connect with a Fibre Channel network 1990, a host bus adapter (HBA) interface card 1935B operative to connect to a SCSI bus 1939, and an optical disk drive 1940 operative to receive an optical disk 1942. Also included are a mouse 1946 (or other point-and-click device, coupled to bus 1912 via serial port 1928), a modem 1947 (coupled to bus 1912 via serial port 1930), and a network interface 1948 (coupled directly to bus 1912).

Bus 1912 allows data communication between central processor 1914 and system memory 1917, which may include read-only memory (ROM) or flash memory (neither shown), and random access memory (RAM) (not shown), as previously noted. RAM is generally the main memory into which the operating system and application programs are loaded. The ROM or flash memory can contain, among other code, the Basic Input-Output System (BIOS) which controls basic hardware operation such as the interaction with peripheral components. Applications resident with computer system 1910 are generally stored on and accessed from a computer-readable storage medium, such as a hard disk drive (e.g., fixed disk 1944), an optical drive (e.g., optical drive 1940), a floppy disk unit 1937, or other computer-readable storage medium.

Storage interface 1934, as with the other storage interfaces of computer system 1910, can connect to a standard computer-readable medium for storage and/or retrieval of information, such as a fixed disk drive 1944. Fixed disk drive 1944 may be a part of computer system 1910 or may be separate and accessed through other interface systems. Modem 1947 may provide a direct connection to a remote server via a telephone link or to the Internet via an internet service provider (ISP). Network interface 1948 may provide a direct connection to a remote server via a direct network link to the Internet via a POP (point of presence). Network interface 1948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 19 need not be present to practice the systems described herein. The devices and subsystems can be interconnected in different ways from that shown in FIG. 19. The operation of a computer system such as that shown in FIG. 19 is readily known in the art and is not discussed in detail in this application. Code to implement the modules of the systems described herein can be stored in computer-readable storage media such as one or more of system memory 1917, fixed disk 1944, optical disk 1942, or floppy disk 1938. The operating system provided on computer system 1910 may be MS-WINDOWS, UNIX, LINUX, MAC OS X, CHROME OS, or other operating system.

Further, and as will be appreciated in light of the present disclosure, each of the operations described herein may be executed by a module (e.g., a software module) or a portion of a module, or a computer system user. Thus, the above-described method, the operations thereof and modules therefor may be executed on a computer system configured to execute the operations of the method and/or may be executed from computer-readable storage media. The method may be embodied in a machine-readable and/or computer-readable storage medium for configuring a computer system to execute the method. Thus, the software modules may be stored within and/or transmitted to a computer system memory to configure the computer system to perform the functions of the module.

The software modules described herein may be received by a computer system, for example, from computer-readable storage media. Such computer readable storage media may be permanently, removably or remotely coupled to the computer system. Computer-readable storage media may non-exclusively include, for example, any number of the following: magnetic storage media (including disk and tape storage media); optical storage media such as compact disk media (e.g., CD ROM, CD R, etc.) and digital video disk storage media; nonvolatile memory storage media including semiconductor-based memory units such as FLASH memory, EEPROM, EPROM, ROM or application specific integrated circuits; and volatile storage media (including registers, buffers or caches, main memory, RAM, etc.). In a UNIX-based embodiment, the software modules may be embodied in a file, which may be a device, a terminal, a local or remote file, a socket, or other such element. Other new and various types of computer-readable storage media may also be used to store the software modules discussed herein.

Many other devices or subsystems (not shown) may be connected in a similar manner (e.g., bar code readers, document scanners, digital cameras and so on). Conversely, it is not necessary for all of the devices shown in FIG. 19 to be present to practice the present disclosure. The devices and subsystems may be interconnected in different ways from that shown in FIG. 19. The operation of a computer system such as that shown in FIG. 19 is readily known in the art and is not discussed in detail in this application. Code to implement the present disclosure may be stored in computer-readable storage media such as one or more of system memory 1916, fixed disk 1944, CD-ROM 1942, or floppy disk 1938. Additionally, computer system 1910 may be any kind of computing device, and so includes personal data assistants (PDAs), network appliance, X-window terminal or other such computing device. Computer system 1910 also supports a number of Internet access tools, including, for example, an HTTP-compliant web browser having a JavaScript interpreter, such as SAFARI, FIREFOX, MICROSOFT INTERNET EXPLORER, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 20:
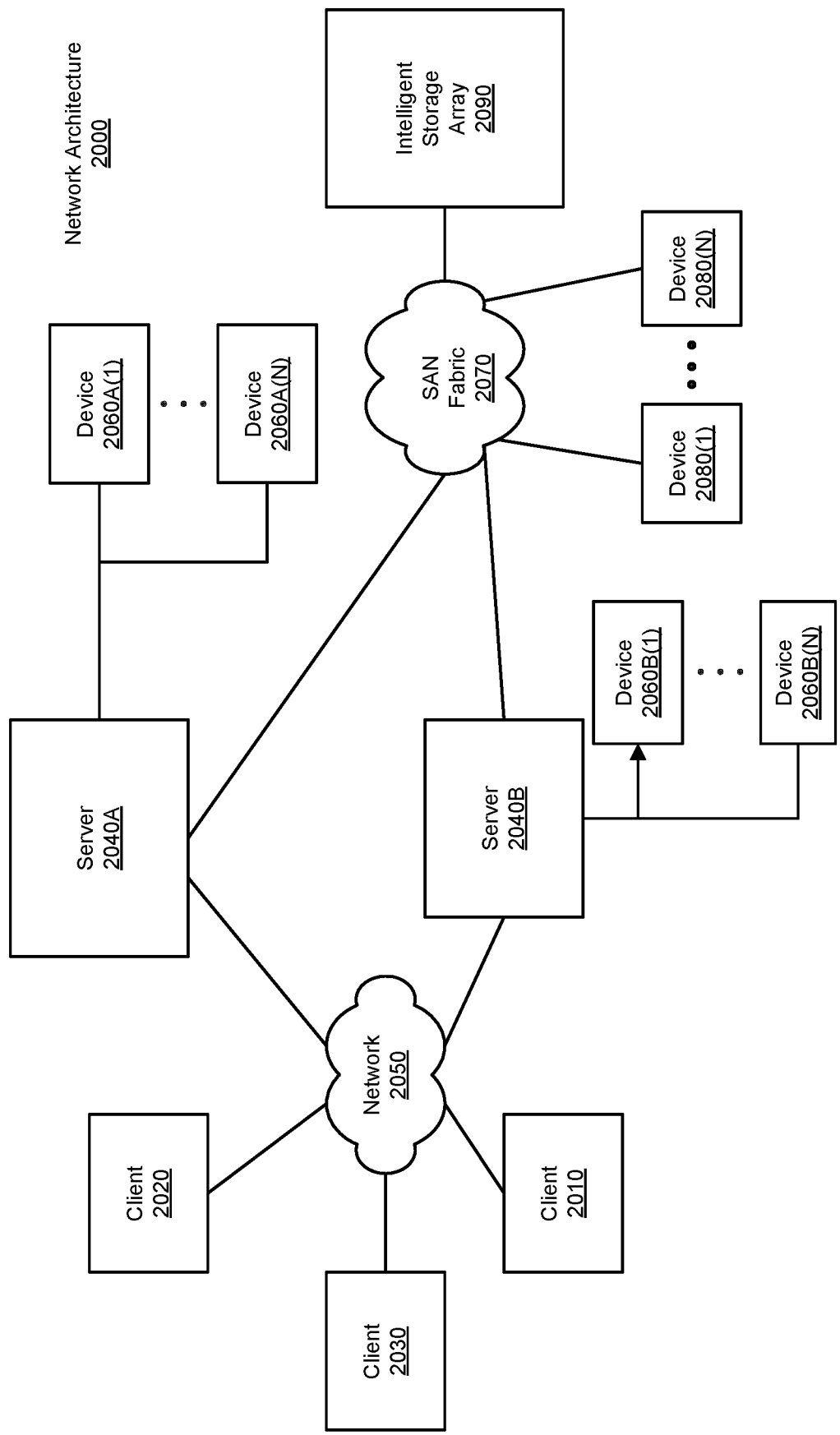
FIG. 20 is a block diagram depicting a network architecture suitable for implementing aspects of systems according to embodiments of systems such as those disclosed herein.

FIG. 20 is a block diagram depicting a network architecture 2000 in which client systems 2010, 2020 and 2030, as well as storage servers 2040A and 2040B (any of which can be implemented using computer system 2010), are coupled to a network 2050. Storage server 2040A is further depicted as having storage devices 2060A(1)-(N) directly attached, and storage server 2040B is depicted with storage devices 2060B(1)-(N) directly attached. Storage servers 2040A and 2040B are also connected to a SAN fabric 2070, although connection to a storage area network is not required for operation. SAN fabric 2070 supports access to storage devices 2080(1)-(N) by storage servers 2040A and 2040B, and so by client systems 2010, 2020 and 2030 via network 2050. Intelligent storage array 2090 is also shown as an example of a specific storage device accessible via SAN fabric 2070.

With reference to computer system 1910, modem 1947, network interface 1948 or some other method can be used to provide connectivity from each of client computer systems 2010, 2020 and 2030 to network 2050. Client systems 2010, 2020 and 2030 are able to access information on storage server 2040A or 2040B using, for example, a web browser or other client software (not shown). Such a client allows client systems 2010, 2020 and 2030 to access data hosted by storage server 2040A or 2040B or one of storage devices 2060A(1)-(N), 2060B(1)-(N), 2080(1)-(N) or intelligent storage array 2090. FIG. 19 depicts the use of a network such as the Internet for exchanging data, but the systems described herein are not limited to the Internet or any particular network-based environment.

The foregoing described embodiments wherein the different components are contained within different other components (e.g., the various elements shown as components of computer system 1910, discussed above). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Other Embodiments

The systems described herein are well-adapted to provide the advantages mentioned, as well as others inherent therein. While such systems have been depicted, described, and are defined by reference to particular descriptions, such references do not imply a limitation on the claims, and no such limitation is to be inferred. The systems described herein are capable of considerable modification, alteration, and equivalents in form and function, as will occur to those ordinarily skilled in the pertinent arts in considering the present disclosure. The depicted and described embodiments are examples only, and are in no way exhaustive of the scope of the claims.

The foregoing detailed description has set forth various embodiments of the systems described herein via the use of block diagrams, flowcharts, and examples. It will be understood by those within the art that each block diagram component, flowchart step, operation and/or component illustrated by the use of examples can be implemented (individually and/or collectively) by a wide range of hardware, software, firmware, or any combination thereof.

Further, it is to be understood that the descriptions herein are intended to be illustrative, and not restrictive. Many other embodiments will be apparent to those of skill in the art upon reviewing the descriptions herein. Data can be processed in serial or parallel fashion, or a combination of the two. Steps of methods can be processed in serial or parallel fashion, or a combination of the two. Methods carried out by one module can be implemented in one or more additional modules in whole or in part, or combined to be implemented in fewer or one module. For example, the methods carried out by digital change module 112 can be implemented in and carried out by POS module 111 or operating system 110, and the methods carried out by POS module 111 can be carried out be operating system 110. Modules are implemented in software capable of execution by a processor or run time engine. Alternative embodiments of modules can be implemented, in whole or in part, in hardware or firmware or a combination thereof. Functions implemented in hardware or firmware can be implemented, in whole or in part, in modules. Hardware items referenced as devices can be implemented in computers, modules, integrated circuits, field programmable gate arrays, programmable logic, or combinations thereof and the function of such hardware can be implemented in more or fewer hardware items. Software modules can be written in any programming language and the modules coded as subroutines, subsystems, functions, or objects depending on the language, compilation, and/or engine.

Further still, one item (such as a component, device, module, system, network or the like) communicatively coupled to another item (such as a component, device, module, system, network or the like) indicates that the items may transmit, receive, send, receive, pass, store, lookup, or otherwise provide data, directly, or indirectly to each other, and to other items. Such provision of data can be through wired signals, wireless signals, system commands, messaging protocols, utilizing registers of a processor, memory, or one or more combinations thereof. Two or more items (such as components, devices, modules, systems, networks or the like) that are communicatively coupled to the same item are communicatively coupled to each other through that same item. Data received by a device or module, or data provided to a device or module is accessible to the components and modules of the device. For example, data received by POS device 100 is accessible by processor 101, memory 102, and the modules and components communicatively coupled to processor 101 and memory 102. As another example, data received by POS module 111 is accessible by processor 101, memory 102, and the modules and components communicatively coupled to processor 101 and memory 102. Entities that have been described as financial institutions may include any entity that maintains accounts or processes transactions to and from accounts, where the accounts are accounts for legal tender currency, rewards points, loyalty points, virtualized currency, digital currency, crypto currency and the like.

As will also be appreciated, the systems described herein have been described in the context of fully functional computer systems; however, those skilled in the art will appreciate that the systems described herein are capable of being distributed as a program product in a variety of forms, and that the systems described herein apply equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment can also include a semiconductor-based memory, which may be permanently, removably or remotely coupled to a microprocessor/memory system. Thus, the modules can be stored within a computer system memory to configure the computer system to perform the functions of the module. The modules may also be located on remote systems and provision of and access to the modules performed as part of a SaaS (Software as a Service) platform or cloud service. Other new and various types of computer-readable storage media may be used to store the modules discussed herein.

The above description is intended to be illustrative and should not be taken to be limiting. As will be appreciated in light of the present disclosure, other embodiments are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the claims. Variations and modifications of the embodiments disclosed herein can be made based on the description set forth herein, without departing from the scope of the claims, giving full cognizance to equivalents thereto in all respects.

Although the systems described herein have been described in connection with several embodiments, these embodiments and their descriptions are not intended to be limited to the specific forms set forth herein. On the contrary, it is intended that such embodiments address such alternatives, modifications, and equivalents as can be reasonably included within the scope of the appended claims.

What is claimed is:

1. A method, implemented in a computer system, comprising:
   determining a change deposit amount, wherein
      the determining is performed by a digital change application in communication with a point-of-sale device,
      the digital change application is installed in a mobile device of a customer, and
      the digital change application is configured to facilitate initiation of an electronic transfer operation by the point-of-sale device;
   performing an authorization operation, wherein
      the authorization operation comprises
         sending a request for authorization from the mobile device to a digital change server,
         the request for authorization comprises a digital change identifier, and
         the digital change identifier facilitates authentication of the customer by the digital change server by virtue of the digital change identifier identifying an account of the customer;
   receiving an authorization message comprising an indication of the authorization wherein
      the authorization message is received from the digital change server in response to the request for authorization, and
      the authorization message comprises a digital change token implemented as a software-based security token;
   communicating the digital change token to the point-of-sale device via a short-range wireless communication interface of the mobile device, wherein
      the point-of-sale device is operated by a merchant that maintains funds in a merchant account at financial institution, and
      the merchant account is identified by merchant account information; and
   initiating the electronic transfer operation, wherein
      the electronic transfer operation comprises
         facilitating performance of an electronic transfer of funds in an amount of the change deposit amount from the merchant account to the account by communicating the merchant account information and the digital change token from the point-of-sale device to the financial institution.

2. The method of claim 1, wherein the authentication comprises:
   performing an authentication operation.

3. The method of claim 2, wherein the authentication operation comprises:
   generating a fingerprint scan by performing a fingerprint scanning operation; and
   comparing the fingerprint scan with fingerprint information associated with the account.

4. The method of claim 2, wherein the method further comprises:
   in response to the authorization being received from the digital change server, receiving a digital change amount from a point-of-sale device, and receiving the merchant account information from the point-of-sale device.

5. The method of claim 2, wherein the method further comprises:
   in response to authorization not being received from the digital change server, indicating that the authorization was not received.

6. The method of claim 2, wherein
   in response to receipt of the digital change token, the point-of-sale device is configured to communicate, to the financial institution,
      the digital change token,
      the change deposit amount, and
      the merchant account information.

7. The method of claim 1, further comprising:
   receiving the merchant account information, wherein
      the merchant account information is received from at least one of the point-of-sale device, or
         a digital change server, and
      the merchant account information comprises a merchant identifier.

8. The method of claim 1, further comprising:
   determining a merchant identifier using a location of the mobile device.

9. A computer program product comprising:
   a digital change application, comprising a plurality of instructions, wherein the plurality of instructions comprise
      a first set of instructions, executable by a processor of a mobile device of a customer, configured to determine a change deposit amount, wherein
         the digital change application is installed in the mobile device configured to communicate with a point-of-sale device, and
         the digital change application is configured to facilitate initiation of an electronic transfer operation by the point-of-sale device,
      a second set of instructions, executable by the processor, configured to perform an authorization operation, wherein
         the authorization operation comprises
            sending a request for authorization from the mobile device to a digital change server,
            the request for authorization comprises a digital change identifier, and
            the digital change identifier facilitates authentication of the customer by the digital change server by virtue of the digital change identifier identifying an account of the customer,
      a third set of instructions, executable by the processor, configured to receive an authorization message comprising an indication of the authorization, wherein
         the authorization message is received from the digital change server in response to the request for authorization, and
         the authorization message comprises a digital change token implemented as a software-based security token,
      a fourth set of instructions, executable by the processor, configured to communicate the digital change token to a point-of-sale device via a short-range wireless communication interface of the mobile device, wherein
         the point-of-sale device is operated by a merchant that maintains funds in a merchant account at financial institution, and
         the merchant account is identified by merchant account information, and a fifth set of instructions, executable by the processor, configured to initiate the electronic transfer operation, wherein
the fifth set of instructions comprises
a first subset of instructions, executable by the processor, configured to facilitate performance of an electronic transfer of funds in an amount of the change deposit amount from the merchant account to the account by communicating the merchant account information and the digital change token from the point-of-sale device to the financial institution; and
a non-transitory computer-readable storage medium, wherein the instructions are encoded in the non-transitory computer-readable storage medium.

10. The computer program product of claim 9, wherein the plurality of instructions further comprises further instructions, executable by the processor, configured to:
perform an authentication operation;
generate a fingerprint scan by performing a fingerprint scanning operation; and
compare the fingerprint scan with fingerprint information associated with the account.

11. The computer program product of claim 9, wherein the plurality of instructions further comprises further instructions, executable by the processor, configured to:
perform an authentication operation.

12. The computer program product of claim 11, wherein the plurality of instructions further comprises further instructions, executable by the processor, configured to:
in response to the authorization being received from the digital change server, receive a digital change amount from a point-of-sale device, and receive the merchant account information from the point-of-sale device.

13. The computer program product of claim 11, wherein
in response to receipt of the digital change token, the point-of-sale device is configured to communicate, to the financial institution,
the digital change token,
the change deposit amount, and
the merchant account information.

14. The computer program product of claim 9, wherein the instructions further comprise:
a sixth set of instructions, executable by the processor, configured to determine a merchant identifier using a location of the mobile device.

15. A mobile computing system comprising:
one or more processors;
a computer-readable storage medium coupled to the one or more processors; and
a digital change application comprising a plurality of instructions, wherein
the digital change application is installed on the mobile computing system of a customer,
the mobile computing system is configured to communicate with a point-of-sale device, and
the plurality of instructions are encoded in the computer-readable storage medium and are configured to cause the one or more processors to
determine a change deposit amount, wherein
the digital change application is configured to facilitate initiation of an electronic transfer operation by the point-of-sale device,
perform an authorization operation, wherein
the authorization operation comprises
sending a request for authorization from the mobile computing system to a digital change server,
the request for authorization comprises a digital change identifier, and
the digital change identifier facilitates authentication of the customer by the digital change server by virtue of the digital change identifier identifying an account of the customer,
receive an authorization message comprising an indication of the authorization, wherein
the authorization message is received from the digital change server in response to the request for authorization, and
the authorization message comprises a digital change token implemented as a software-based security token,
communicate the digital change token to the point-of-sale device via a short-range wireless communication interface of the mobile computing system, wherein
the point-of-sale device is operated by a merchant that maintains funds in a merchant account at financial institution, and
the merchant account is identified by merchant account information, and
initiate the electronic transfer operation, wherein
electronic transfer operation facilitates performance of an electronic transfer of funds in an amount of the change deposit amount from the merchant account to the account by communicating the merchant account information and the digital change token from the point-of-sale device to the financial institution.

16. The mobile computing system of claim 15, wherein the plurality of instructions comprise instructions configured to cause the one or more processors to:
perform an authentication operation; and
perform the authorization operation, wherein
the authorization operation comprises
generating a fingerprint scan by performing a fingerprint scanning operation, and
comparing the fingerprint scan with fingerprint information associated with the account.

17. The mobile computing system of claim 15, wherein the plurality of instructions comprise instructions configured to cause the one or more processors to:
perform an authentication operation.

18. The mobile computing system of claim 17, wherein the plurality of instructions comprise instructions configured to cause the one or more processors to:
in response to the authorization being received from the digital change server, receive a digital change amount from a point-of-sale device, and receive the merchant account information from the point-of-sale device.

19. The mobile computing system of claim 17, wherein
in response to receipt of the digital change token, the point-of-sale device is configured to communicate, to the financial institution,
the digital change token,
the change deposit amount, and
the merchant account information.

20. The mobile computing system of claim 15, wherein the instructions are further configured to cause the one or more processors to:

determine a merchant identifier using a location of the mobile computing system.

* * * * *